United States Patent [19]

Gula et al.

[11] Patent Number: 4,868,741
[45] Date of Patent: Sep. 19, 1989

[54] COMPUTER BUS DEADLOCK PREVENTION

[75] Inventors: James L. Gula, Costa Mesa; Daniel E. Schneider, Newport Beach, both of Calif.

[73] Assignee: Texas Instruments Incorporated, Dallas, Tex.

[21] Appl. No.: 934,584

[22] Filed: Nov. 25, 1986

Related U.S. Application Data

[63] Continuation of Ser. No. 516,392, Jul. 22, 1983, abandoned.

[51] Int. Cl.⁴ .................... G06F 15/16; G06F 13/36
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,035,777 | 7/1977 | Moreton | 364/200 |
| 4,228,496 | 10/1980 | Katzman et al. | 364/200 |
| 4,234,919 | 11/1980 | Bruce et al. | 364/200 |
| 4,257,099 | 3/1981 | Appelt | 364/200 |
| 4,363,094 | 12/1982 | Kurl et al. | 364/200 |
| 4,484,273 | 11/1984 | Stiffler et al. | 364/200 |
| 4,494,193 | 1/1985 | Brahm et al. | 364/200 |
| 4,495,571 | 1/1985 | Staplin, Jr. et al. | 364/200 |

Primary Examiner—Emanuel S. Kemeny
Assistant Examiner—Christopher H. Lynt
Attorney, Agent, or Firm—James T. Comfort; N. Rhys Merrett; Melvin Sharp

[57] ABSTRACT

A digital computing system includes at least a first and a second bus with at least a first master connected to the first bus and a second master connected to the second bus. The first master is capable of requesting the second bus through the first bus and the second master is capable of requesting the first bus through the second bus. Central conversion means receives both requests and has circuitry for generating a response signal to the first bus when both requests come simultaneously. The first master receives the response signal and continues the cycle, but without continuing the request for the second bus. The cycle is completed as though the request had been completed.

4 Claims, 100 Drawing Sheets

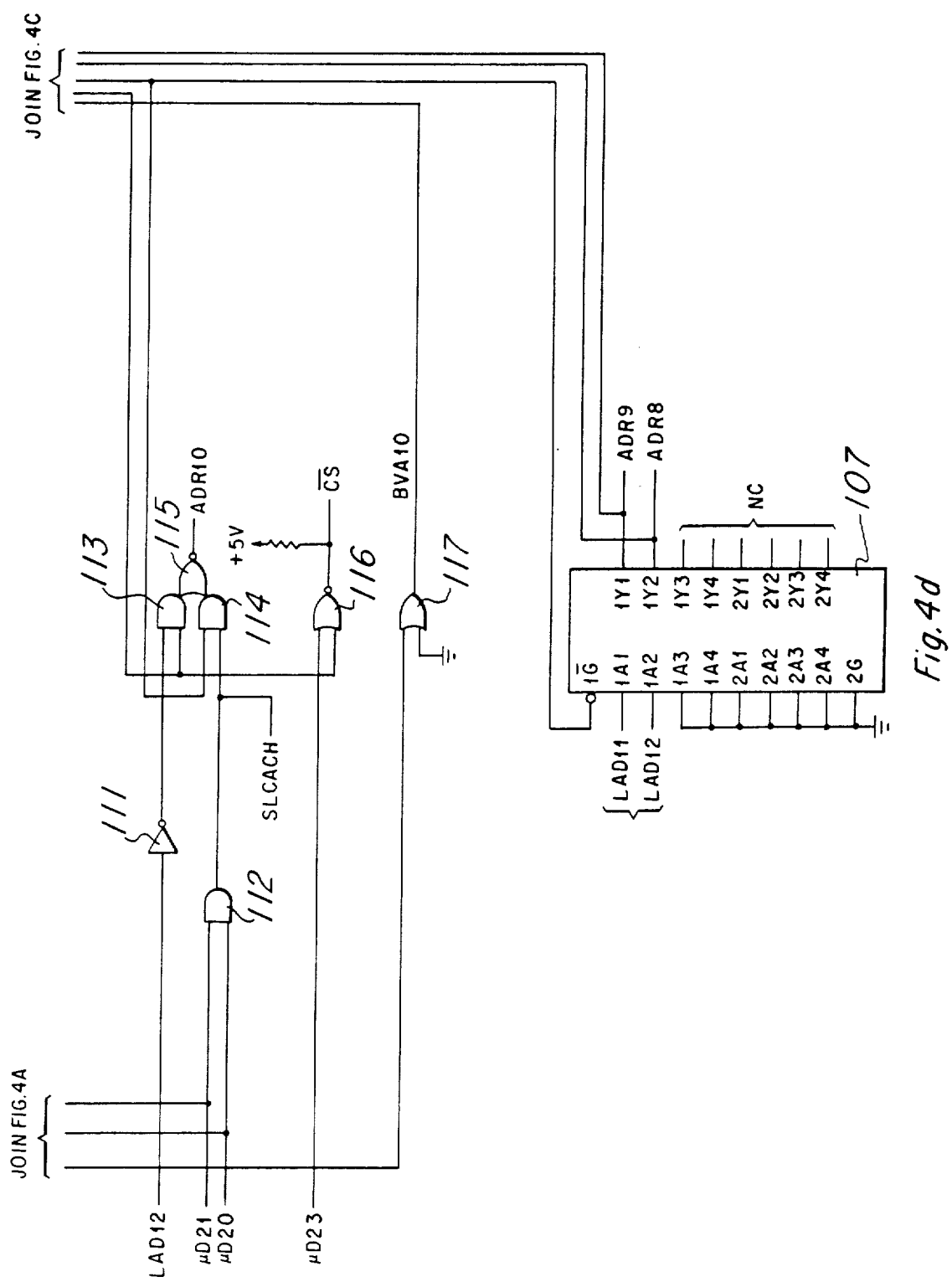

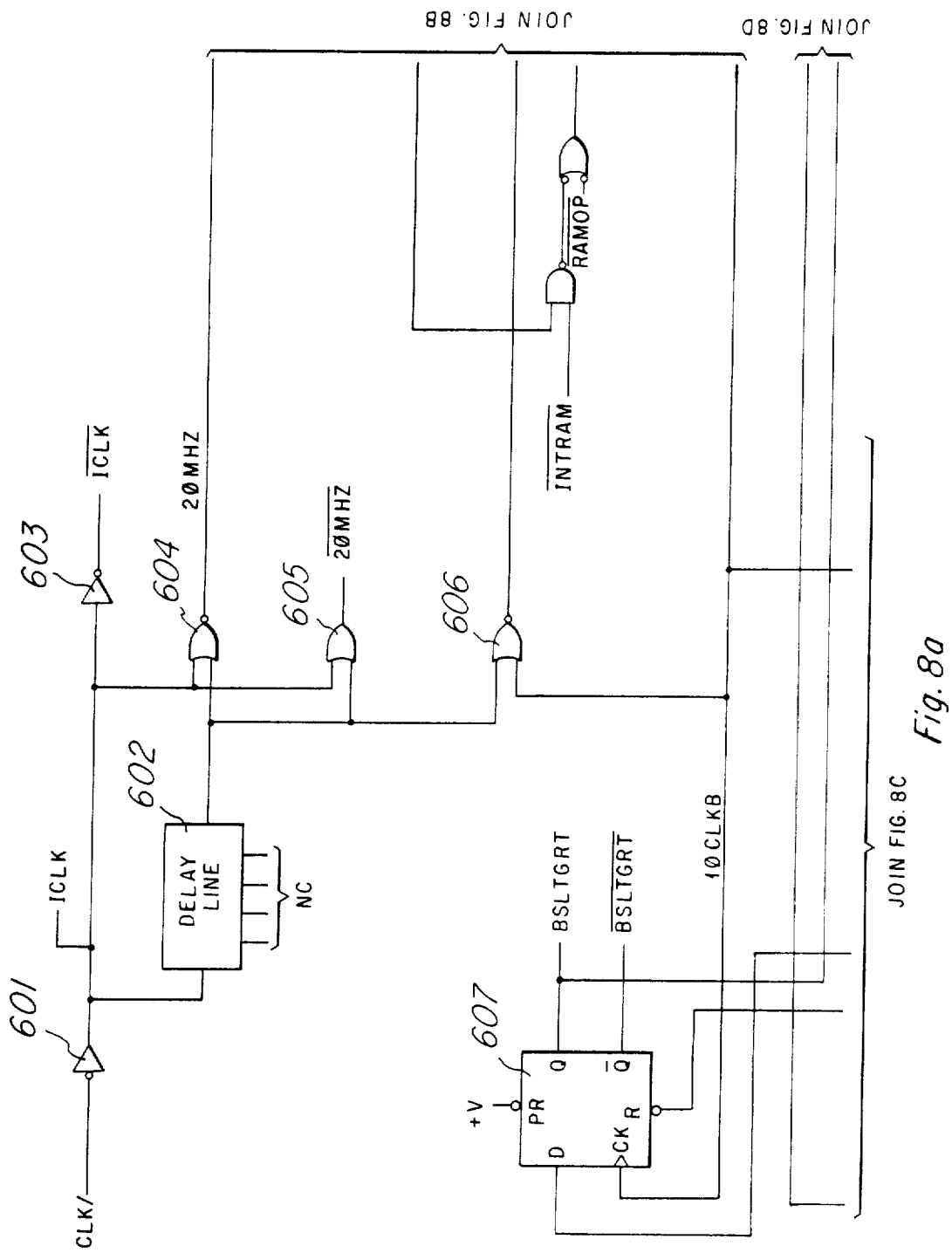

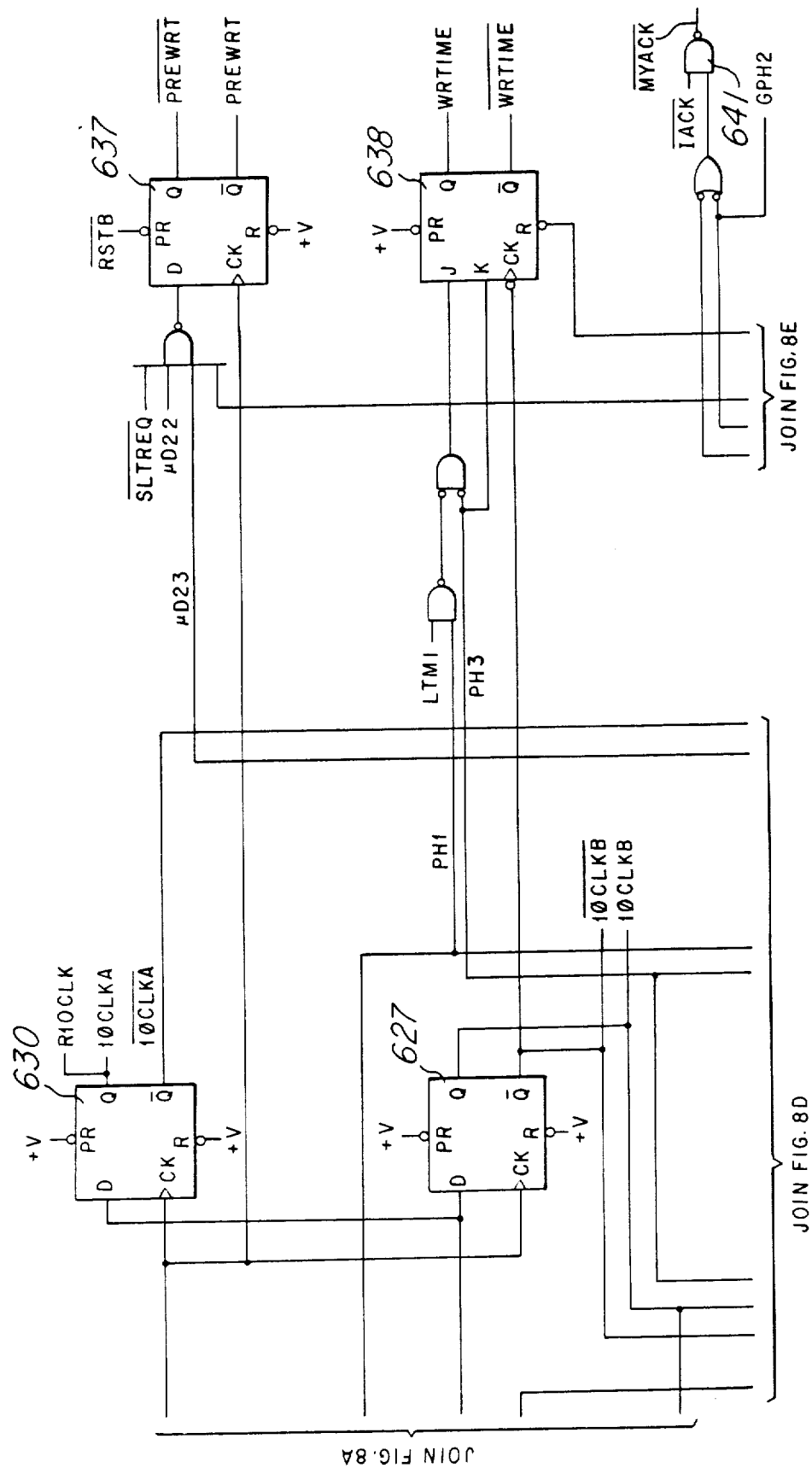

Fig. 9a
Fig. 9b
Fig. 9c
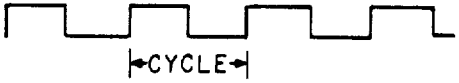
Fig. 9d
Fig. 9d'
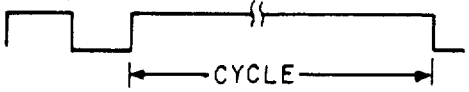
Fig. 9d"

ADDR:/DATA

| | | | |
|---|---|---|---|
| 00: | 1 0 1 1 0 0 0 0 | 1 0 0 0 0 0 0 0 | 0 0 0 0 0 0 1 0 |
| 01: | 0 0 1 0 0 0 0 0 | 0 0 0 0 0 0 0 0 | 0 0 0 0 0 0 0 0 |
| 02: | 0 1 1 1 0 0 1 0 | 0 0 0 0 0 0 0 0 | 0 0 0 0 0 1 0 1 |
| 03: | 0 1 1 1 0 0 0 0 | 0 0 0 1 1 1 0 0 | 0 0 0 0 0 0 1 1 |
| 04: | 1 0 1 0 0 0 0 1 | 1 1 1 0 0 1 0 0 | 0 0 0 0 0 0 0 0 |
| 05: | 0 1 1 1 0 0 0 0 | 0 0 0 0 0 0 1 0 | 0 0 0 0 1 1 0 1 |
| 06: | 0 1 1 1 0 0 1 0 | 0 0 0 0 0 0 0 0 | 0 0 0 0 1 1 1 1 |
| 07: | 0 1 1 1 1 0 0 0 | 0 1 0 0 0 0 0 0 | 0 1 0 0 0 1 1 0 |
| 08: | 1 1 1 0 0 0 0 1 | 0 0 0 0 0 1 0 1 | 0 0 1 0 0 0 0 0 |
| 09: | 0 1 0 0 1 0 0 0 | 0 0 0 0 0 1 0 0 | 0 0 1 0 0 0 0 0 |
| 0A: | 0 0 1 1 0 0 0 0 | 0 0 0 0 0 0 0 0 | 0 0 0 0 0 0 0 0 |
| 0B: | 0 1 1 1 0 0 0 0 | 0 0 0 1 0 0 0 0 | 0 0 0 0 0 0 0 1 |
| 0C: | 0 1 1 1 1 1 1 0 | 0 0 0 0 1 0 0 0 | 0 0 0 0 1 0 1 0 |
| 0D: | 0 1 1 1 1 1 0 0 | 0 1 0 0 1 0 0 0 | 0 0 0 0 1 0 1 0 |
| 0E: | 0 0 1 0 0 0 0 0 | 0 0 0 0 0 0 0 0 | 0 0 0 0 0 0 0 0 |
| 0F: | 0 1 0 0 1 1 0 0 | 0 1 1 0 0 1 0 1 | 0 0 0 0 1 1 0 0 |
| 10: | 1 0 0 0 1 0 0 1 | 0 0 0 0 0 1 0 0 | 0 0 0 0 1 0 1 1 |
| 11: | 1 1 0 1 0 0 0 1 | 0 0 0 0 0 1 0 1 | 0 0 1 0 1 0 0 1 |
| 12: | 1 0 0 1 0 0 0 1 | 1 1 0 0 0 1 0 1 | 0 0 0 0 1 0 0 1 |
| 13: | 0 0 0 1 0 0 0 0 | 0 0 0 0 0 0 0 0 | 0 0 0 0 0 0 0 0 |
| 14: | 0 1 0 1 0 0 0 0 | 0 0 0 1 0 1 0 0 | 1 1 0 0 0 1 0 1 |
| 15: | 1 1 1 1 0 0 0 0 | 0 0 0 0 0 0 0 0 | 0 0 0 0 1 0 1 0 |
| 16: | 1 1 1 0 1 1 1 1 | 0 1 0 0 0 0 0 1 | 0 0 0 0 1 1 0 1 |
| 17: | 0 1 1 1 1 1 0 0 | 0 1 0 0 0 1 0 1 | 0 0 0 0 1 0 0 0 |
| 18: | 1 0 0 0 1 0 0 1 | 0 0 0 0 0 1 0 0 | 0 0 0 0 1 1 0 1 |
| 19: | 0 1 0 0 0 0 0 0 | 0 0 0 1 1 0 0 0 | 0 0 0 0 0 1 0 0 |
| 1A: | 0 1 1 1 1 0 0 0 | 1 1 0 1 0 0 1 0 | 0 1 0 0 0 1 1 0 |
| 1B: | 1 1 0 1 1 1 1 1 | 0 0 0 0 0 0 0 1 | 0 0 0 0 1 1 1 0 |
| 1C: | 1 0 1 0 0 0 0 0 | 1 1 0 0 1 1 1 1 | 0 0 0 0 0 1 1 1 |
| 1D: | 0 0 0 0 0 0 0 0 | 0 0 0 0 0 0 0 0 | 0 0 0 0 0 0 0 0 |
| 1E: | 0 1 1 1 0 0 1 0 | 0 0 0 0 0 0 0 0 | 1 0 0 0 0 1 0 1 |
| 1F: | 0 0 0 0 0 0 0 0 | 0 0 0 0 0 0 0 0 | 0 0 0 0 0 0 0 0 |

*Fig. 11*

COMPUTER BUS DEADLOCK PREVENTION

This application is a continuation of application Ser. No. 516,392, filed July 22, 1983, now abandoned.

BACKGROUND OF THE INVENTION

1. Field of the Invention

This inventoin relates to digital computing system bus deadlock prevention and in particular to providing a signal from one bus to the other indicating a completed transaction but without either positive or negative acknowledgement.

2. Description of the Prior Art

Many computer systems are implemented with multiple buses. They are generally interconnected so that one bus is a "master" and only limited types of transactions may be initiated by any of the other buses.

Other prior art systems include bus couplers where the transfer takes place in only one directon, as prioritized.

Both of these approaches are intended to do away with the problem of "deadly embrace" which is the case when two buses try to communicate with each other in such a way as to prevent either from completing their current cycles.

This invention provides for a computer bus to be connected to buses which may or may not embody this invention so that the independence and performance of each bus is preserved and the "deadly embrace" problem is solved.

BRIEF SUMMARY OF THE INVENTION

A first master on a first bus is capable of requesting a second bus to which a second master is connected. Likewise, the second master is capable of requestng the first bus. The first master requests control of the first bus in a normal manner, providnig addresses on the address lines that are within a certain block of addresses to which the second bus must respond. The second bus and the second master act in the same manner. A central converter receives the addresses from both buses on every bus request. The converter decodes the addresses and if both addresses are for the opposite buses, the converter provides signals to a programmable array of logic (PAL) that generates a signal in response thereto. The responsive signal is known as the "go away, come back later" signal (GACBL-). That signal in turn, through logic circuits, generates a pair of signals TM0 and TM1 which are returned to the first bus and to the first master. These signals are decoded and logic circuitry permits the request cycle to complete, but without actually completing the request. In fact, a transaction completion is indicated, but without providing either positive or negative acknowledgement. A positive acknowledgment, of course, signifies successful completion of a data transfer, while negative acknowledgment generally indicates an error condition. The cycle then continues normally and at that time the master gives up control of the bus and queues up for arbitration as set out herein.

The principal object of this invention is to provide a computer system of bus deadlock prevention schemae that may be employed with buses that do or do not also incorporate the invention.

Another object of this invention is to provide a bus deadlock system that acknowledges completion of a transaction but no completion of the sequence.

These and other objects will be made evident in the detailed description that follows.

BRIEF DESCRIPTION OF THE DRAWINGS

FIGS. 4A-4D, when joined as shown, form a schematic diagram of the cache memory address drivers.

FIGS. 8A-8E form a schematic diagram of the clock timing generation.

FIG. 9 illustrates selected waveforms generated by the clock timing generation.

FIG. 11 is a map of the contents of the read-only memory (ROM) of the translation sequencer.

FIGS. 12A-12F, when joined as shown, schematically illustrate latches associated with the translation sequencer.

FIGS. 27A-37E together form a schematic illustrating acknowledge decoding and error status.

FIG. 29 broadly illustrates the operation of the translation sequencer.

FIG. 30 is a flowchart illustrating the operation of the translation sequencer and associated circuitry.

FIG. 31 shows timing for the arbitration cycle.

FIG. 32 schematically illustrates the development of signal GACBL-.

FIG. 33 illustrate the development of signals TM0- and TM-0-1.

DETAILED DESCRIPTION

Figure 1A:
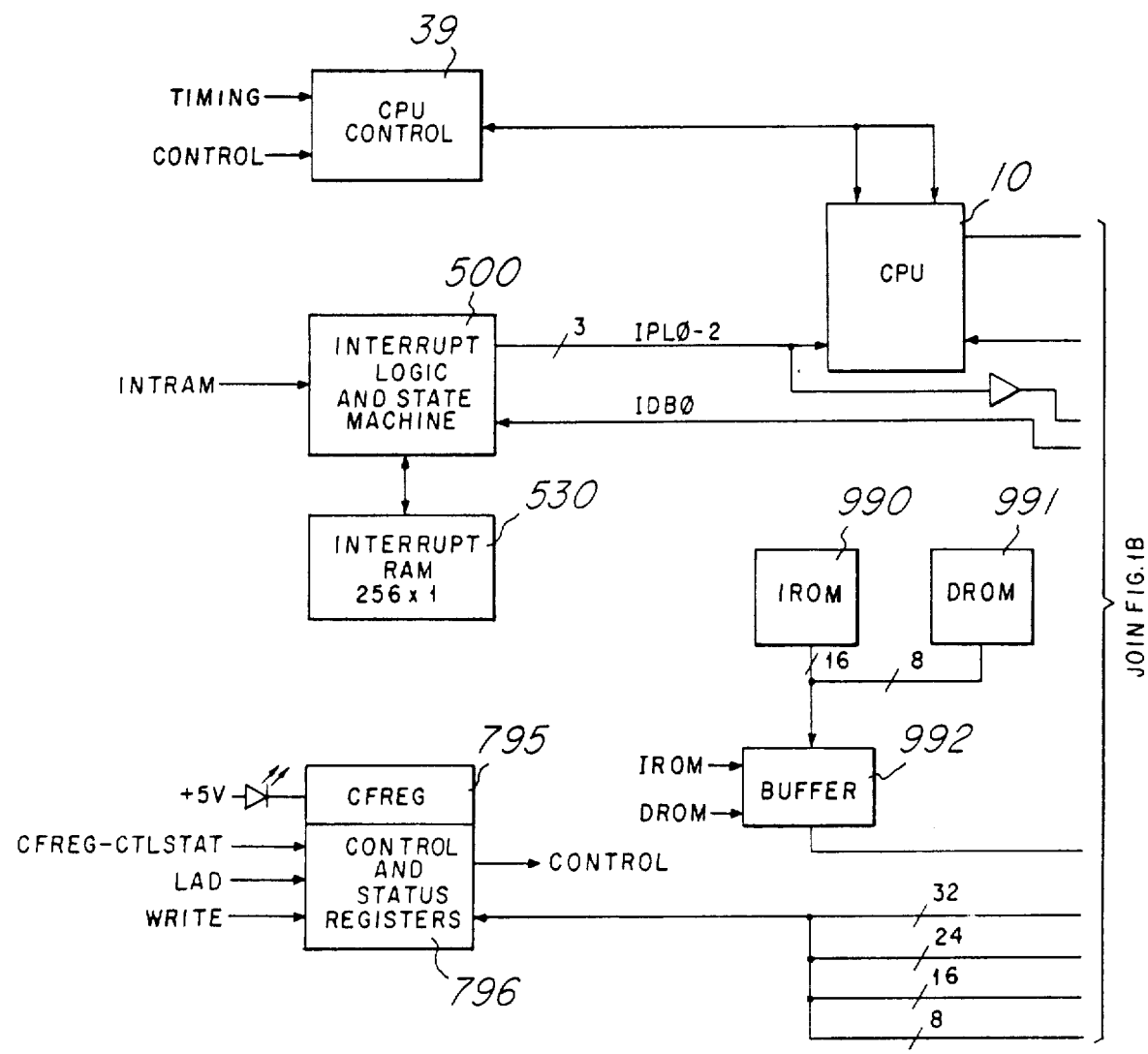
FIGS. 1A-1E, when joined as shown, form a block diagram of the digital computing system.
Figure 1B:
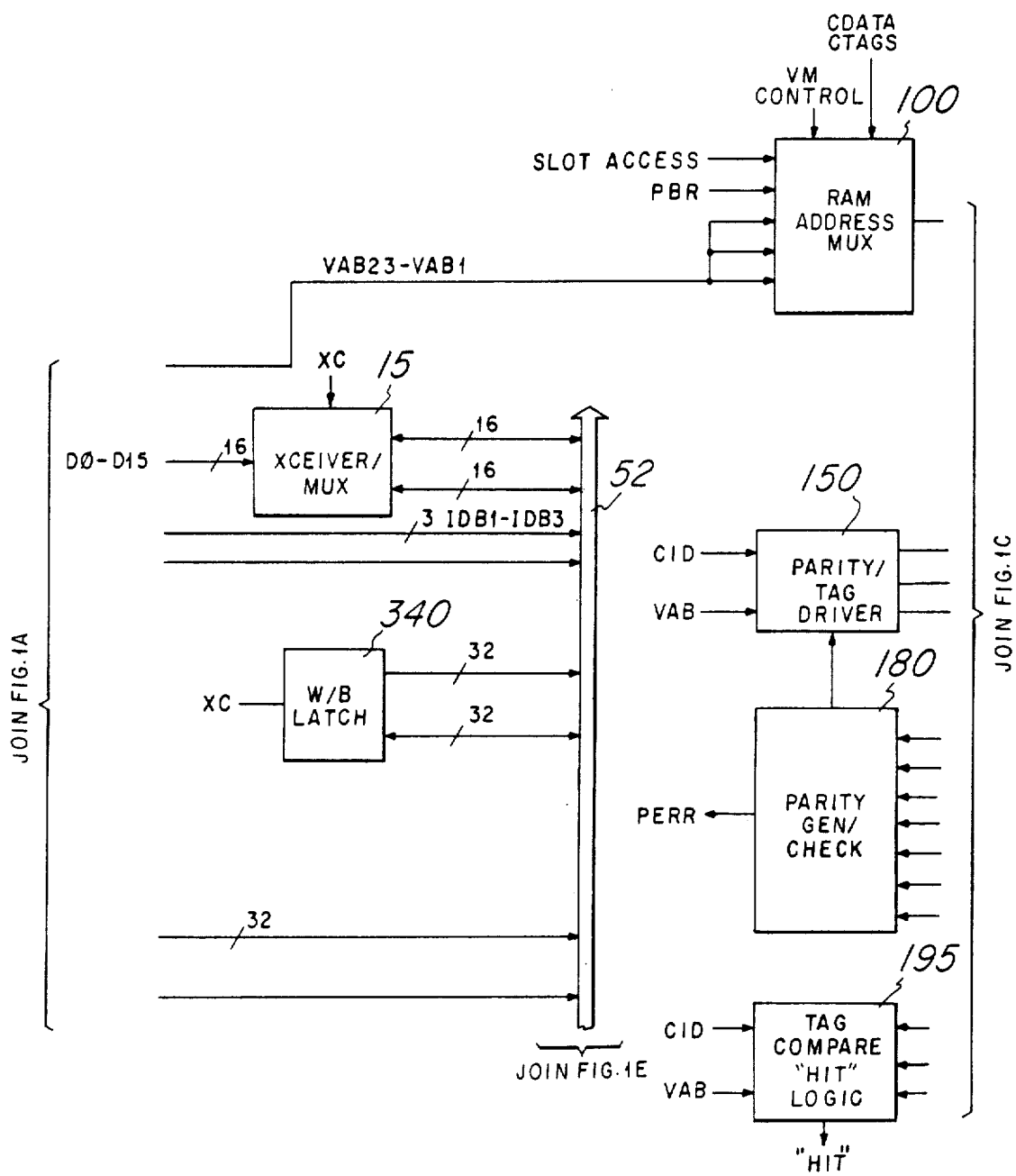
Figure 1C:
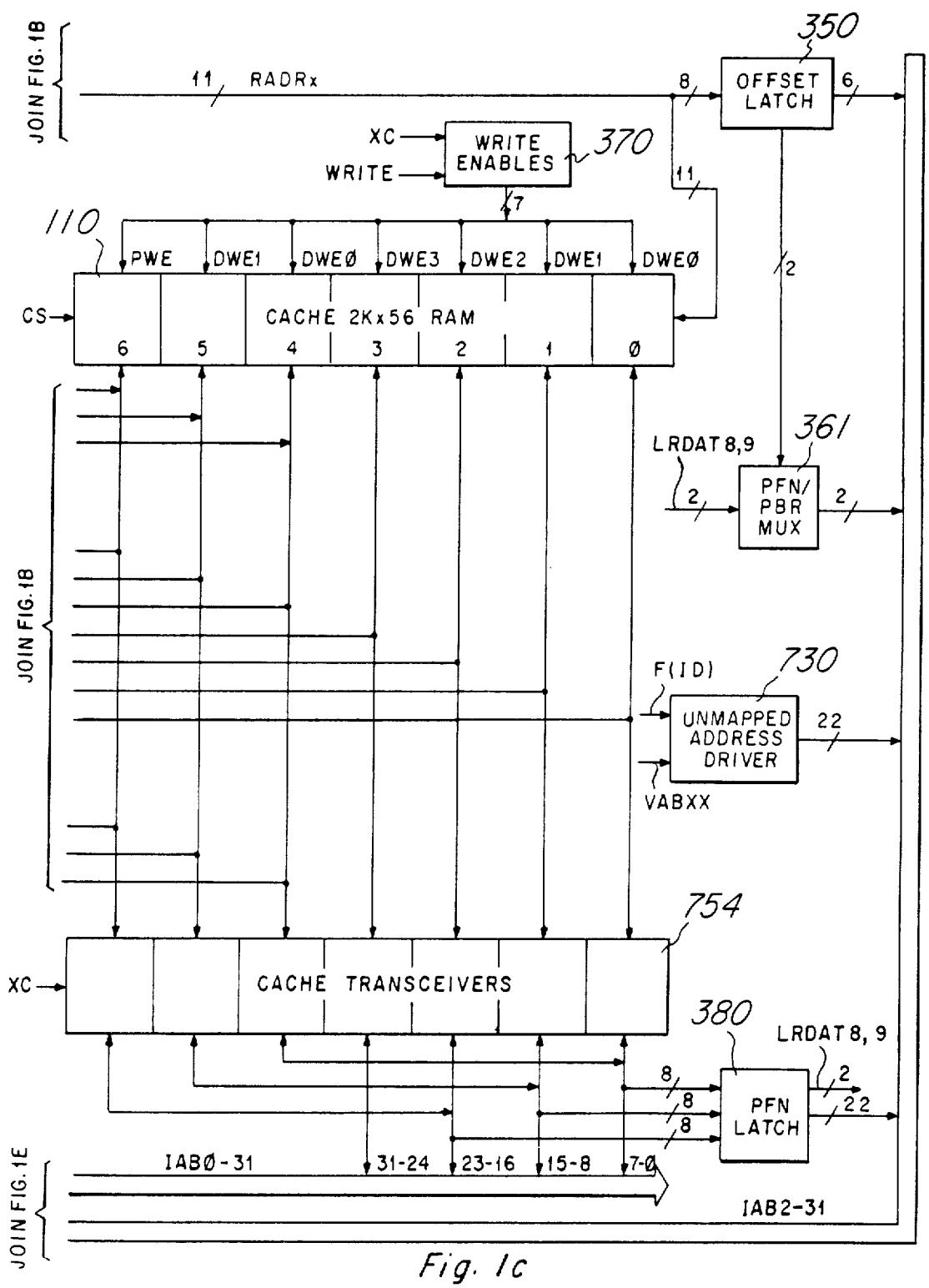

FIG. 1 is a block diagram of a portion of an overall digital computing system. Shown is central processing unit 10, with associated circuits, connected through bus logic 400 to bus 50. Also shown are devices No 2 and No. 3. In this preferred embodiment, a total of 16 devices may be attached to a single bus 50. This is a design choice of course, and more or less devices, with proper circuitry, could be attached.

In this description, the negation of a term will ordinarily be indicated by a (-) following the term. In relation to certain equations, it will be indicated by a (1) preceding the term.

CPU control 39 is shown connected to CPU 10 for controlling some operations such as stop and start. Interrupt logic and state machine 500 and interrupt RAM 530 are shown connected to CPU 10 by lines IPL0-2. Inverted, they become IDB1-IDB3 and connect to the internal bus. IROM 990 and DROM 991 provide inputs to buffer 992. These are generally test circuits with 32 outputs from buffer 992 applied to the internal bus 52. The write back latch 340 is connected through 32 lines to internal bus 52. The transceiver/multiplexer 15 for CPU 10 is connected to multiplex 32 bits to and from internal bus 52 into 16 bits to and from CPU 10.

Internal bus 52 is connected to address data multiplexer 490 together with another internal bus having conductors IAB2-31 therein. Unit 490 is connected to data latch 460 and to address latch 439 through conductors TAD0-31. It is also connected to bus transceivers 495 which is connected through 32 lines to external bus 50. The address latch 439 is connected to slot decode 485 which provides the signals shown.

The write enable circuit 370 is shown connected to cache RAM 110. Cache RAM 110 is connected as shown to cache transceivers 754 which in turn are connected to the internal bus and to the page frame number latch 380. PFN latch 380 is in turn connected to the other internal bus having conductors IAB2-31. Offset latch 350 and PFN/PBR multiplexer are both connected to the other internal bus.

The translation sequencer 300 has branch control 390, test tree 391, u control store 335 and pipeline register 392 for providing virtual memory control.

Timing generation 600 for providing various timing signals throughout the system is connected to bus control 400 which in turn is connected to the external bus 50.

Figure 2A:
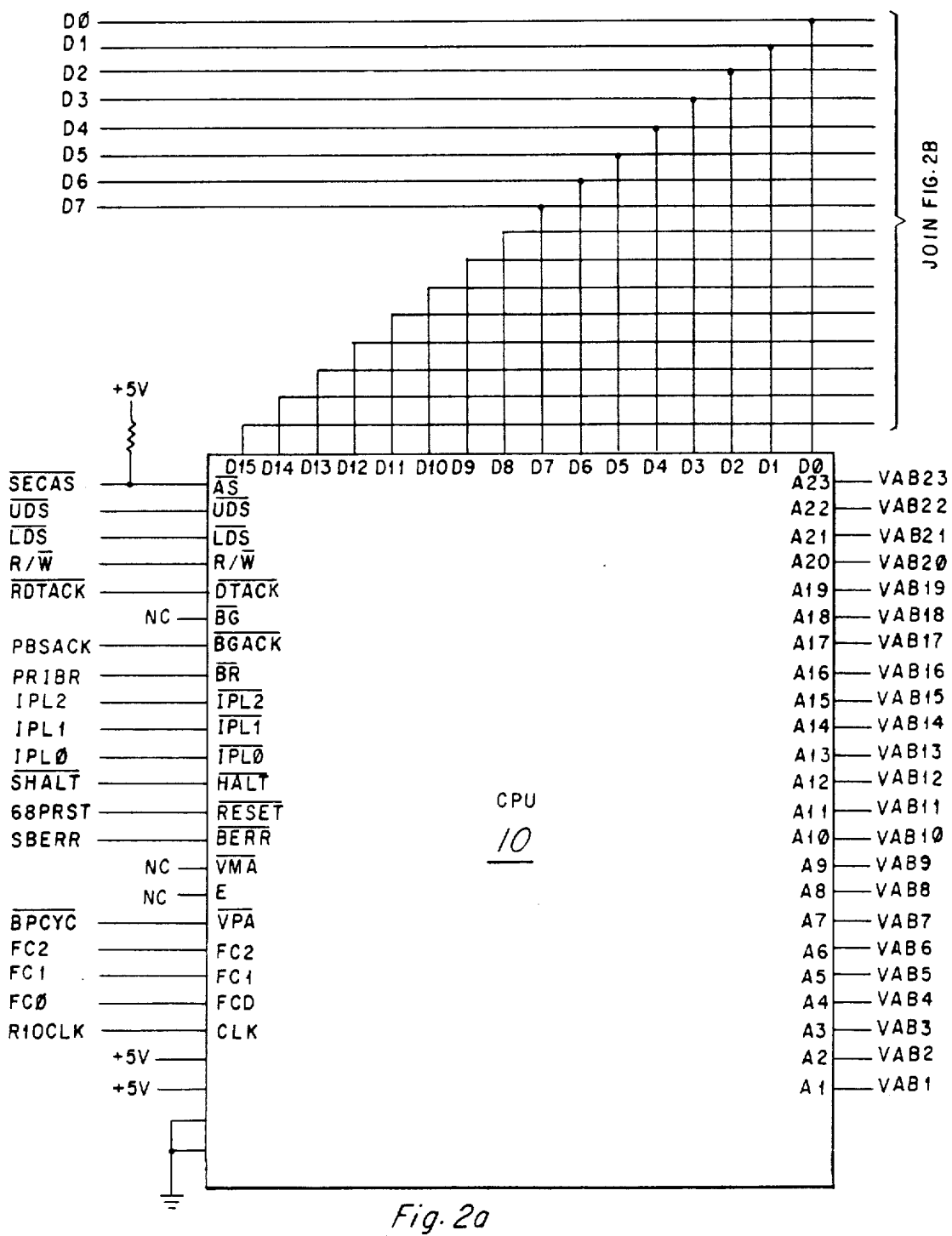
FIGS. 2A-2C form a schematic diagram illustrating the CPU and associated buffers.
Figure 2B:
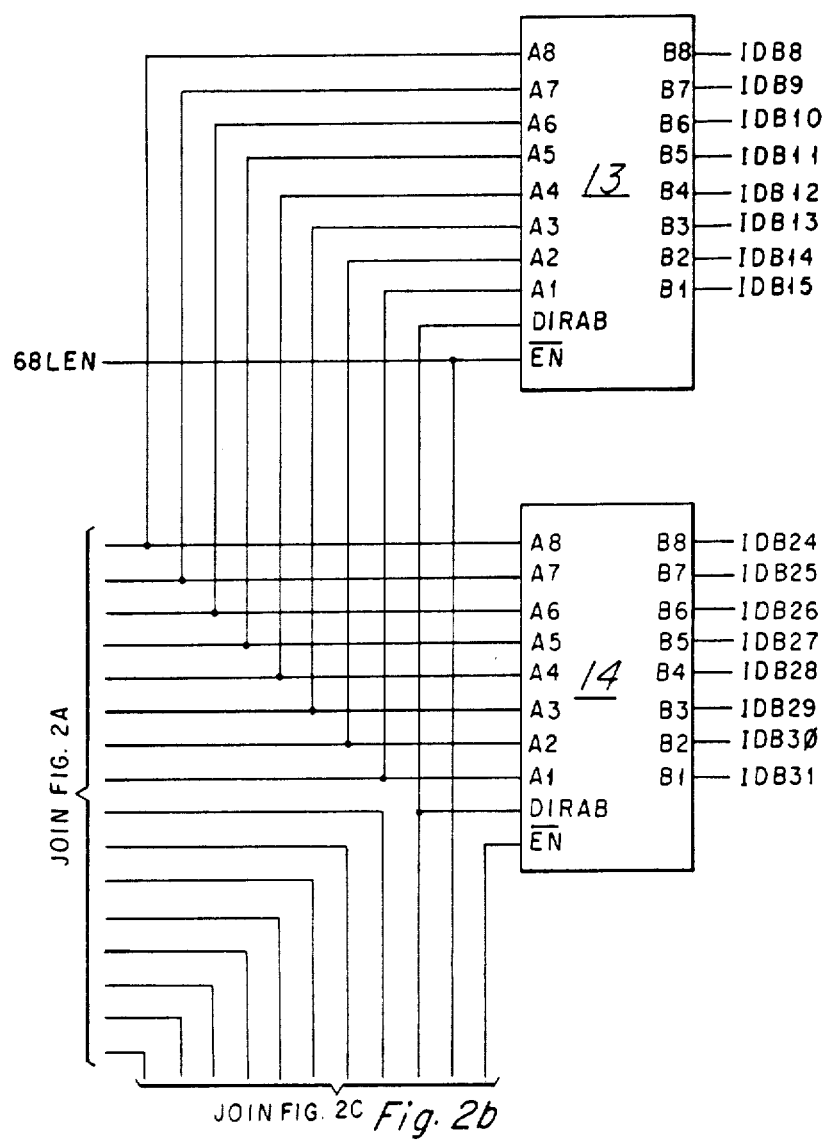
Figure 2C:
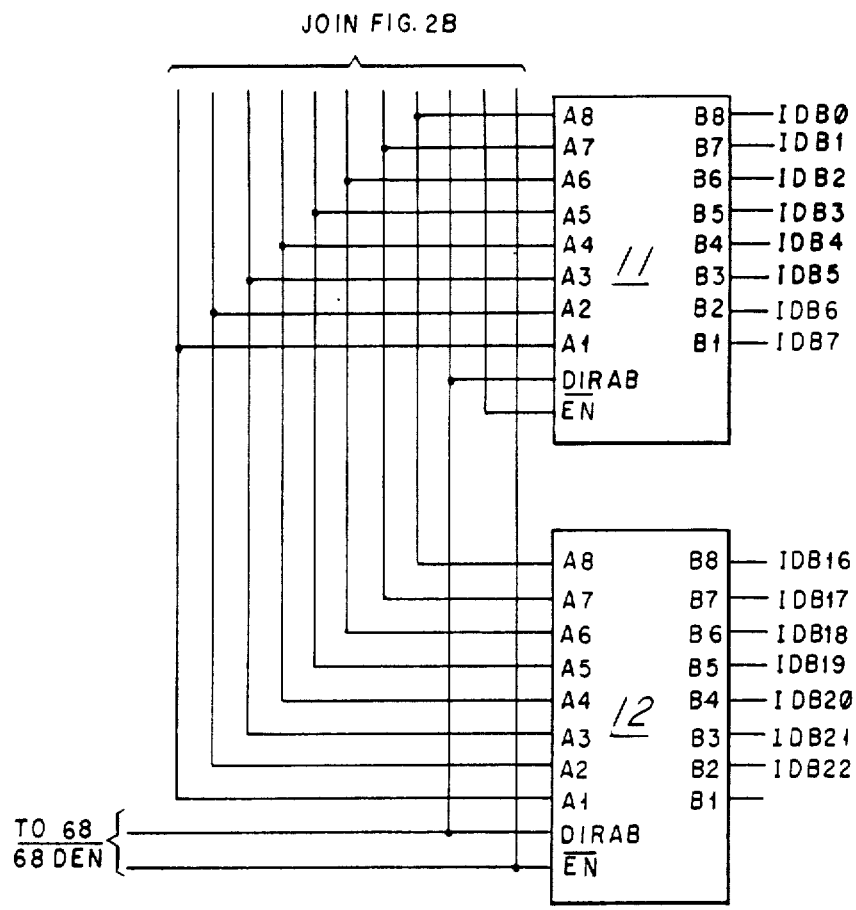

FIG. 2 simply illustrates the CPU 10, which in this preferred embodiment is a Motorola Type 68010. This is a design choice and any appropriate central processing unit may be selected for use in this invention. CPU 10 is shown having virtual address lines VAB1-VAB23 and data lines D0-D15. The function lines as shown are utilized throughout the invention and will be referenced accordingly. Buffers 11, 12, 13 and 14 receive data lines D0 through D15, buffers 11 and 13 being enabled at one time and buffers 12 and 14 being enabled at another to provide 32 outputs, IDB0-IDB31.

Figure 3:
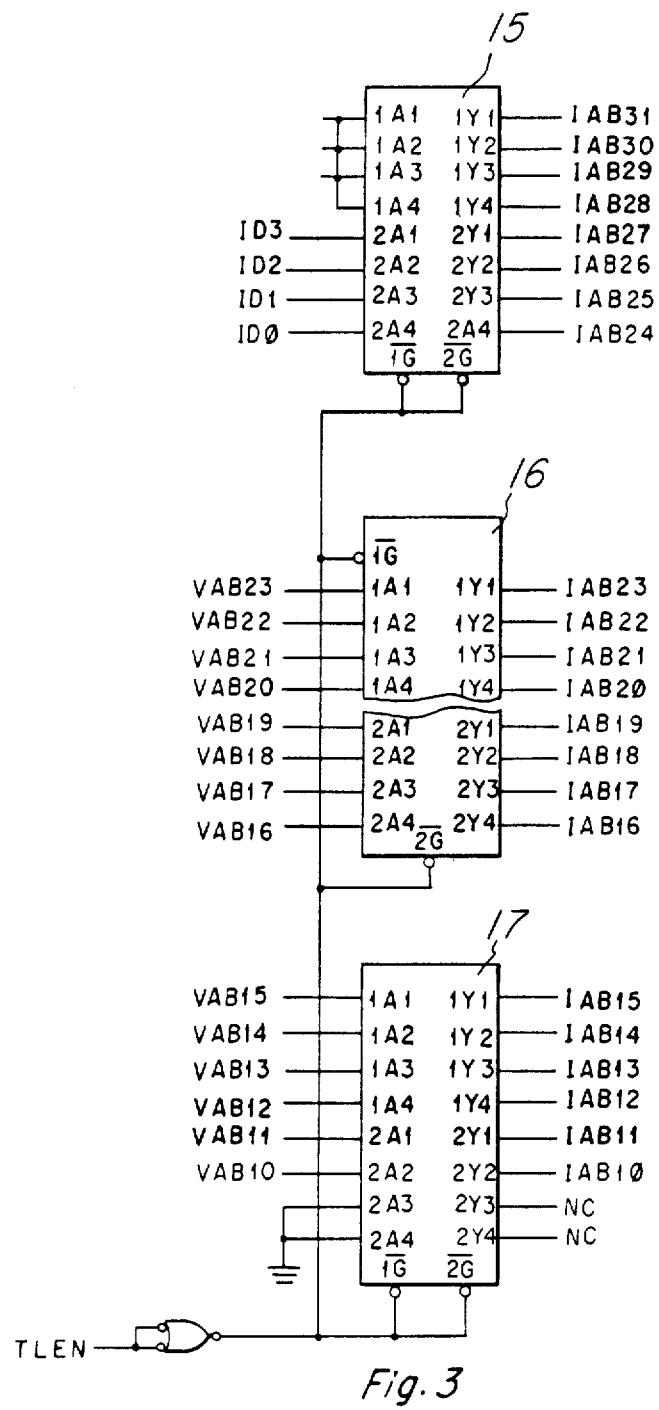
FIG. 3 is a schematic diagram illustrating other CPU buffers.
Figure 4A:
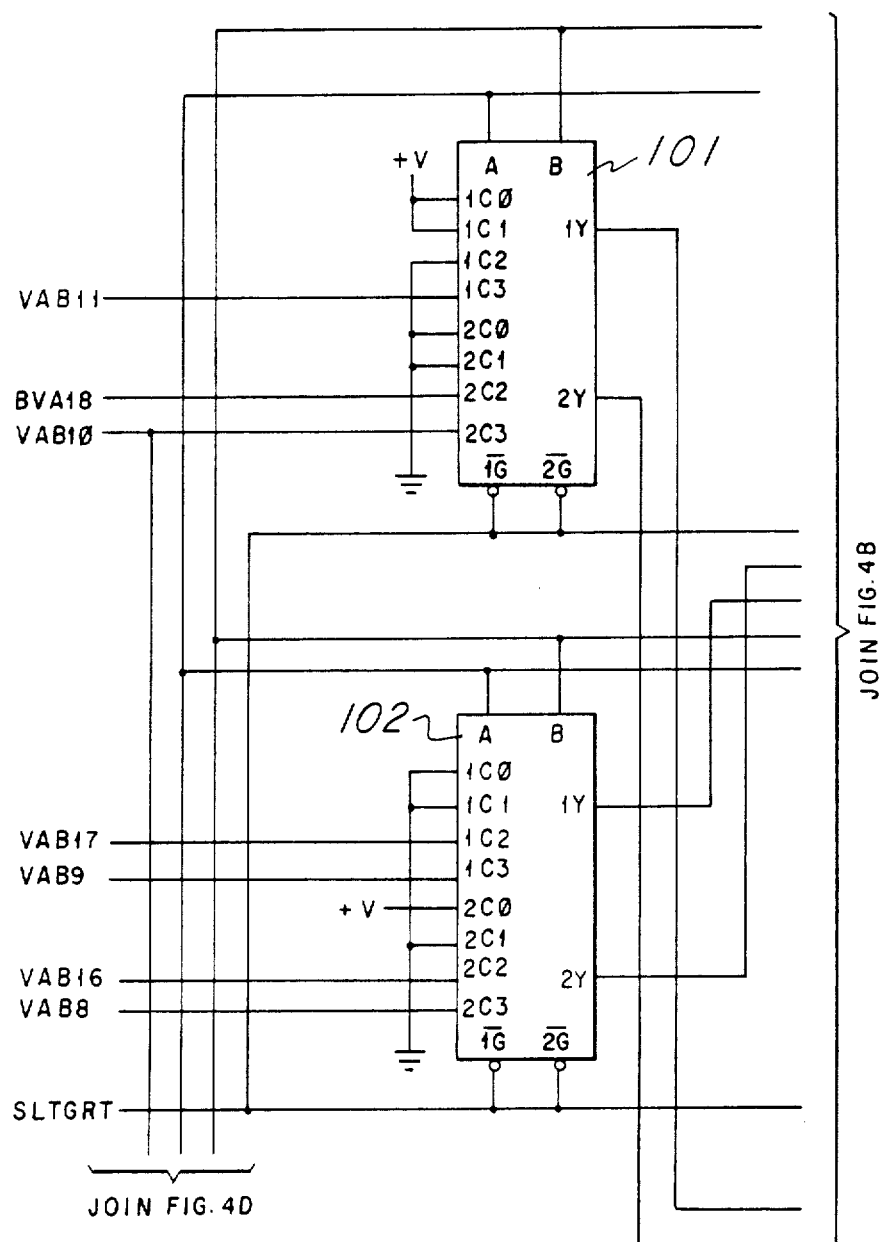
Figure 4B:
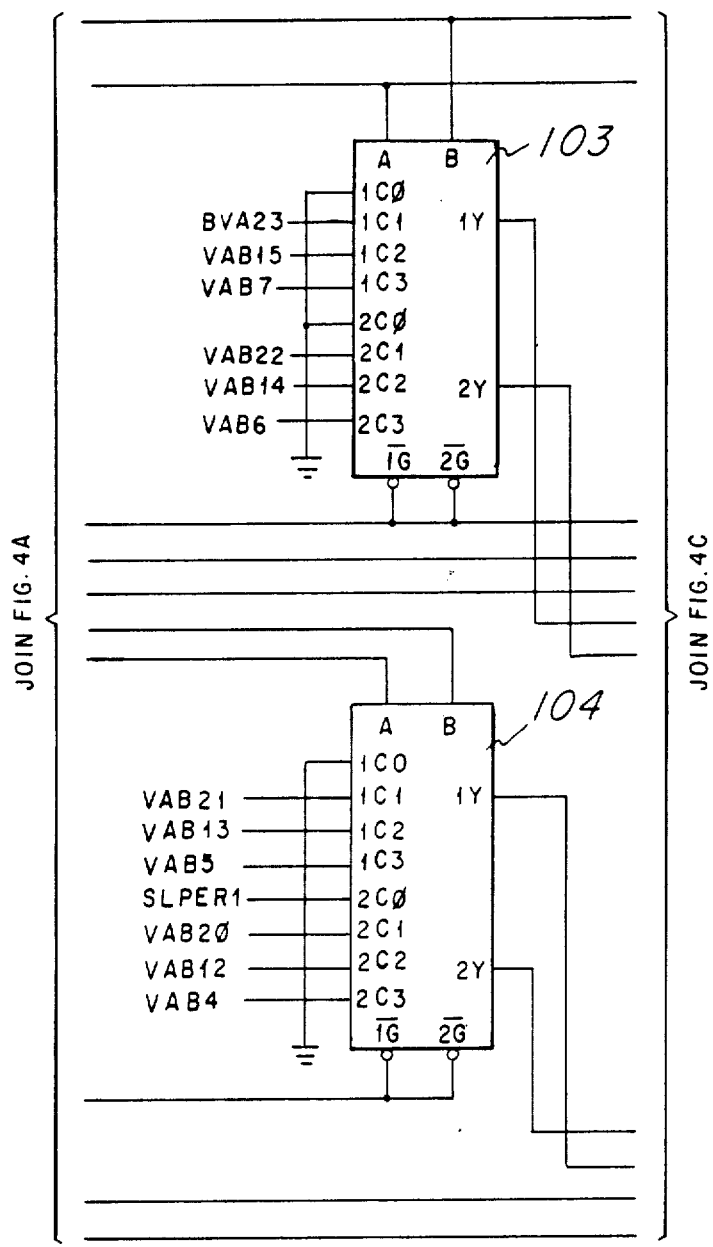
Figure 4C:
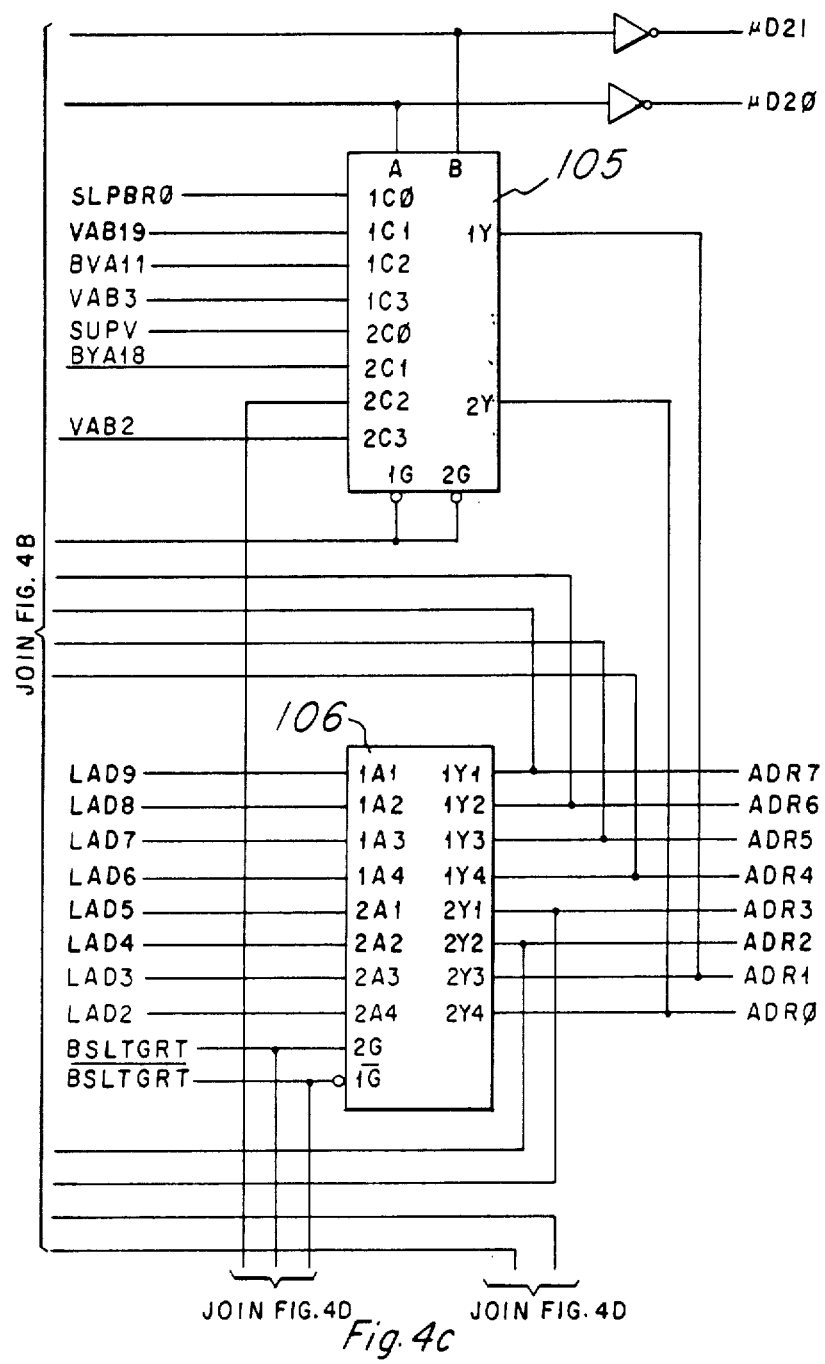

FIG. 3 illustrates address lines VAB10-VAB23 applied as inputs to buffers 16 and 17. Slot identification lines ID0-ID3 are shown as inputs to buffer 15, along with a positive voltage on the four most significant inputs. The output signals from these indicated inputs are signals IAB10-IAB31. Signals ID0-ID3 are developed as shown subsequently and output signals IAB1-0-IAB31 are shown as applied to other circuits.

Figure 7A:
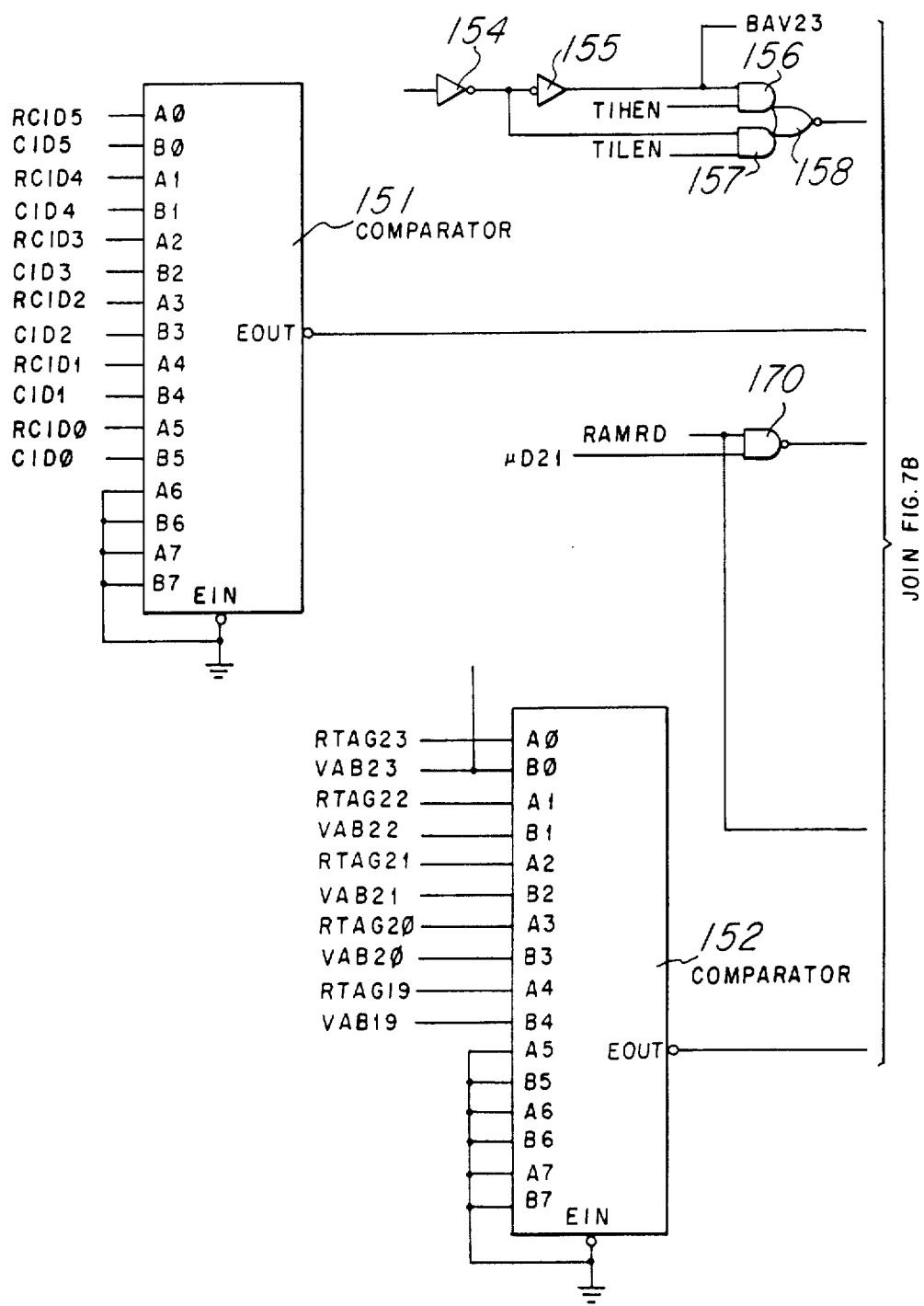
FIGS. 7A-7E form a schematic diagram of the cache "hit" logic.
Figure 7B:
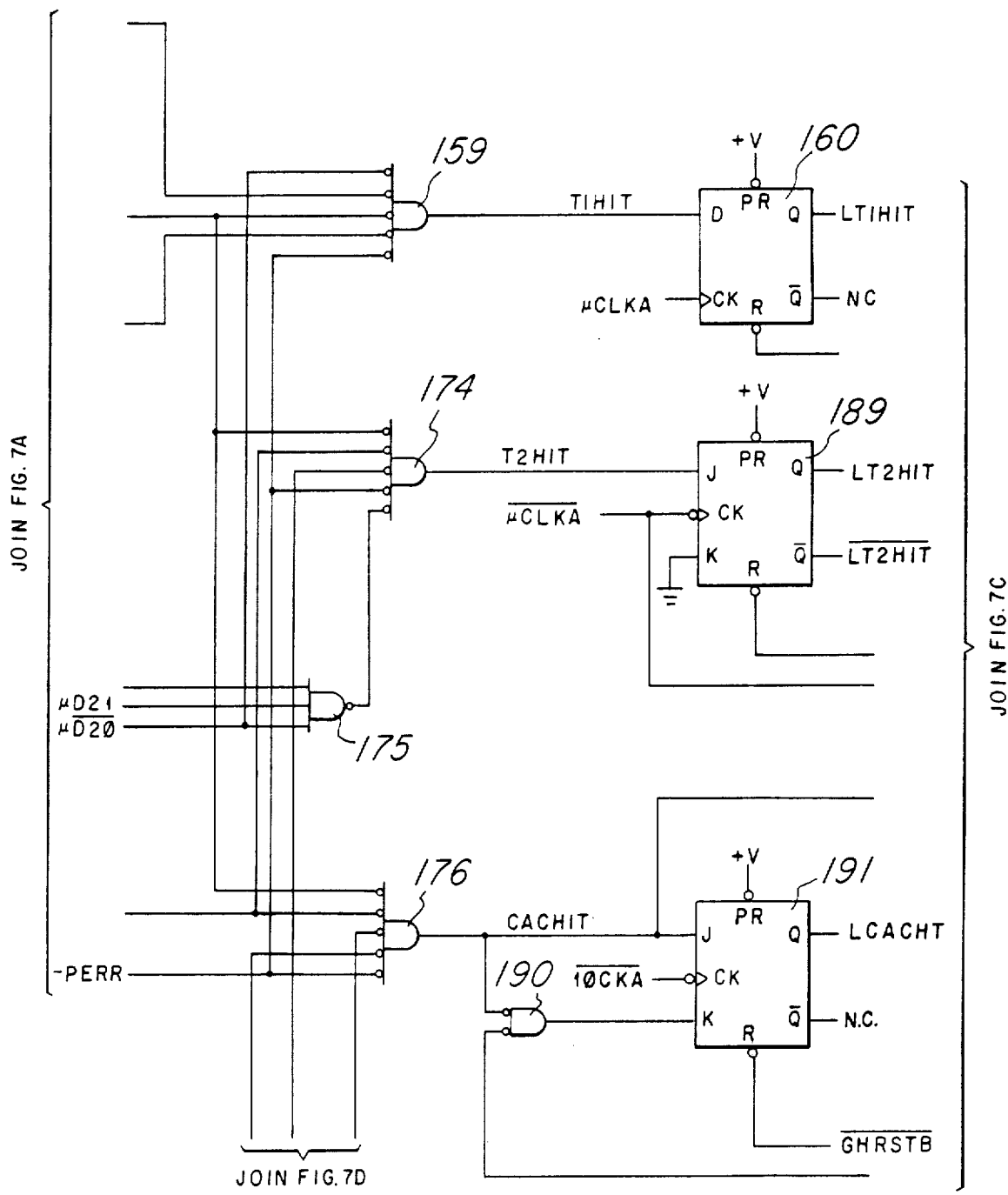
Figure 7C:
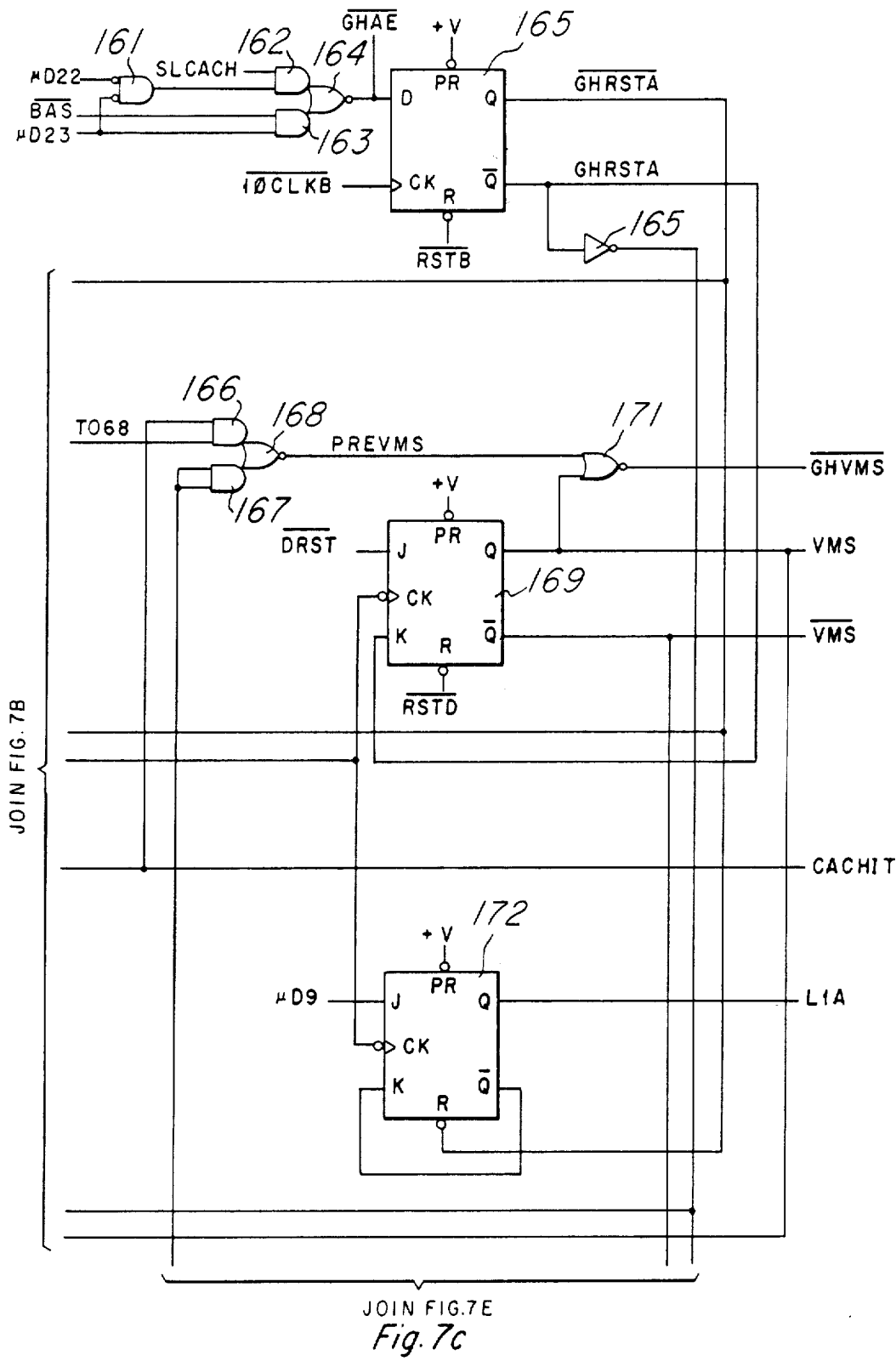
Figure 7D:
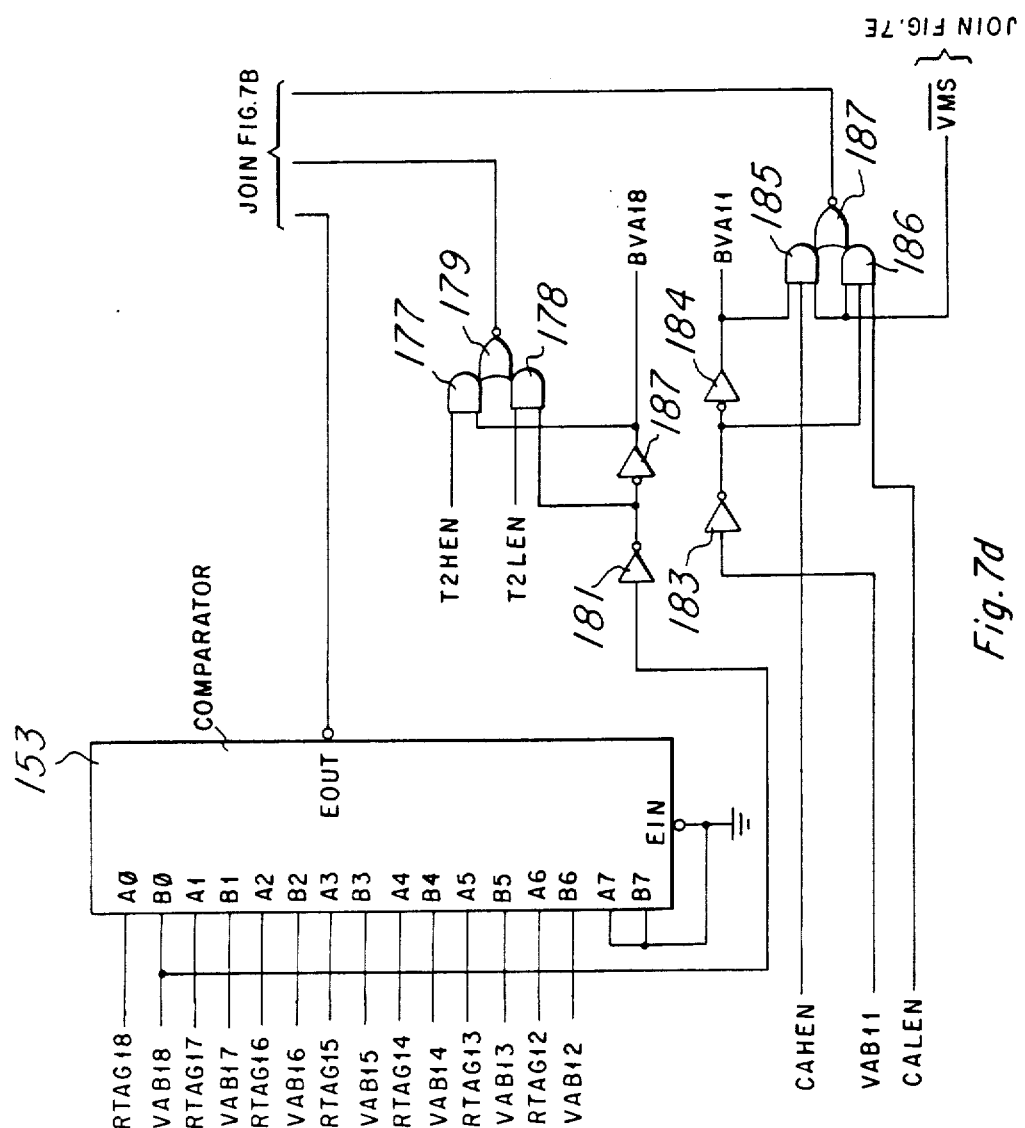
Figure 7E:
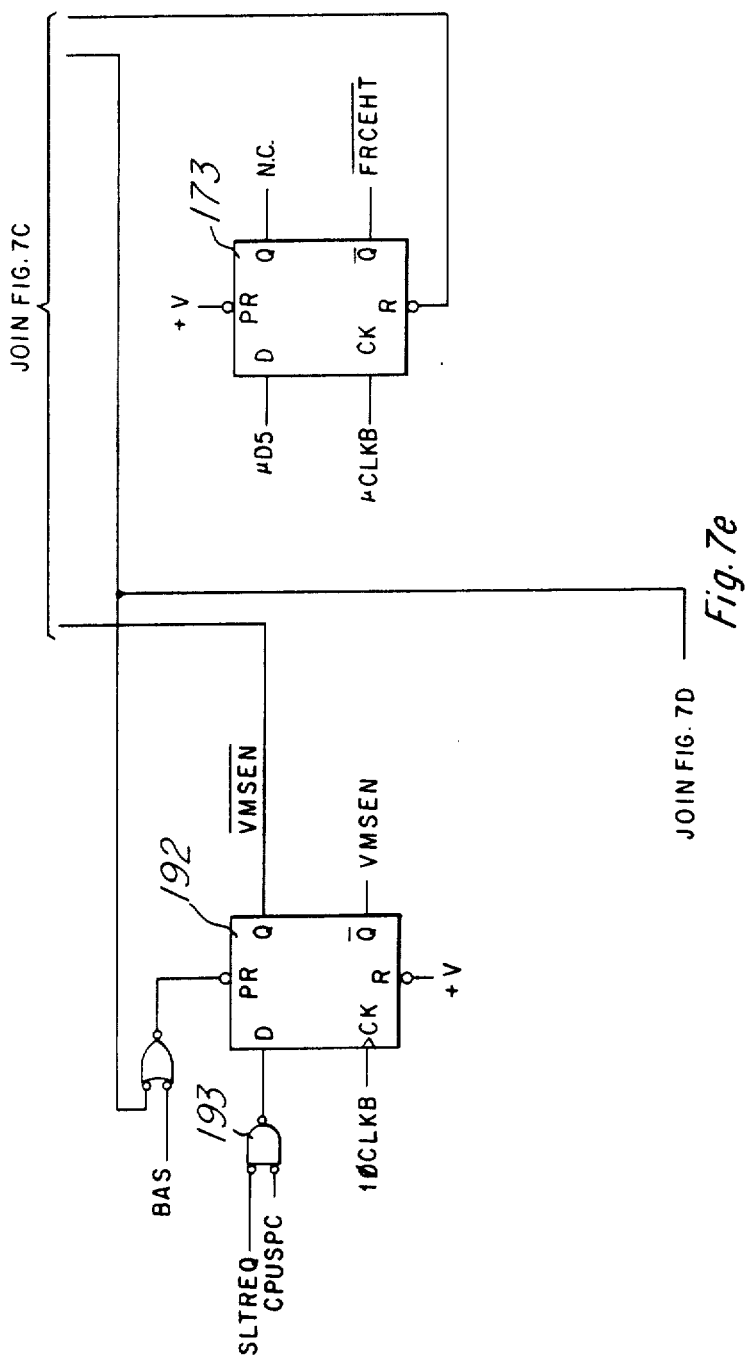
Figure 8C:
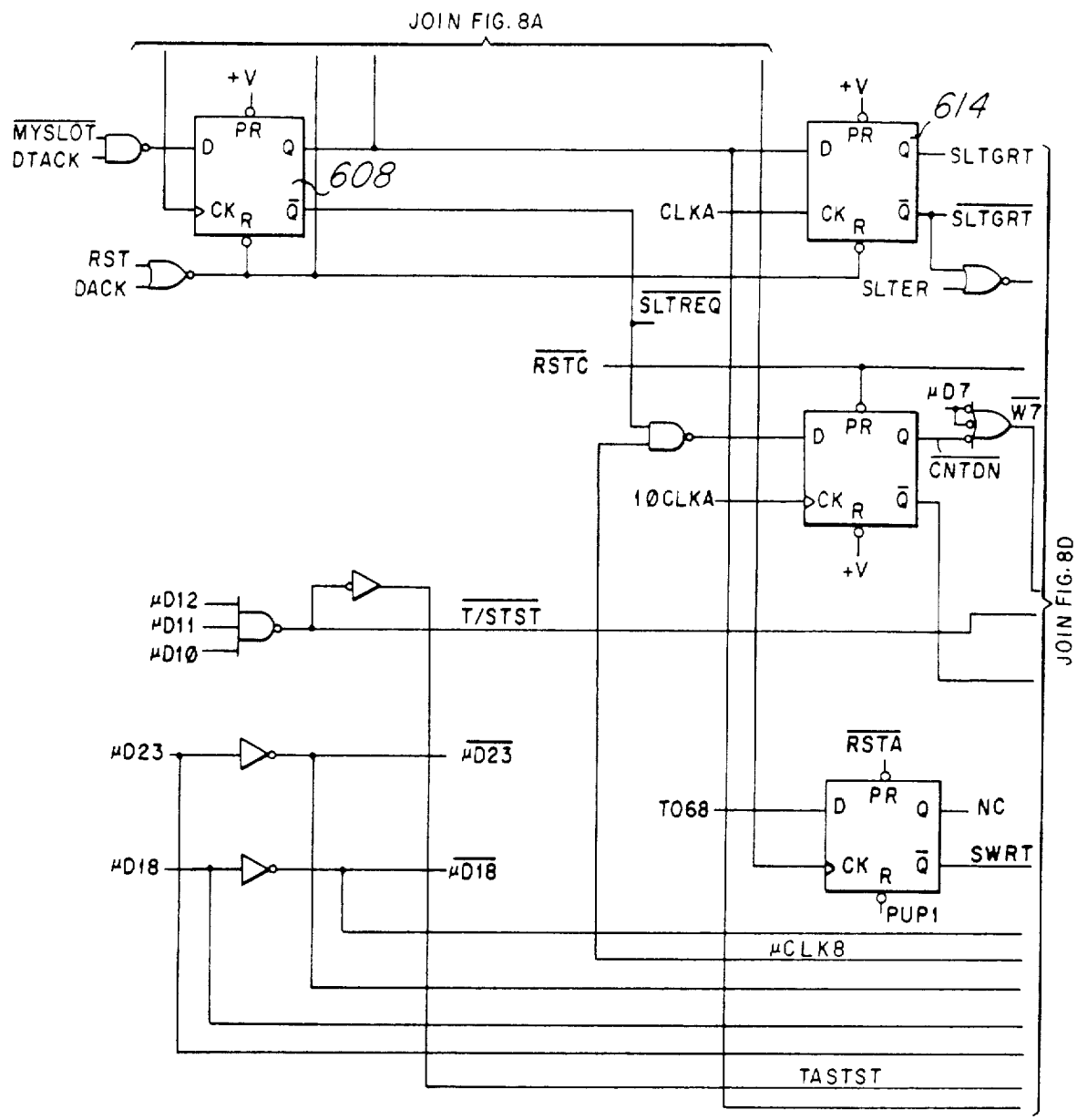
Figure 10A:
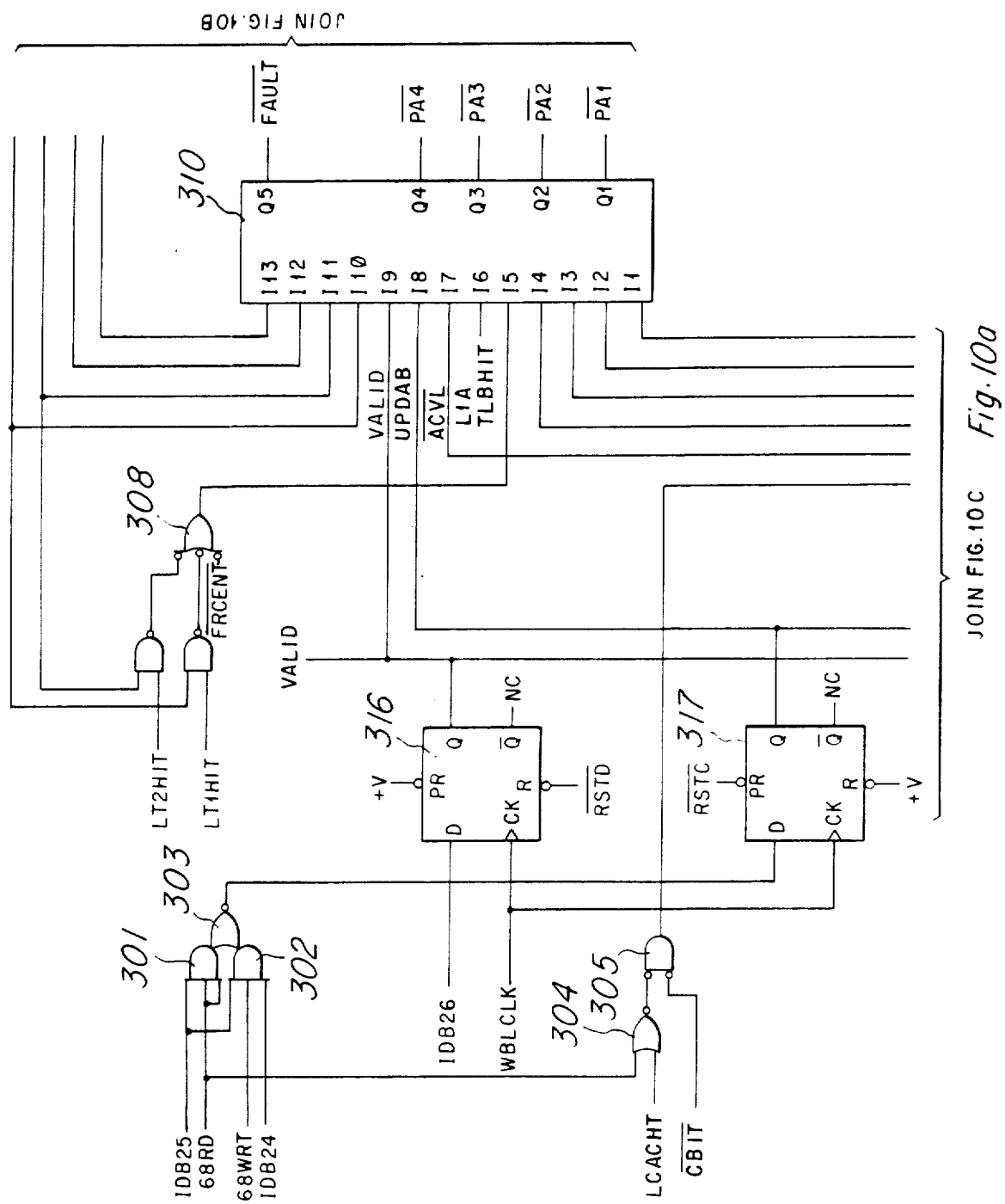
FIGS. 10A-10D are a schematic diagram of the translation sequencer.
Figure 10B:
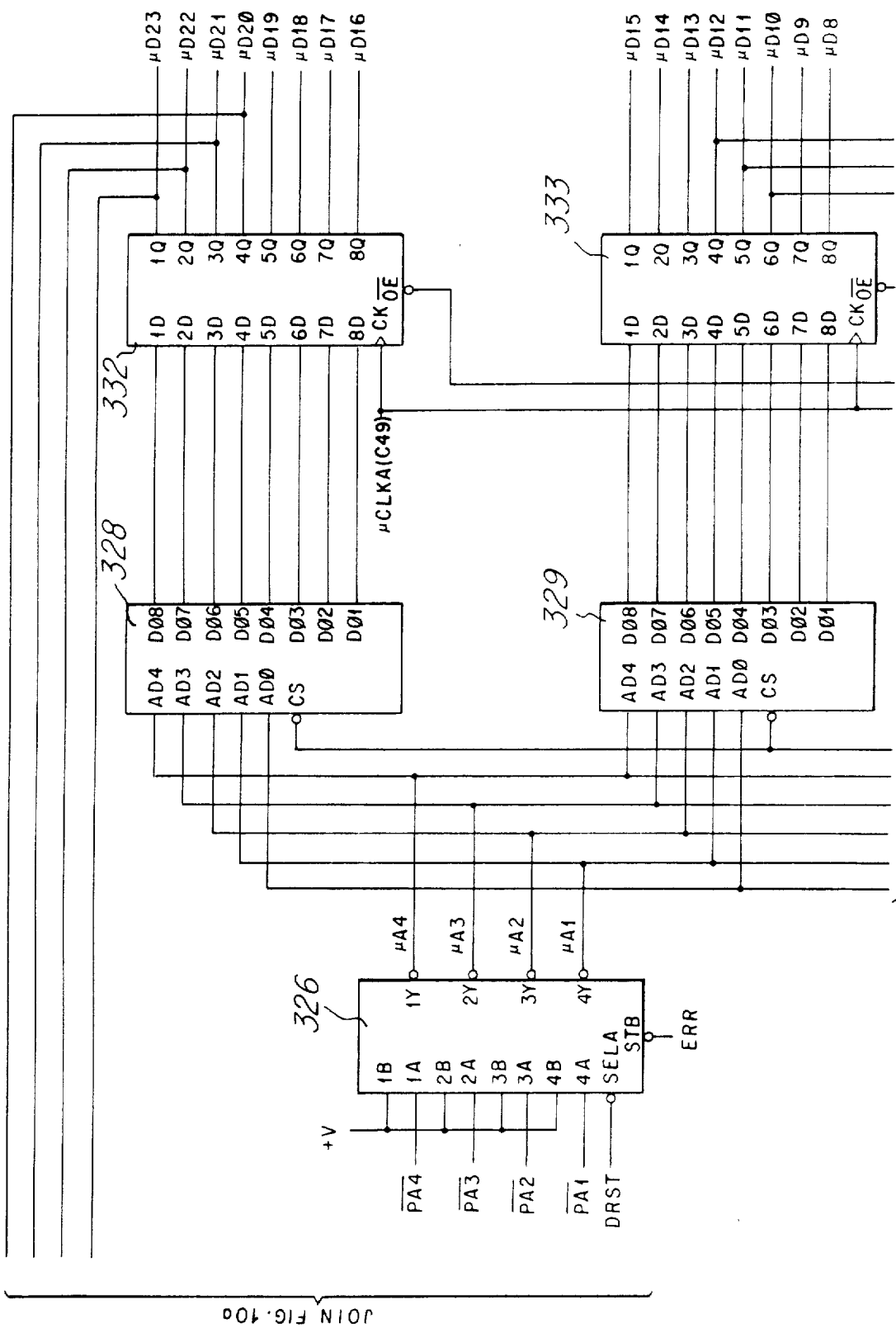
Figure 10C:
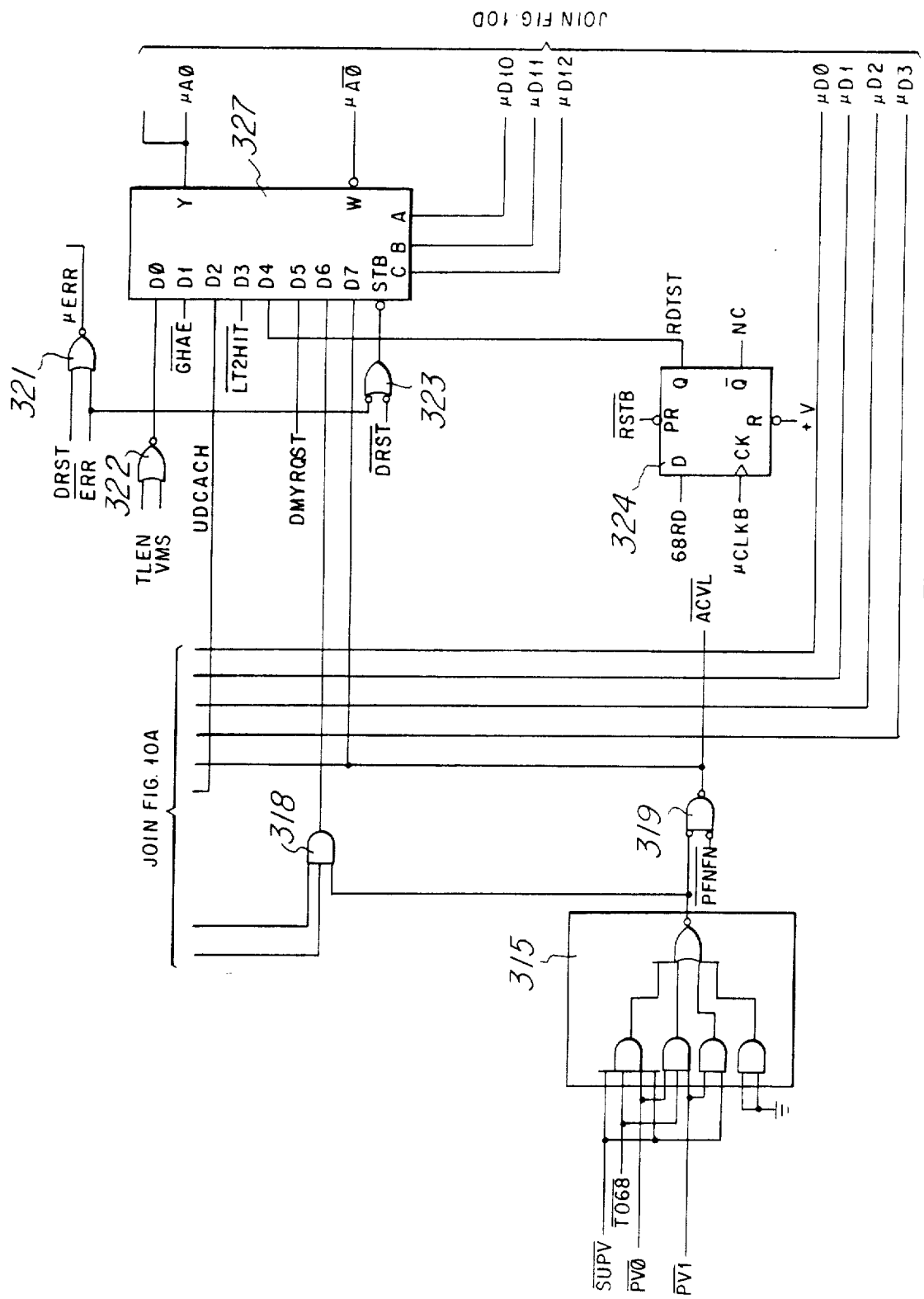
Figure 10D:
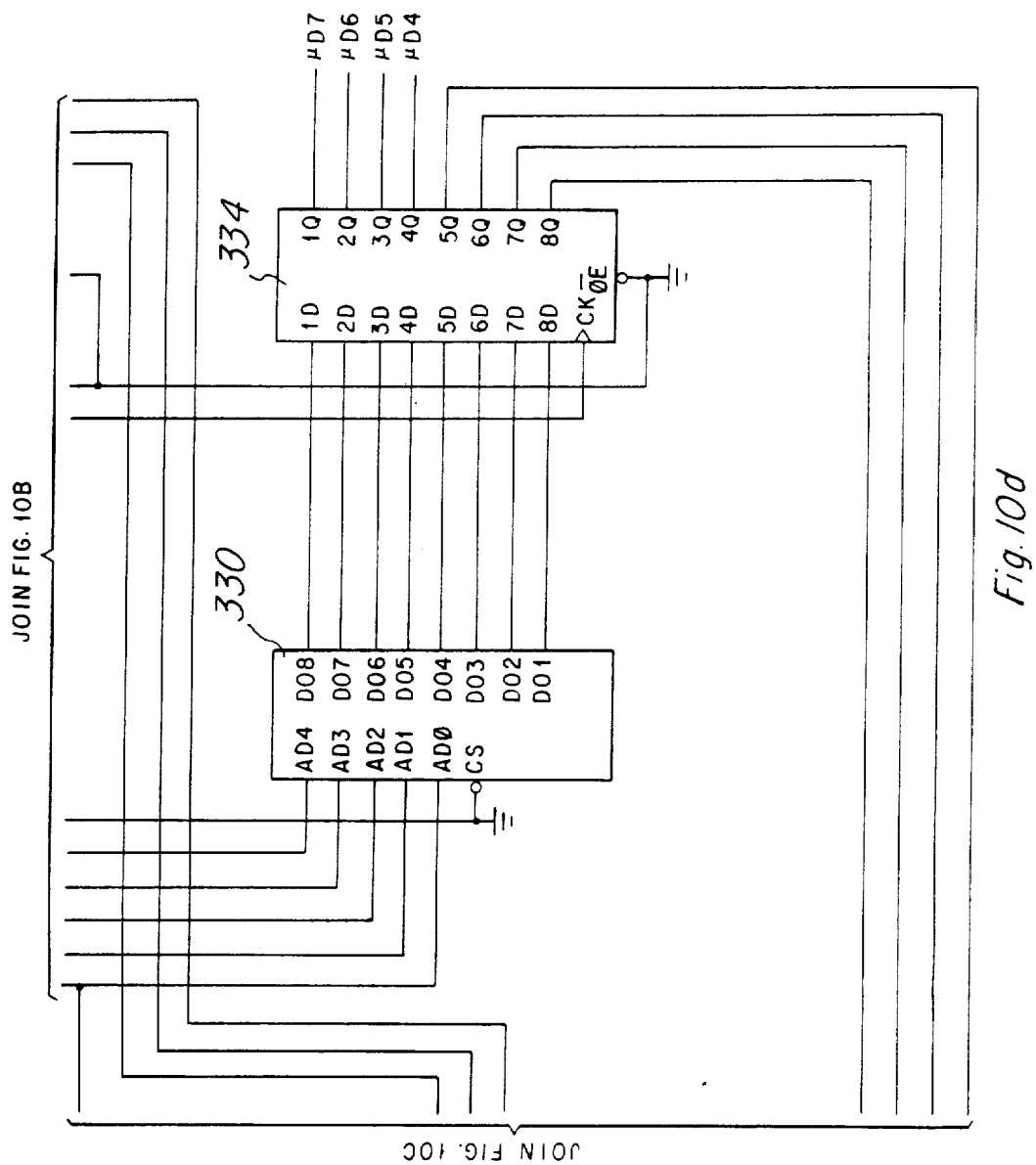
Figure 12A:
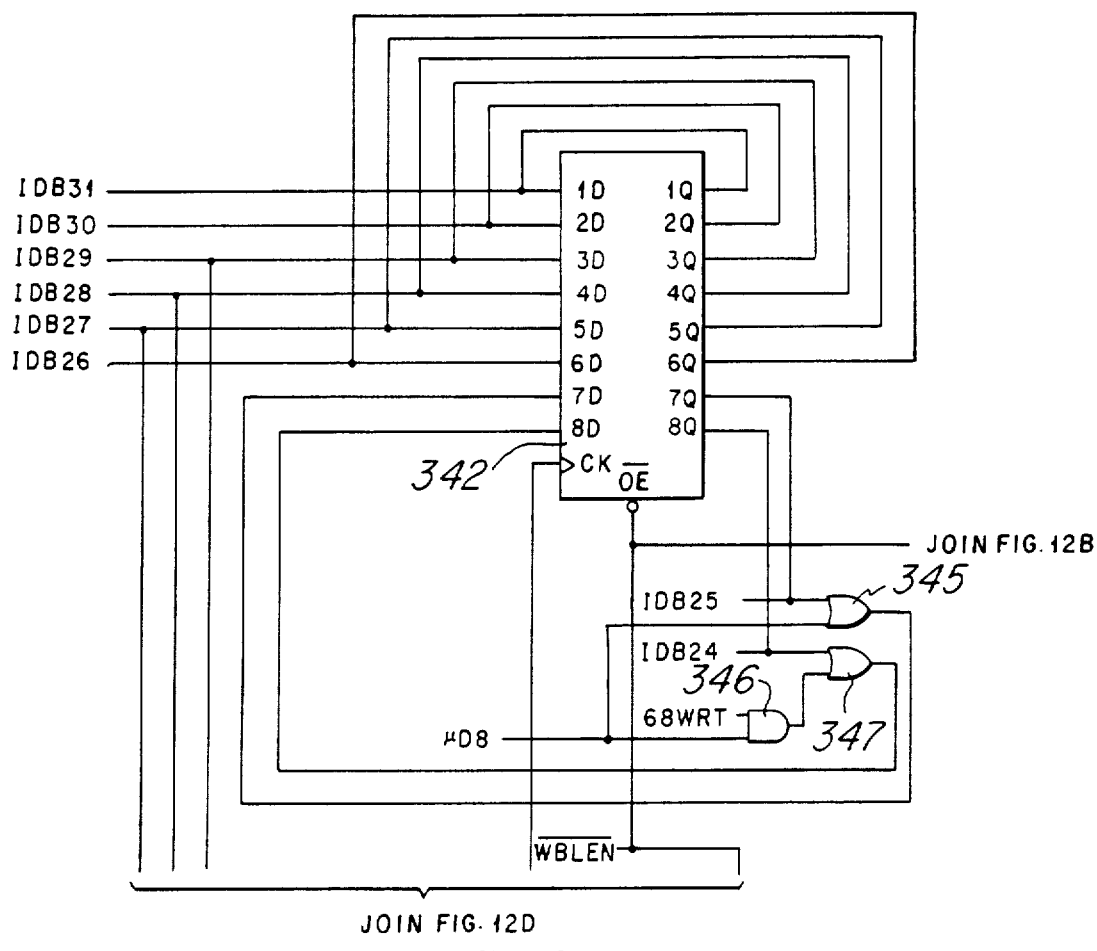
Figure 12B:
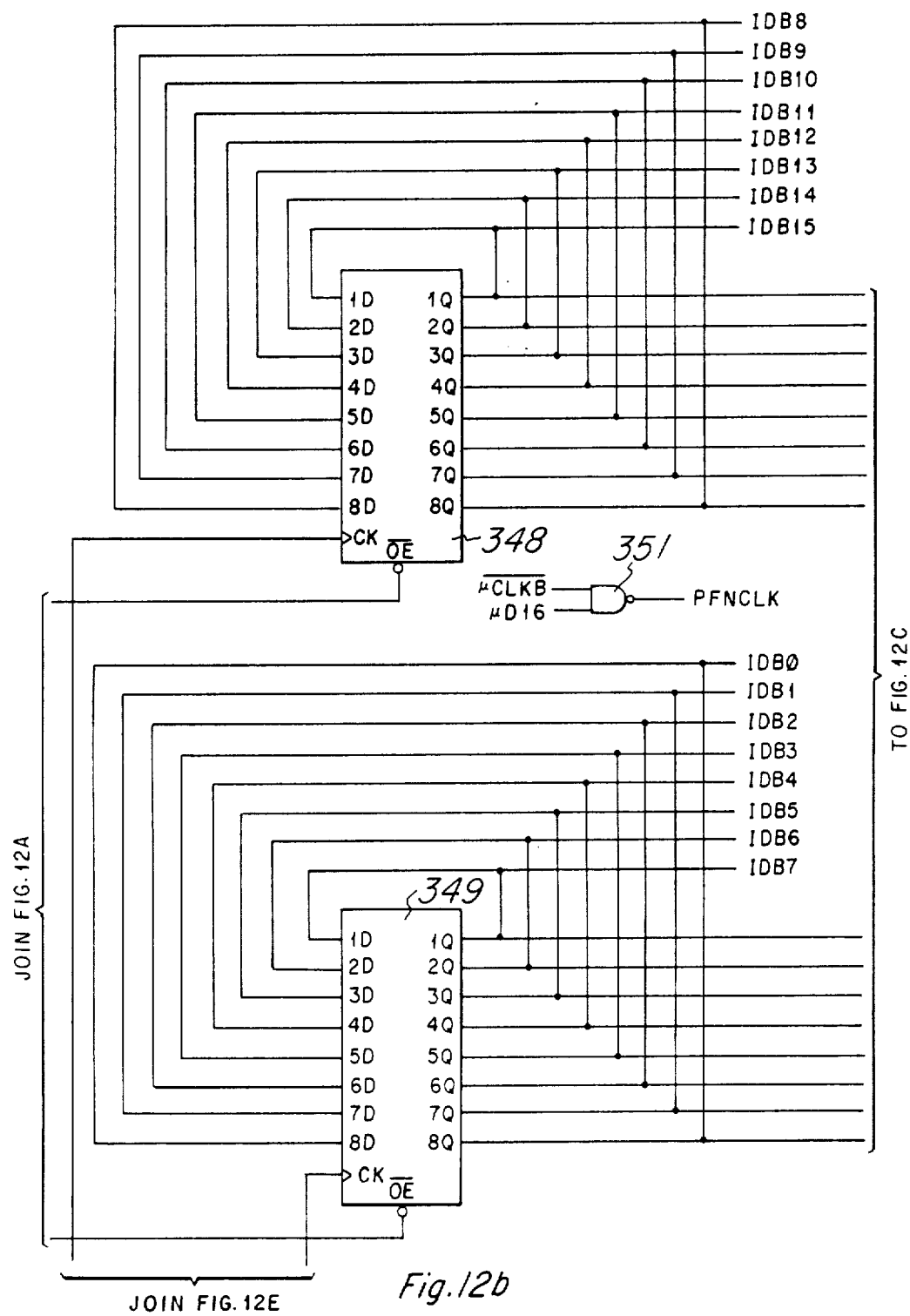
Figure 12C:
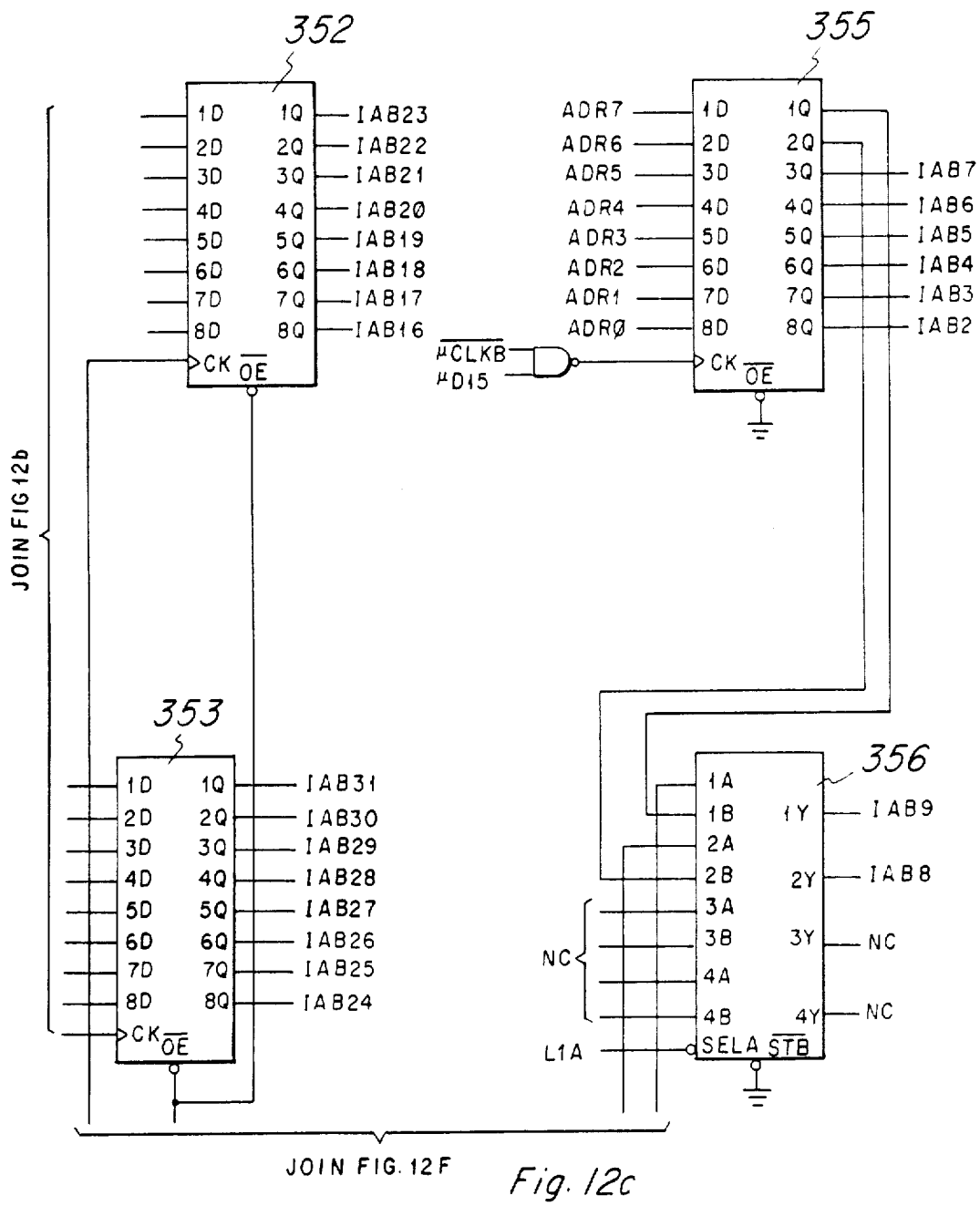
Figure 12D:
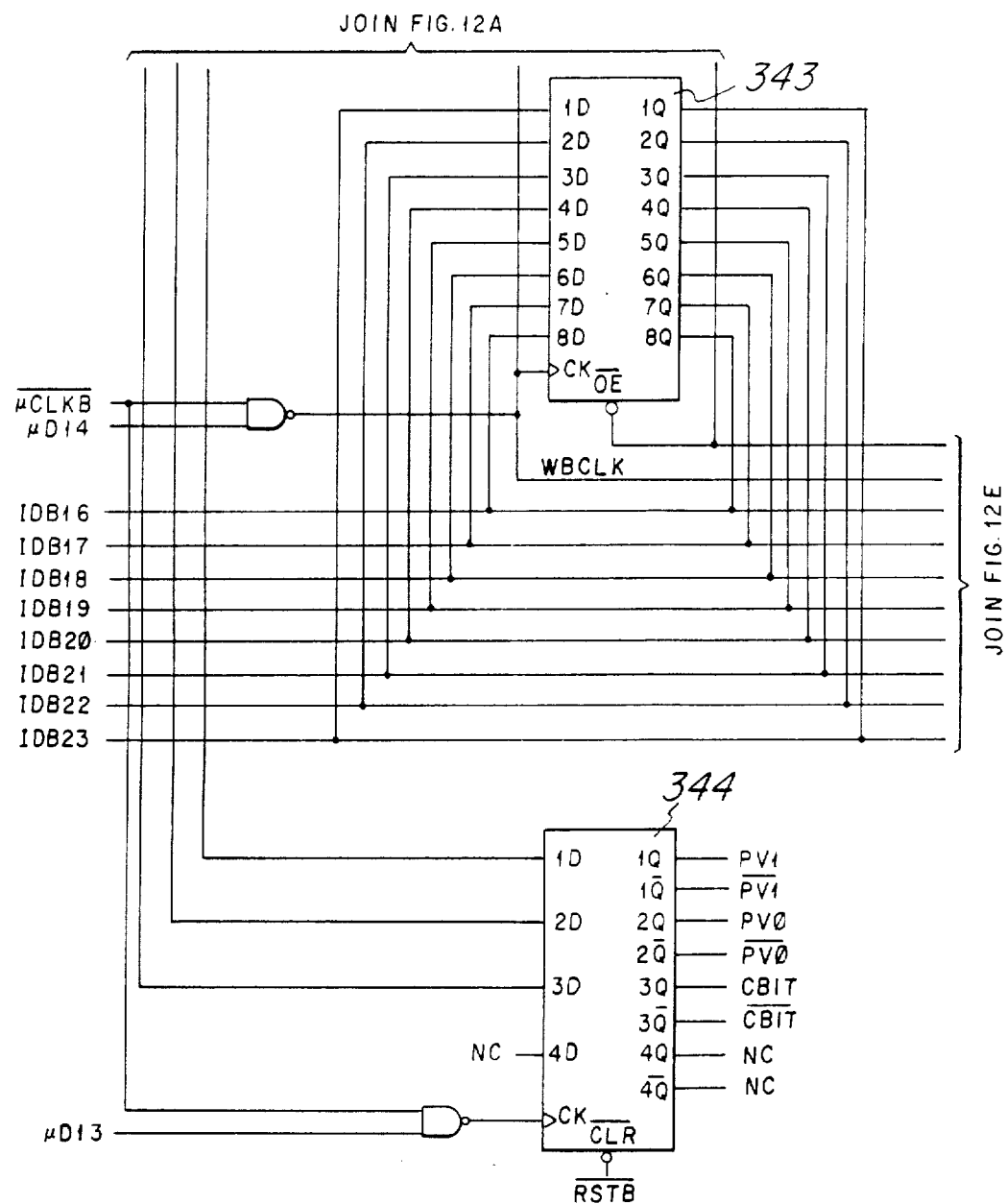
Figure 12E:
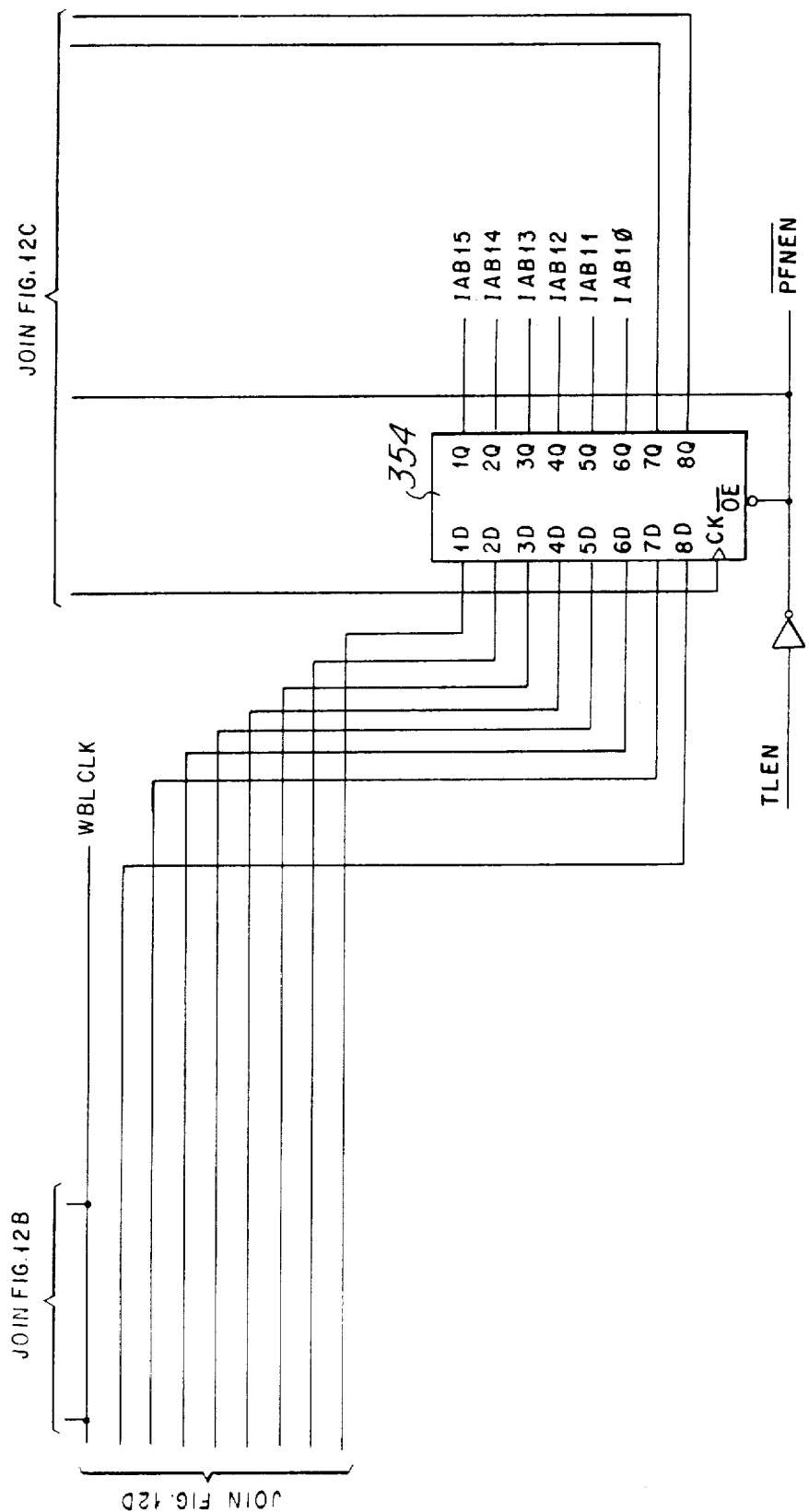
Figure 23A:
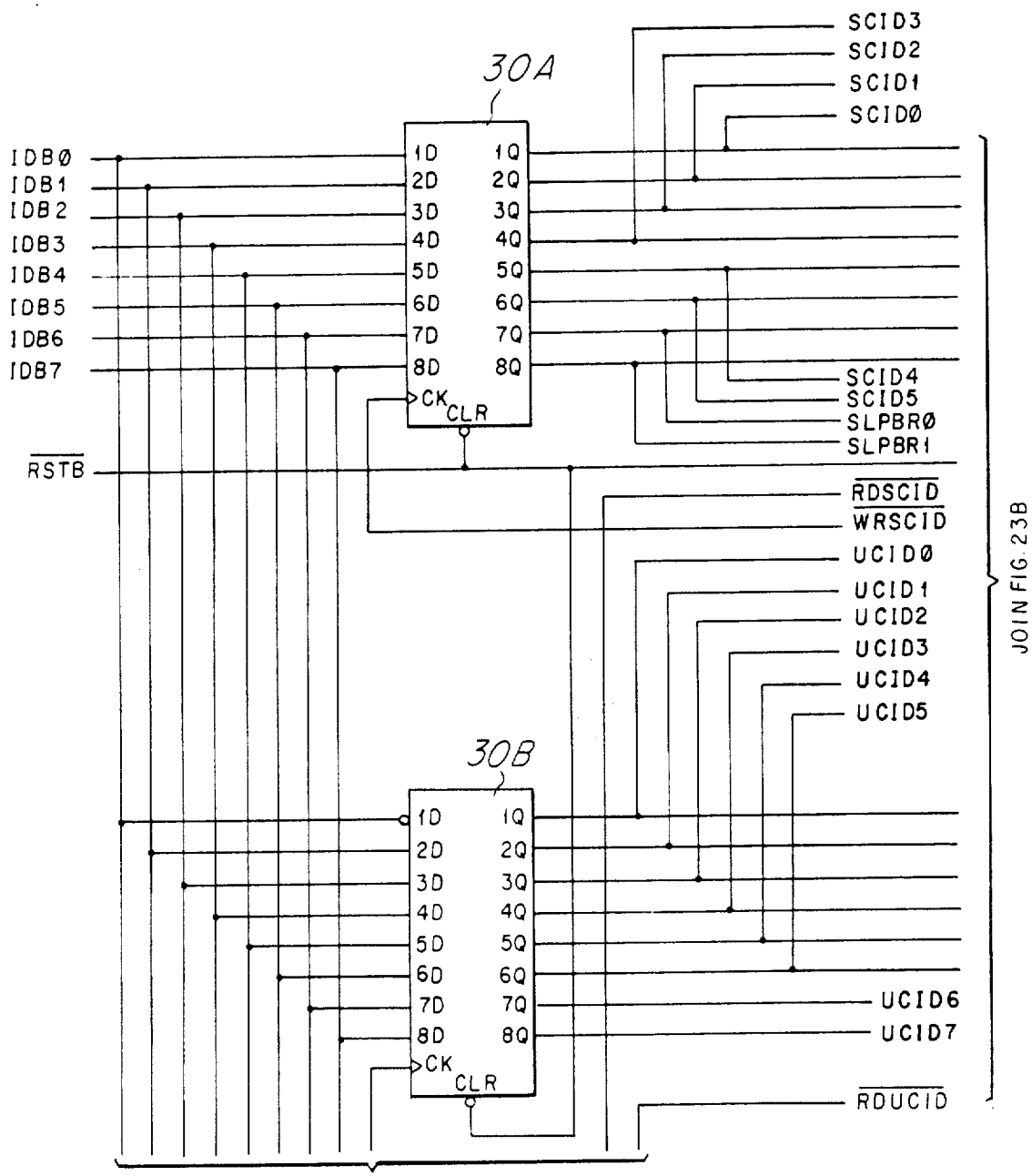
FIGS. 23A-23F illustrate generally slot decoding.
Figure 23B:
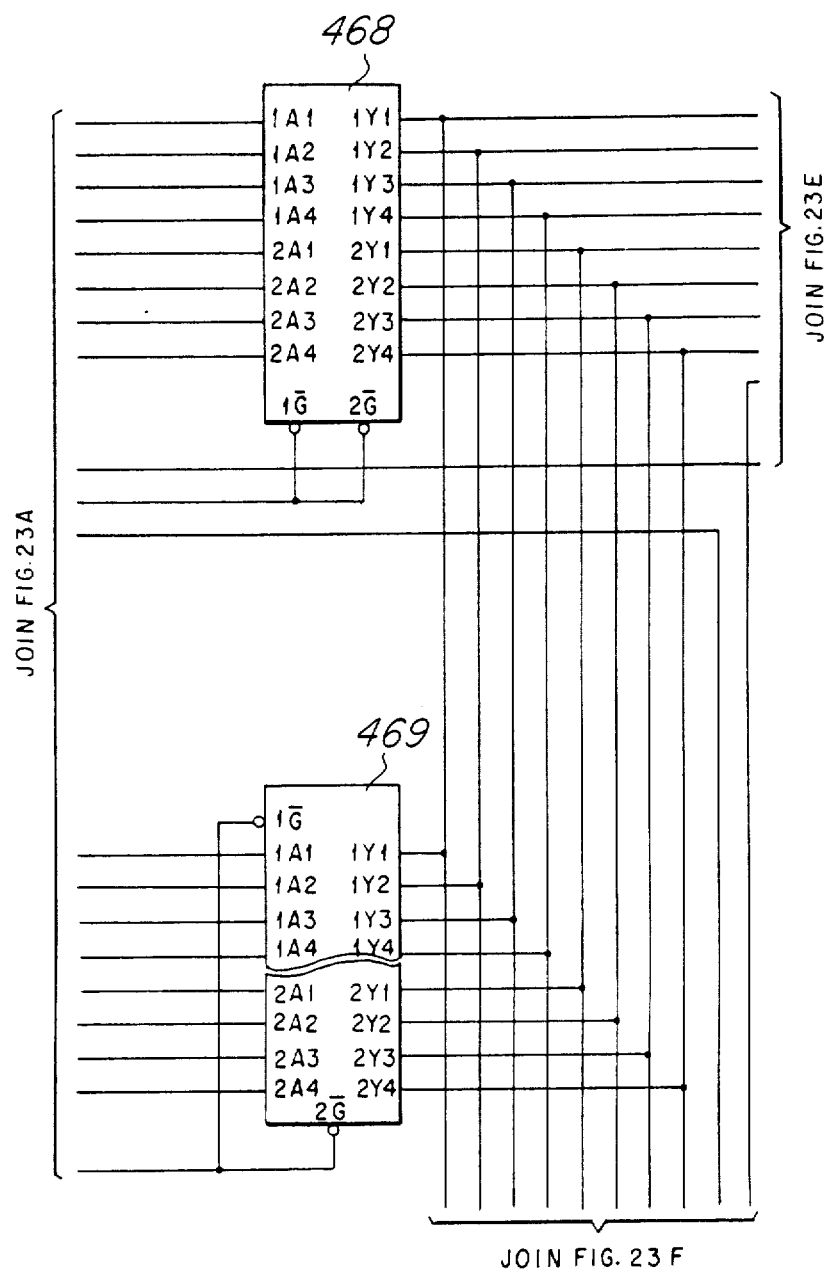
Figure 23C:
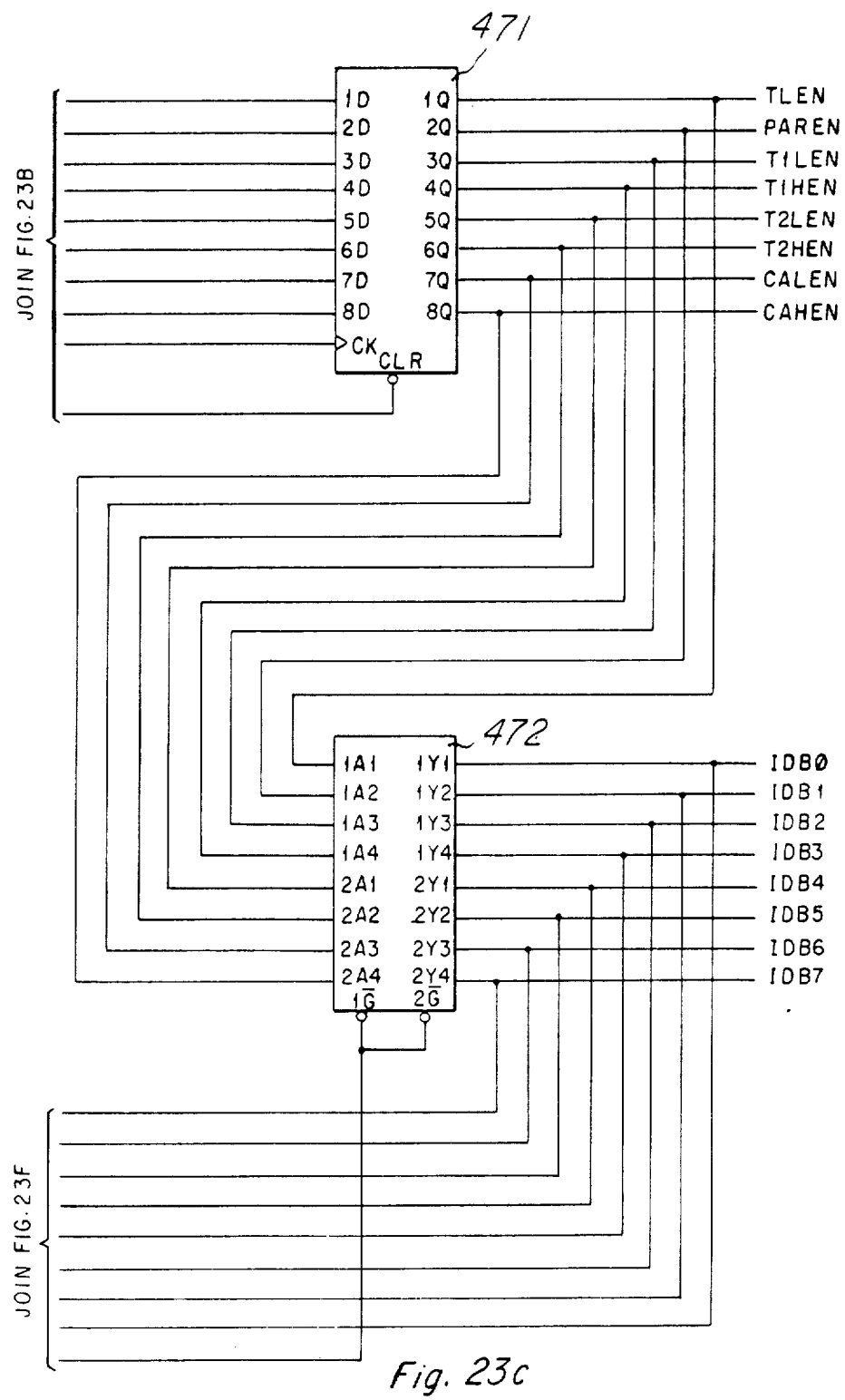
Figure 23D:
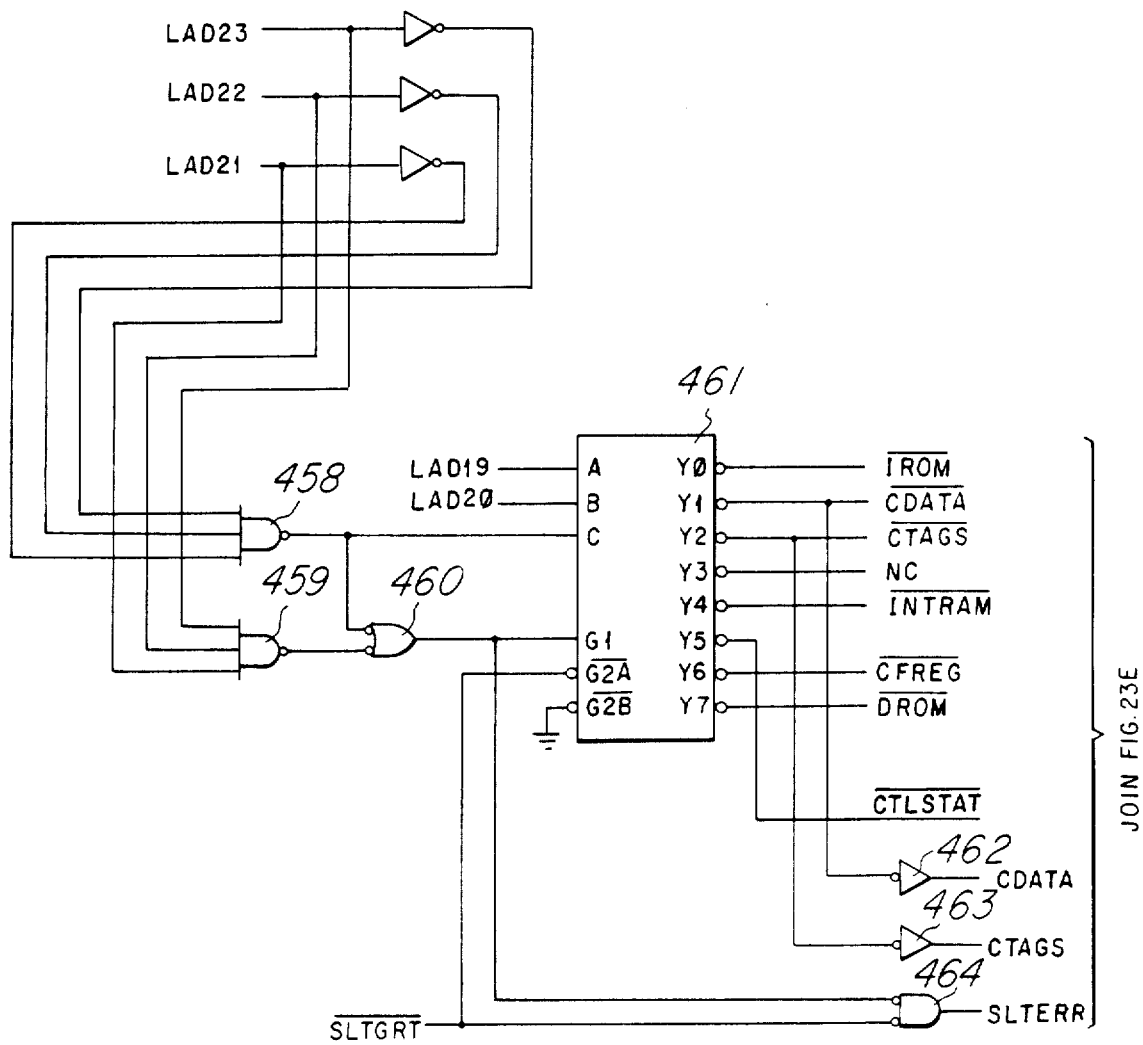
Figure 23E:
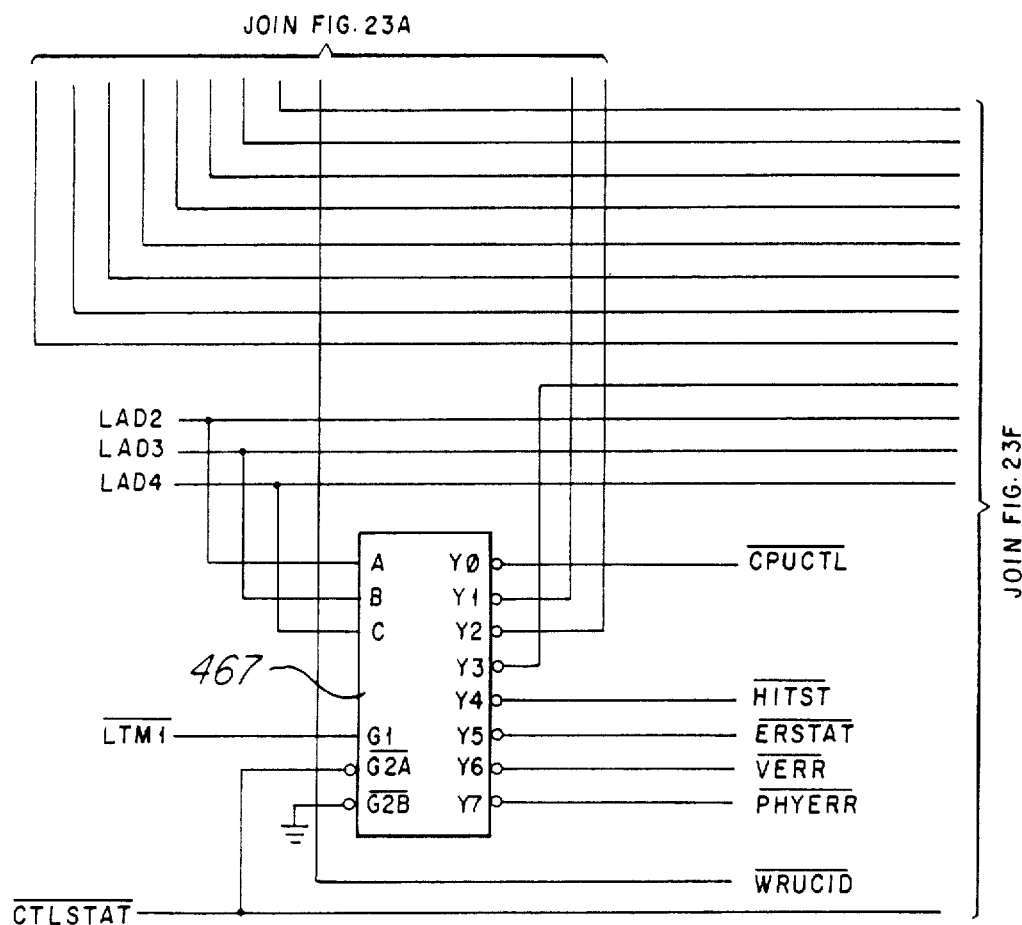
Figure 23F:
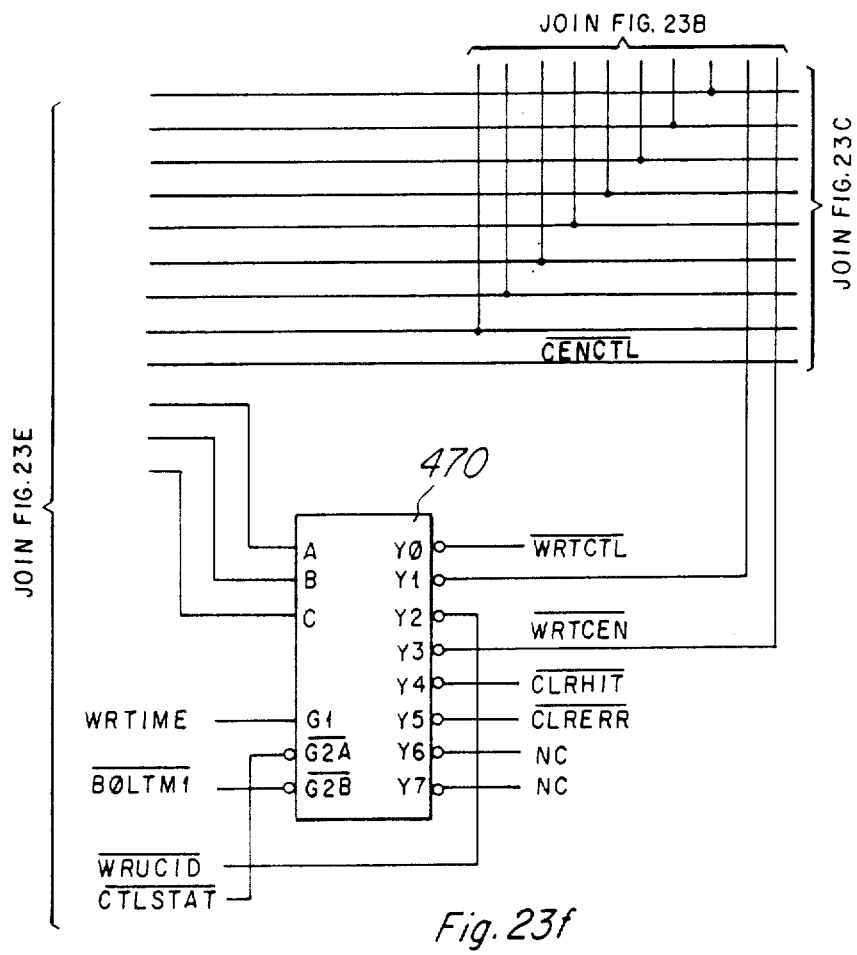

FIGS. 4A-4D, connected as shown, illustrates the addressing circuitry for the data cache 100 and translation cache 35. Signal SLTGRT from flip flop 614 shown in FIG. 7C enables both sections of the dual select multiplexers 101, 102, 103 and 104. Address signals VAB10, BVA18 (VAB18 twice inverted) and VAB11 are inputs to multiplexer 101, as shown. Address signals VAB8, VAB16, VAB9 and VAB17 are shown connected to multiplexer 102. Address lines VAB6, VAB14, VAB22 and VAB7, VAB15 and BVA 23 are as shown, connected to the inputs to multiplexer 103. Signals VAB4, VAB12, VAB20 and SLPBR1 (from flip flop array 465 of FIG. 23A) and signals VAB5, VAB13 and VAB21 are applied as shown as inputs to multiplexer 104. Signal LAD12 from the address latches of FIG. 20 is inverted through inverter 111 and provides one input to AND gate 113. Signals uD20 and uD21 provide inputs to AND gate 112 and also are connected to the A and B select inputs of each of multiplexers 101-104. The multiplexers 101-104, in this preferred embodiment, are Texas Instruments Type 74S253. Signals uD20 and uD21 are signals from the translation sequencer, specifically from flip flop array 332 shown in FIG. 10B. Also from that flip flop comes signal uD23 which is applied as one input to OR gate 116. The output from inverter 111 is applied as an input to AND gate 113. The other iput to AND gate 113 is provided by signal DSLTGRT, the Q output from flip flop 607 of FIG. 8A, the timing generation. That signal also is applied as the other input to NOR gate 116. The output of AND gate 112 provides signal CS- to the CS terminals of static RAMs 121, 122, 123, 124 and 125 as shown in FIG. 5. The outputs from AND gates 113 and 114 provide inputs to NOR gate 115 whose output is signal ADR10 which is an address input for the static RAMs of FIG. 5. Signal VAB10 is buffered through OR gate 117 and provides one input to multiplexer 105, a shown.

The outputs of terminals 1Y and 2Y of multiplexer 101 are connected to the output terminasl 1Y1 and 1Y2 of driver 107 to provide output signals ADR8 and ADR9. Inputs to driver 107 are provided by signals LAD10 and LAD11 from the address latch 434 of FIG. 20. Signals BSLTGRT and BSLTGRT- provide the output control signals to terminals 2G and 1G- of driver 106. Inputs LAD2-LAD9, from FIG. 20 provide the input singals to driver 106 whose ouptuts are signals ADR0-ADR7. The outputs on terminals 1Y and 2Y of each of multiplexers 103, 104 and 105 are connected as shown to address lines ADR0-ADR7 to provide the virtual addresses. The LAD addresses, from the address latches, provide addresses from the bus 50, which represent main memory addresses.

Figure 5A:
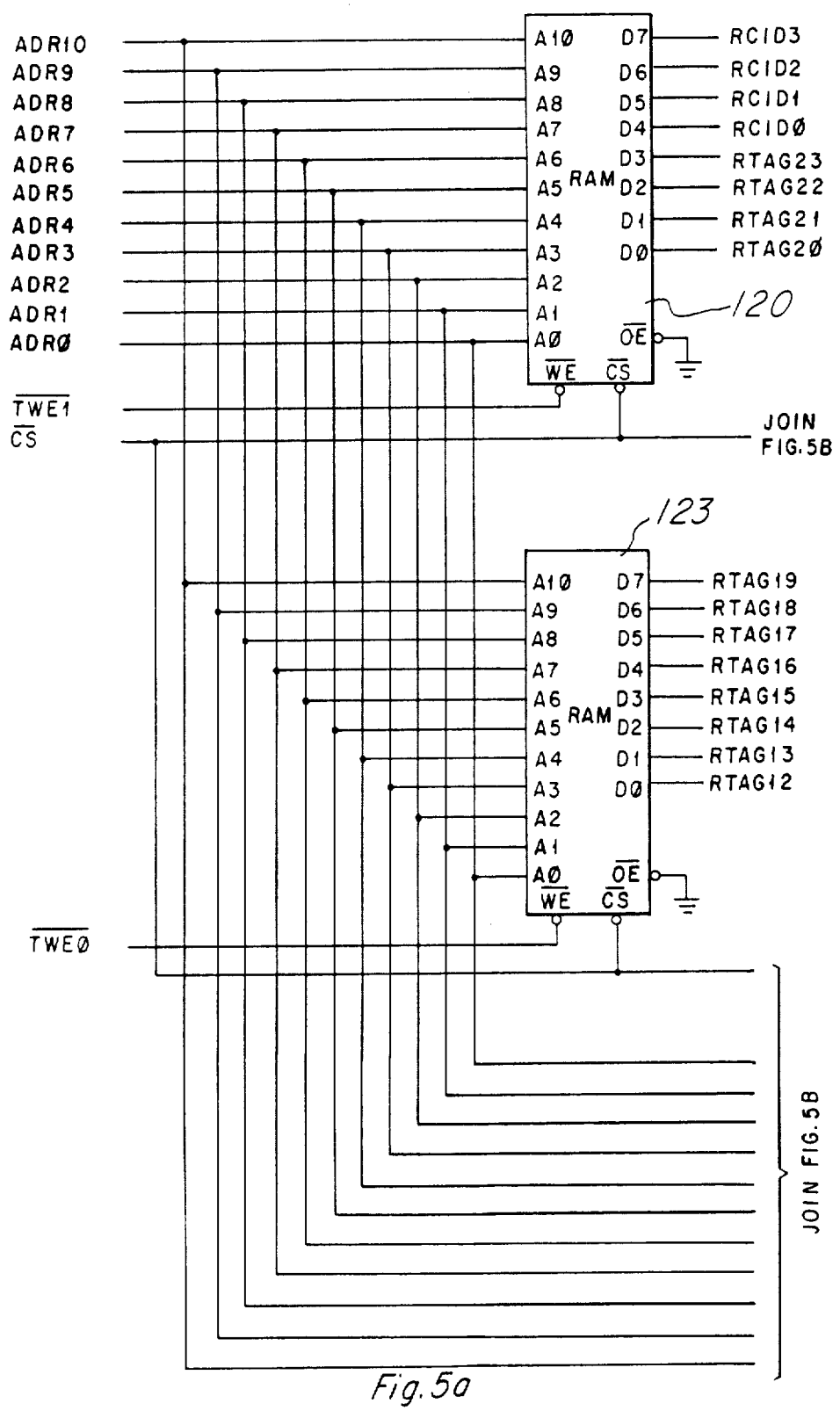
FIGS. 5A-5C together illustrate six sections (of seven) of random access memory that form the cache memory.
Figure 5B:
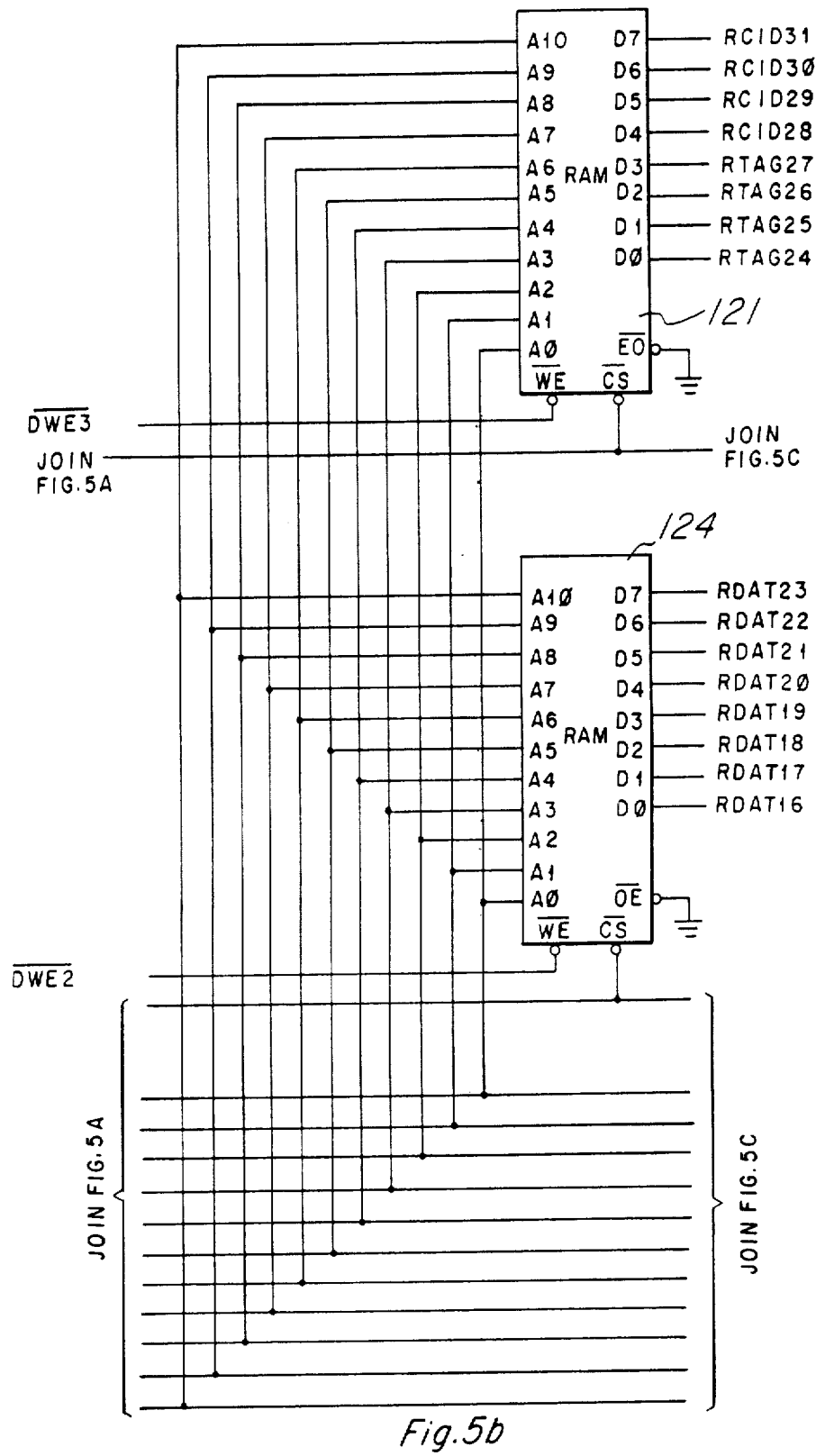
Figure 5C:
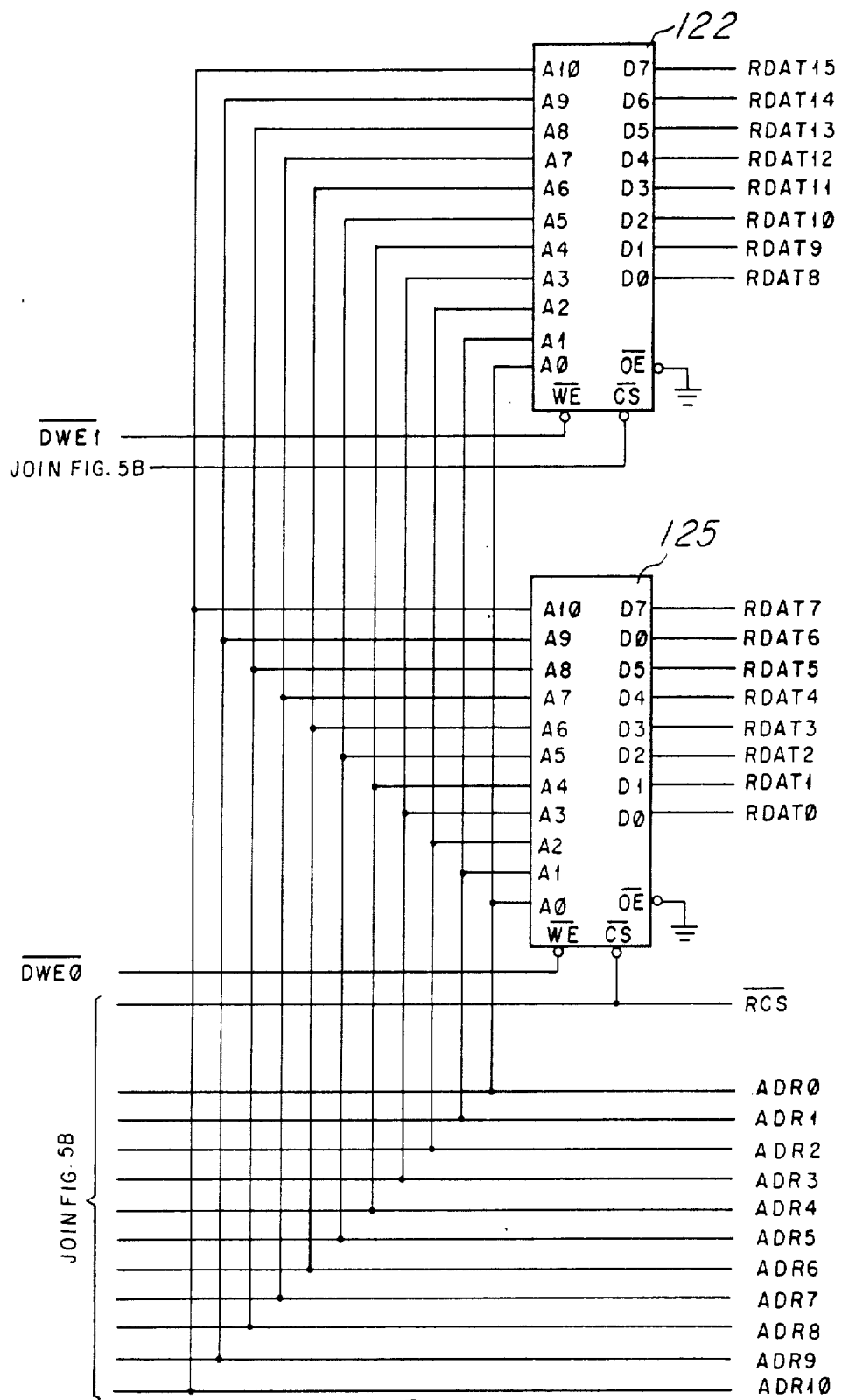
Figure 6A:
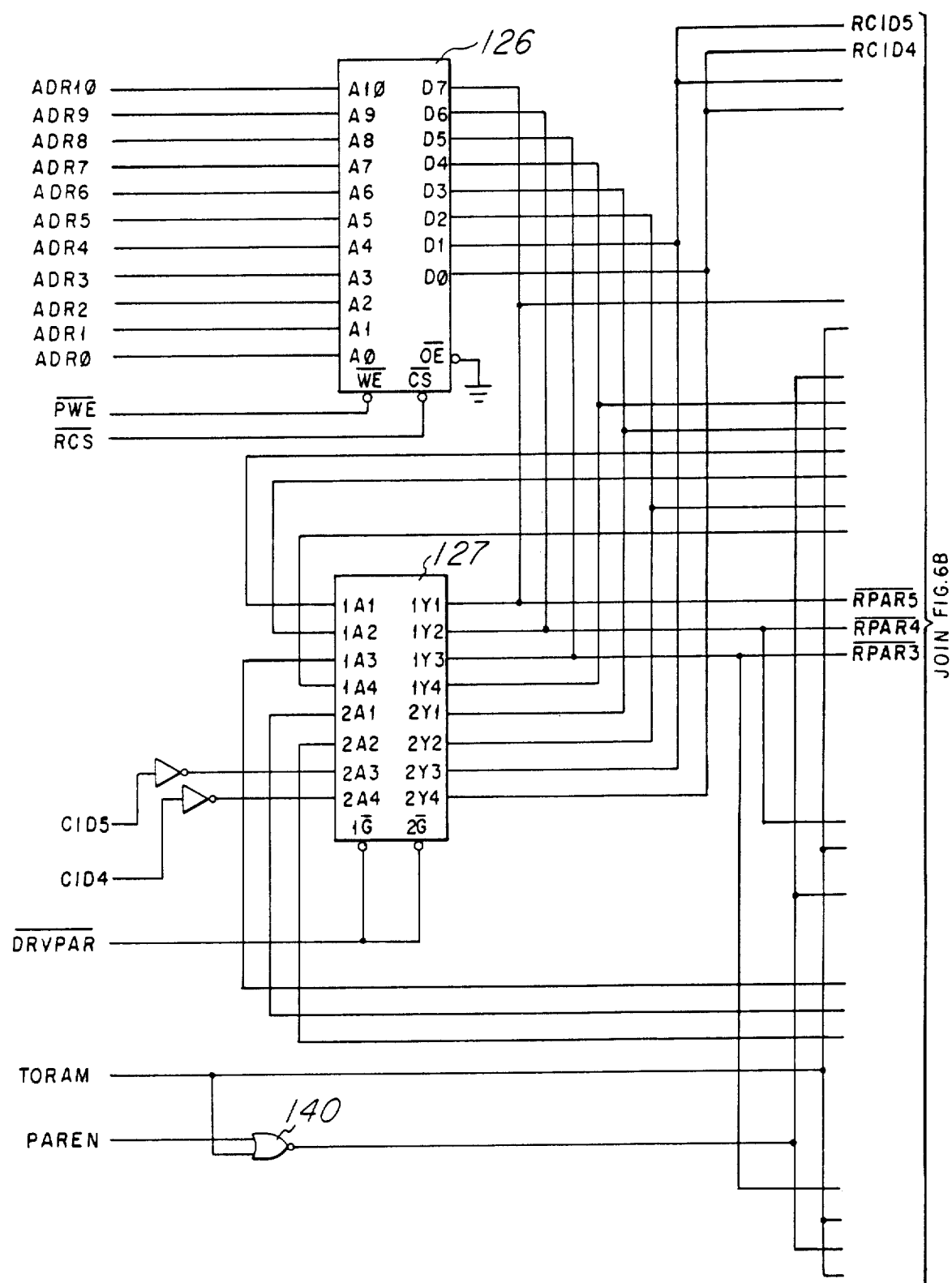
FIGS. 6A-6C together illustrate the seventh section of the cache RAM and cache parity logic circuitry.

FIGS. 5A-5C, joined as shown, show 6 of the 7 units forming the cache memory. The seventh unit, RAM 126, is shown in FIG. 6A, for parity generation. All of RAMS 120-126 are, in this preferred embodiment, Type 2018 from Toshiba Company and are 2K×8. These RAMs operate at a speed of approximately 45 nanoseconds to allow the selected CPU to run with no wait states. This combination is, of course, a design choice and is not a limiting one. Address lines ADR-1-ADR10 are applied to the A0-A10 inputs respectively of each of RAMs 120-126. RAM 123 provies outputs RTAG 12-RTAG 19 on outputs D0-D7, respectively. RAM 120 provides outputs RTAG20-R-

TAG23 and RCID0-RCID3. RAMs 125, 122, 124 and 121 provide outputs RDAT0-RDAT31, in the order presented.

Figure 6B:
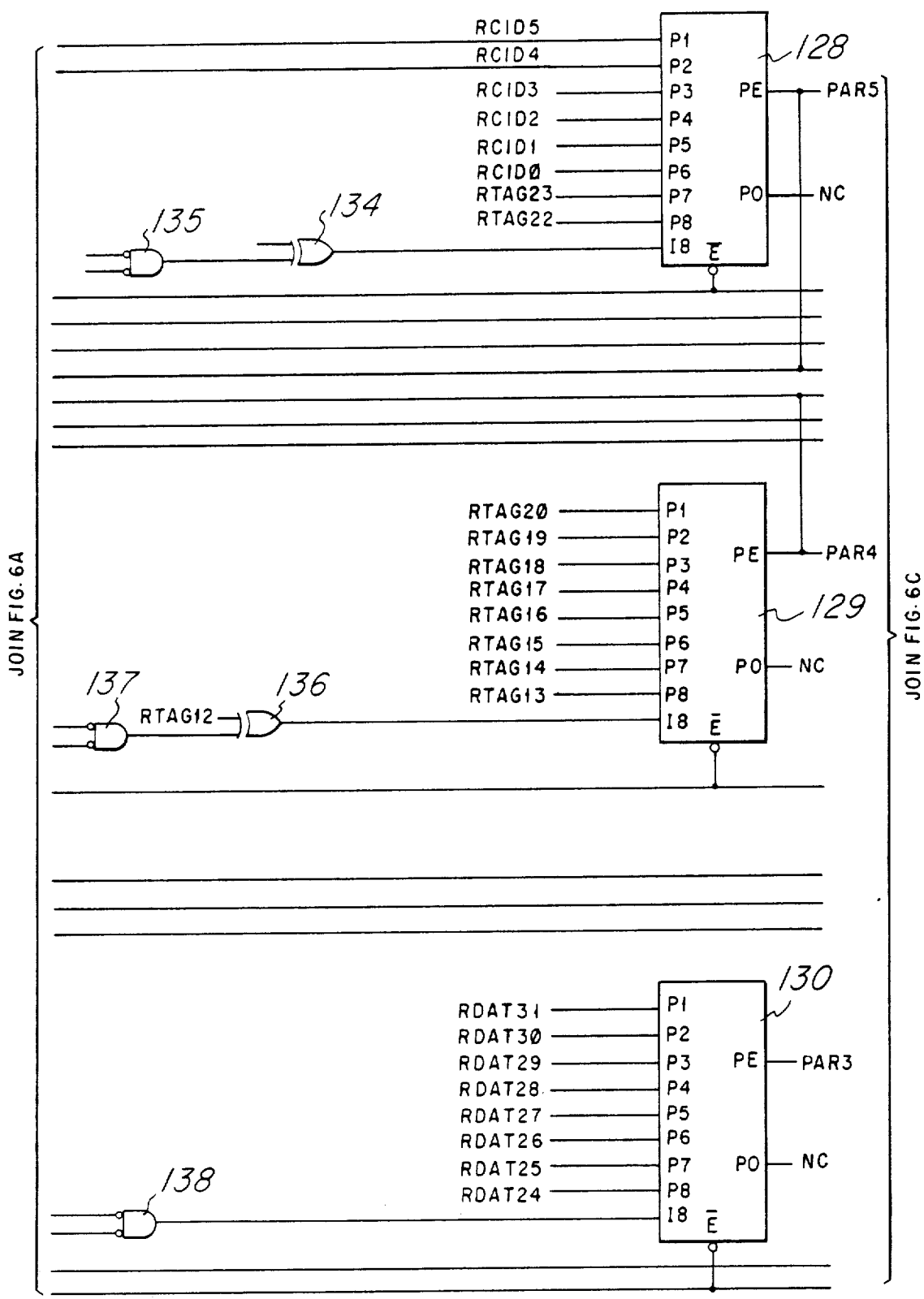
Figure 6C:
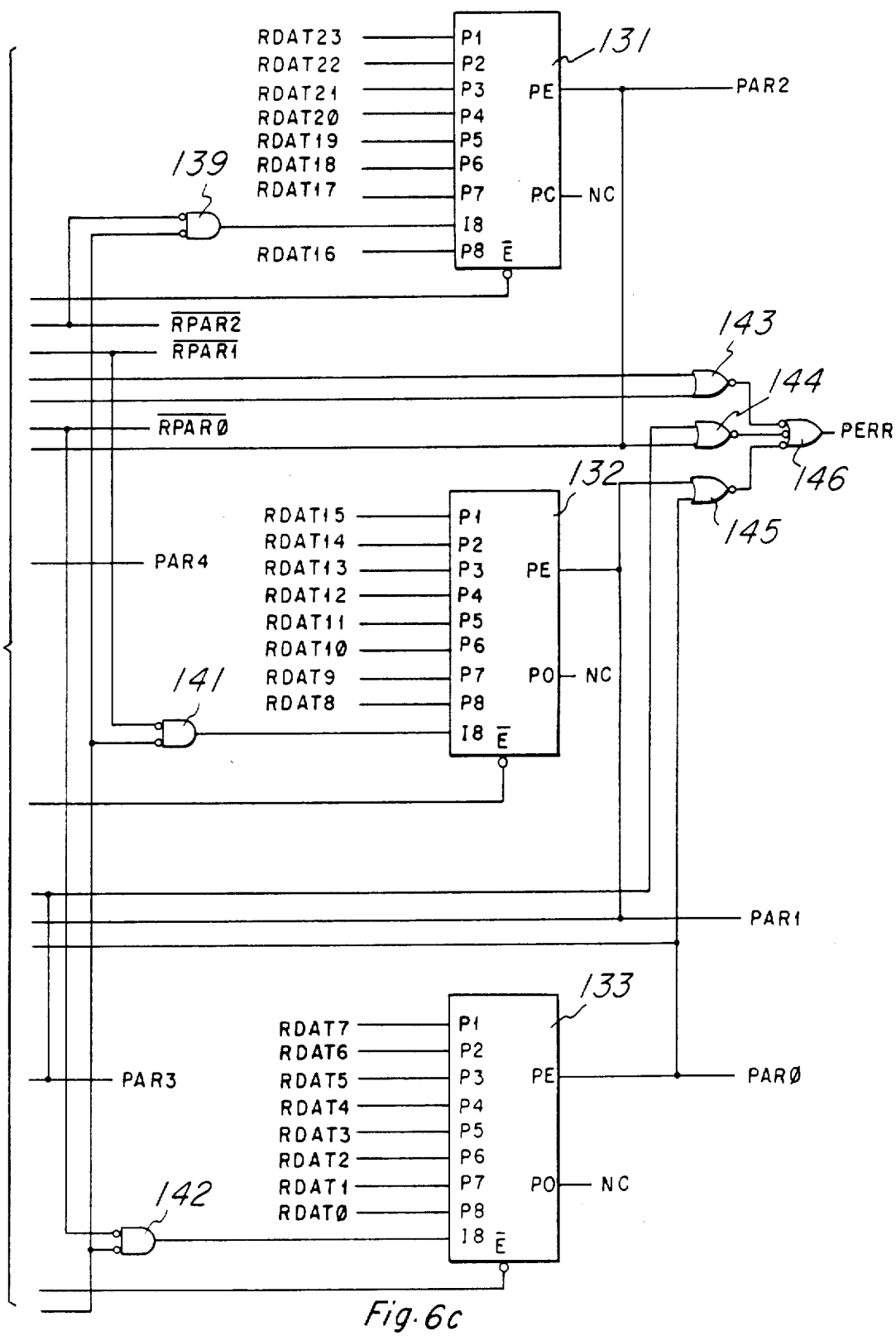

FIGS. 6A, 6B and 6C, when joined as shown, illustrate the cache parity logic. Parity logic generators 128, 129, 130, 131, 132 and 133 provide outputs PAR5, PAR4, PAR3, PAR2, PAR1 and PAR0, respectively. NOR gates 143, 144 and 145 each receive two of these outputs from the parity generators and provide inputs to NAND gate 146 so that any output from the parity generators results in an output from NAND gate 146, the signal PERR.

FIGS. 7A-7E, when joined as shown, form a schematic of the cache "hit" logic. Comparator 151 compres CID0-CID5 with RCID0-RCID5. THe comparator therefore compares the contents of the CID register 30 with the contents of the cache memory at the selected virtual address. Comparator 152 compares virtual addresses VAB19-VAB23 with the virtual addresses from the cache memory, RATG19-RATG23.

Comparator 153 compares virtual addresses VAB1-2-VAB18 with cache virtal addresses RATG-12-RATG18. Referring to FIG. 28, it is shown that the 24 bit virtual address is divided into segments of 6, 8 and 10 bits. The upper six bits, input to comparator 152, are associated with a level 1 page table and the 8 bits input to comparator 153 are associated with the level 2 page tables. These will be discussed in detail in the Mode of Operation. The negated output from comparator 151 provides an input to each of NOR gates 159, 174 and 176. The negated output from comparator 152 provides an input to each of NOR gates 174 and 176. The negated output from comparator 153 provides an input to NOR gate 176.

Signal VAB23 is inverted twice, through inverters 154 and 155, providing signal BVA23 which provides one input to AND gate 156. The other input is provided by signal TIHEN of flip flop 471 of FIG. 23. Signal T1LEN from that flip flop provides one input to AND gate 157 whose other input is provided by the output from inverter 154. AND gates 156 and 157 form the inputs to NOR gate 158 whose output provides another input to NOR gate 159. Signal RAMRD (the output from AND gate 215 of FIG. 27) and signal uD21-, (inverted from the sequencer shown in FIG. 10) provide the inputs to NAND gate 170 which provides an input to NOR gate 159. Signals uD20-and uD21, both micro data bits frm the sequencer, provide inputs to NAND gate 175 and signal uD20- provides another input to NOR gate 159. Signal PERR, discussed above, provides inputs to NOR gates 159, 174 and 176. NAND gate 175 receives its final input from signal RAMRD. The output from NAND gate 175 provides another input to NOR gate 174.

Virtual address VAB11 is inverted through inverter 183 and through inverter 184 to provide signal BVA11, which signal provides an input to AND gate 185. The output from inverter 183 provides an input to AND gate 186. Signal CAHEN from flip flop 471 of FIG. 23 provides another input to AND gate 185. Signal CALEN from flip flop 471 provides an input to AND gate 186. Signal VMS- from the Q-output of flip flop 169 provides inputs to each of AND gates 185 and 186. the outputs from these AND gates ar einput to NOR gate 187 whose output serves as an input to NOR gate 176.

Signal T2HEN from flip flop 471 provides an input to AND gate 177 and signal T2LEN from slip flop 471 provides an input to AND gate 178. Signal VAB18 is inverted through-inverter 181 to provide an input to AND gate 178. It is inverted again through inverter 182 to provide signal BVA18 and also to provide aninput to AND gate 177. These two AND gates provide inputs to NOR gate 179 whose ouptut provides the final input to NOR gate 174.

The output of NOR gate 159 is signal T1 HIT. The output from NOR gate 174 is signal T2 HIT. The output from NOR gate 176f is CACHIT.

Signal T1 HIT sets flip flop 160; signal T2 sets flip flop 189; signal CACHIT sets flip flop 191. The output from flip flops 160, 189 and 191 are signals LT1 HIT, LT2 HIT (and the inversion) and LCACHT.

Flip flop 165, with the associated logic circuitry as shown, provides output signals GHRSTA- and signal GRSTA on its Q and Q- outputs, respectively. Signal GHRSTA- provides the reset input to flip flops 160, 189 and 172. Signal GHRSTA provides the K input to flip flop 169. Signal GHRSTB- (the inversion of signal GHRSTA) provides the reset input to flip flops 191 and 173.

Figure 8D:
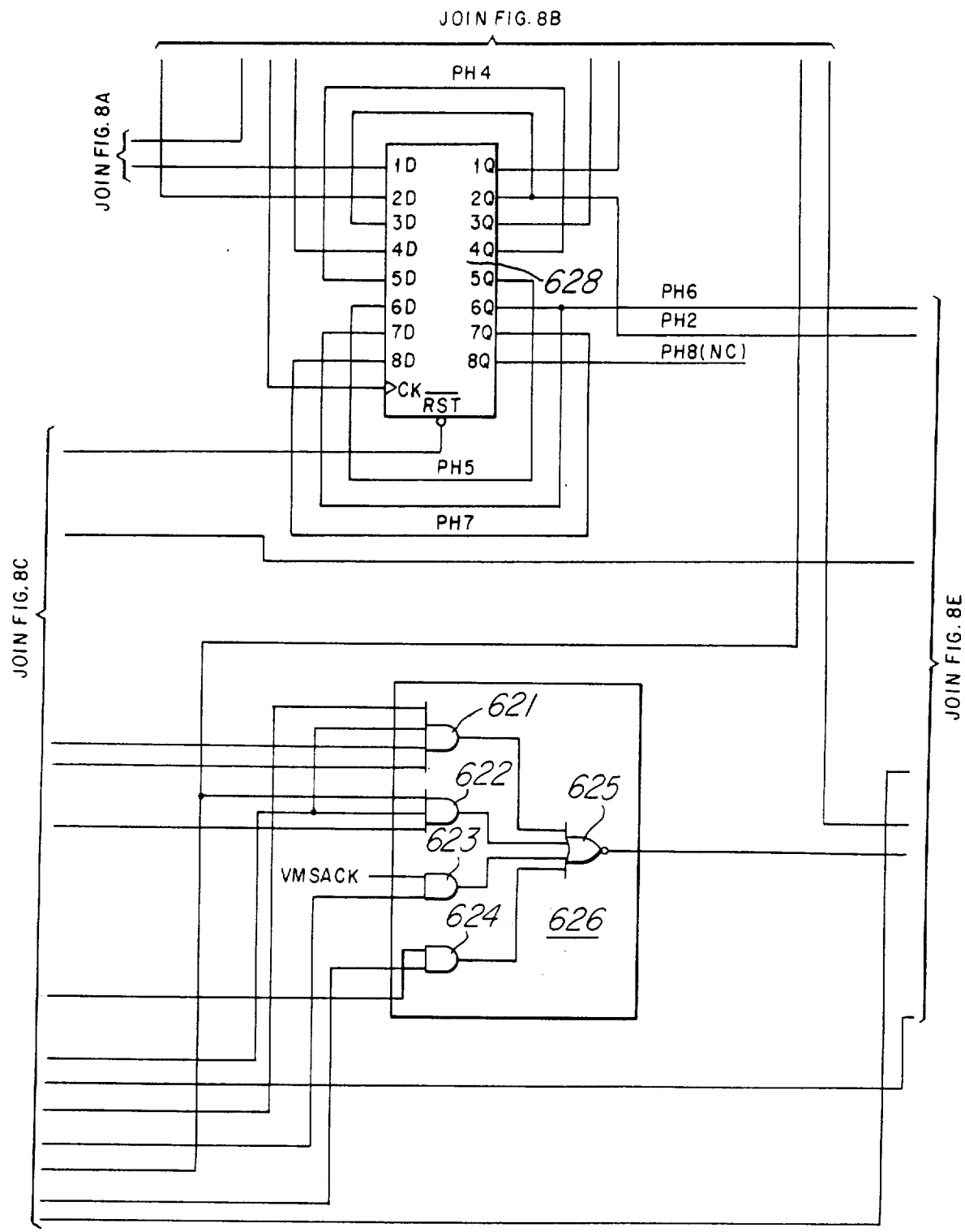
Figure 8E:
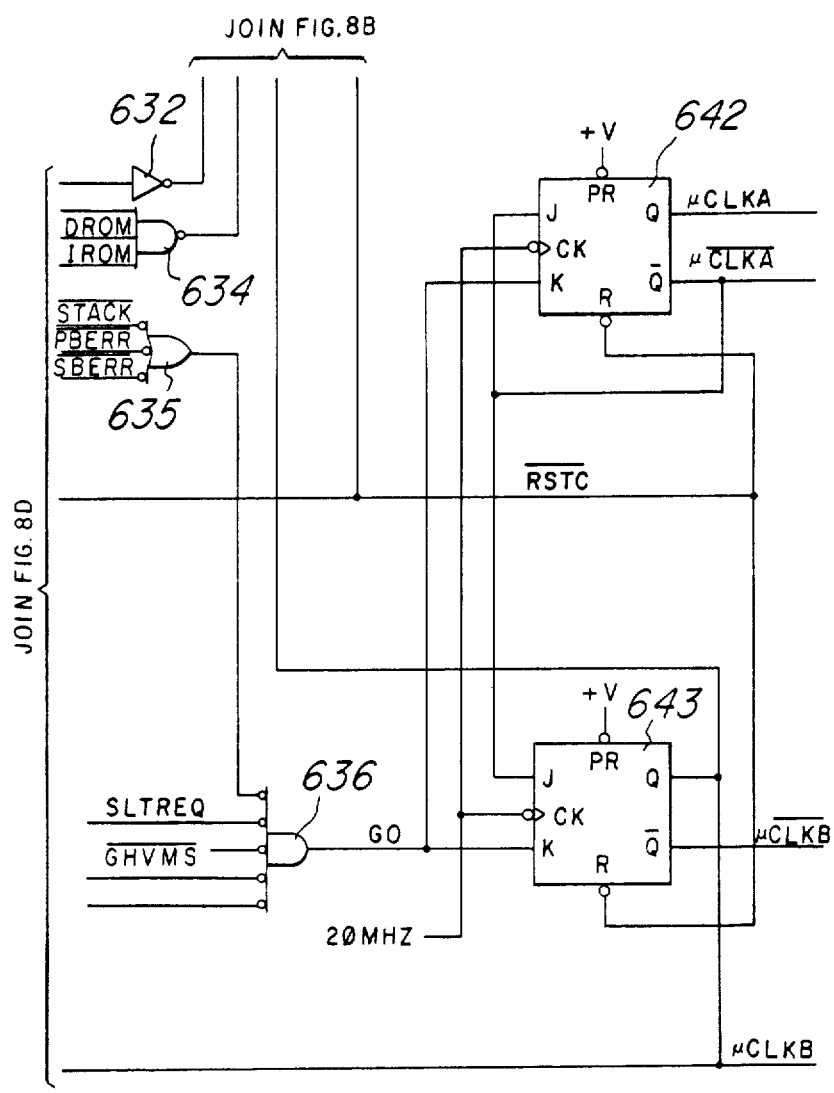
Figure 16A:
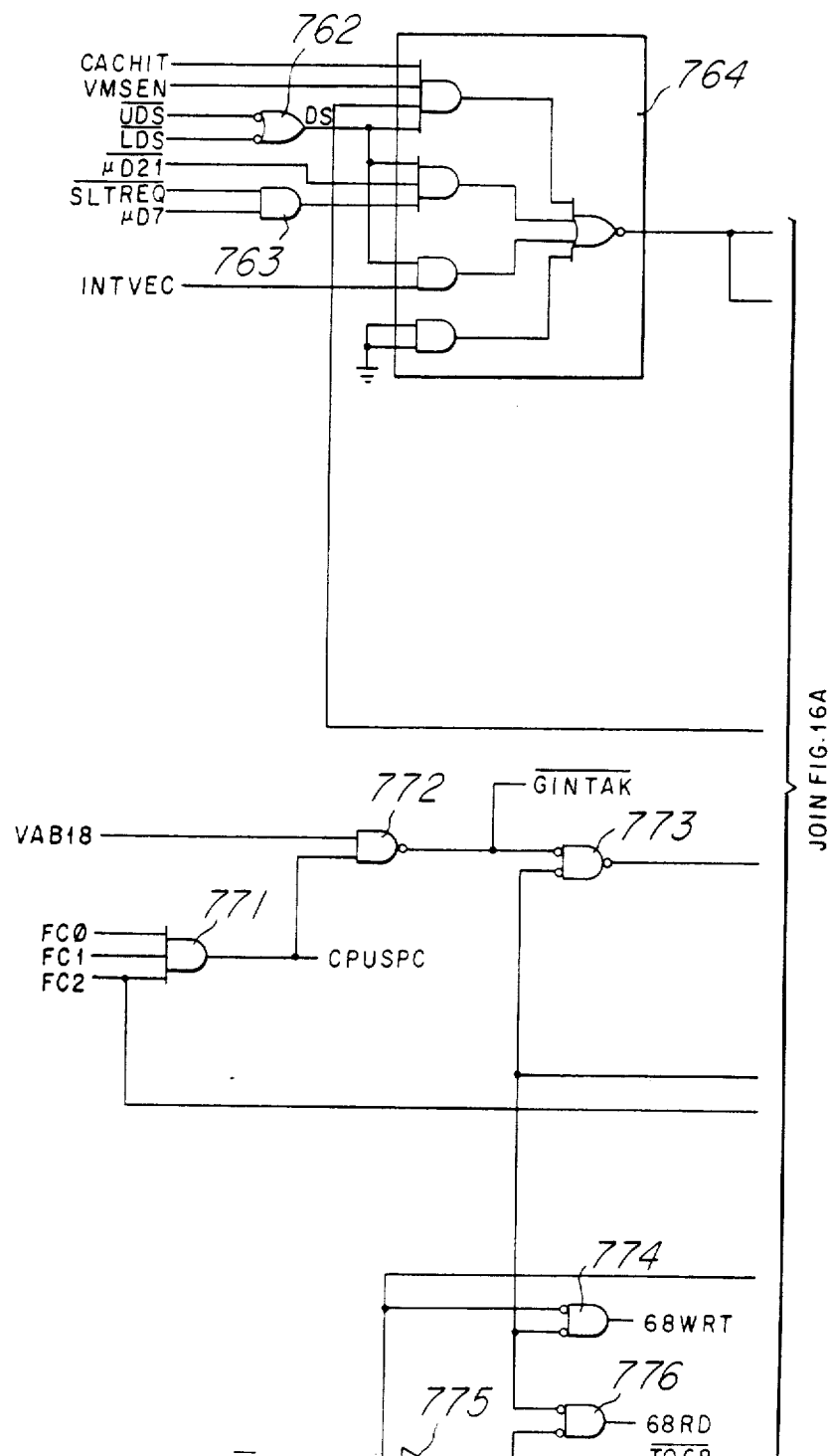
FIGS. 16A-16D schematically illustrate tag drivers, cache identification multiplexer, and other miscellaneous circuits.
Figure 16B:
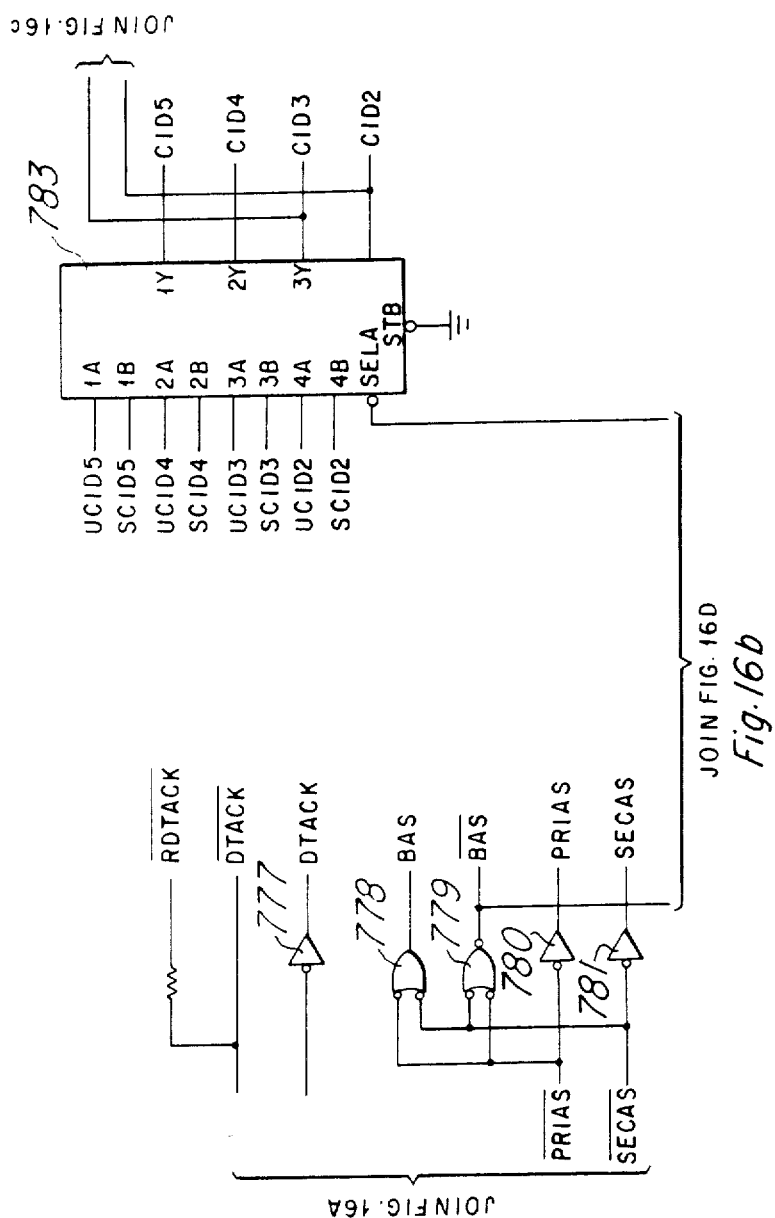
Figure 16C:
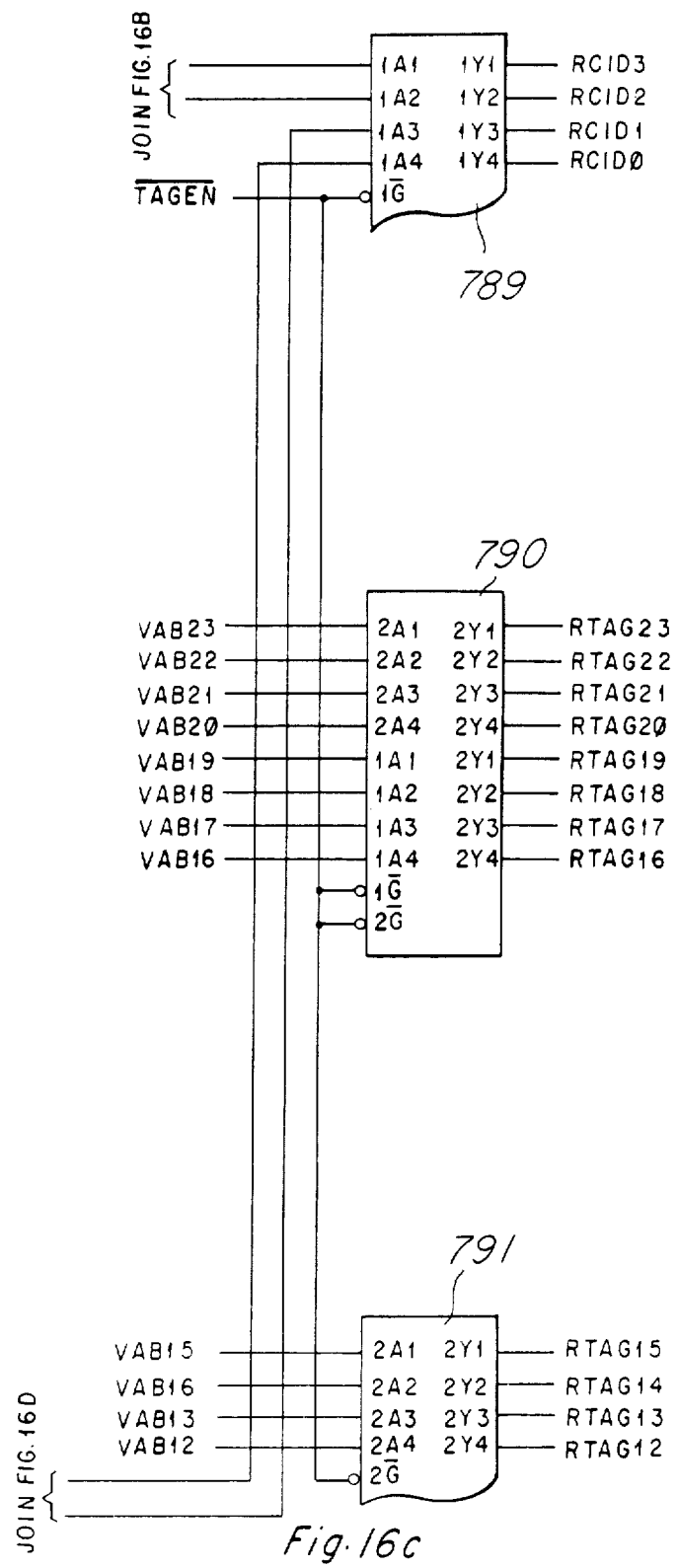
Figure 16D:
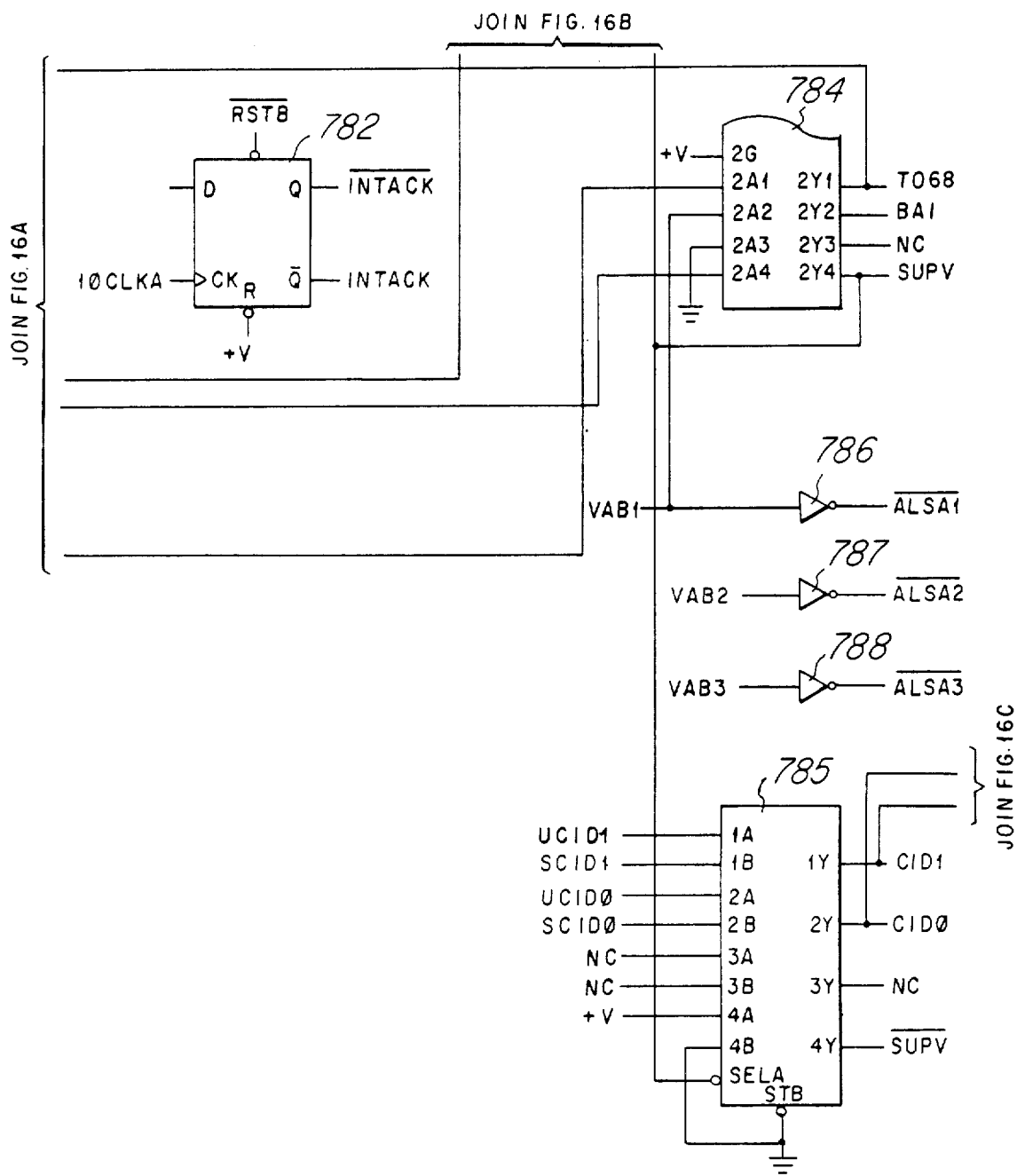

The D input to flip flop 192 is provided by OR gate 193 whose inputs are signals SLTREQ, the Q output of flip flop 608 from FIG. 8, and CPUSPC, generated by the CPU. The Q output from flip flop 192 provides signal VMSEN- which provides an input to NOR gate 168. AND gate 166 has signal CACHIT as one input and siganl TO68 form FIG. 16C. The output of AND gates 166 and 167 provide inputs to NOR gate 168 whose output is signal PERVMS. Flip flop 169 has its J input provided by signal DRST-, a reset signal. Its Q output, signal VMS, provides an input to NOR gate 171 whose output is signal GHVMS-. FLIp flop 172 has its J input provided by microdata signal uD9 with its Qoutput providing signal L1A. Flip flop 173 is clocked by microclock signal uCLKB, developed in the timing generation of FIG. 8, with its D input provided by microdata signal uD5 and its Q- output being signal FRCEHT0-.

FIGS. 8A-8E, assembled as shown, forms a schematic diagram of the timing generation for this system. A CLK-signal is shown as the input which then goes through logic circuits as shown. FIG. 9 illustrates some of the clock signals developed. Signal A is CLK-. Signal S is a 10 MHz signal from OR gate 604. Signal C is a 10 MHz signal labeled 10 CLKA < the Q output of flip flop 630. Signal 10 CLKB, the Q output of 627 is identical. Signal D is signal uCLKA, the Q output of flip flop 642. Signal uCLKB, the Q output of flip flop 643 is identical. When microdata bits uD7, uD18 and uD23 all equal 0, then the D wave shape exits. When either uD7 or uD23 equal 1, then wave shape D' exists. When uD18 equals 1, then wave shape D" exists. Note that the cycle time for wave D" is variable, depending upon the particular instruciton being executed.

Other signals of interest are developed in this timing generaetion circuitry. Flip flop 607, on its Q output, provides signal BSLTGRT and on its Q- output provides the inversion. Flip flop 608 provides signal SLTREQ on its Q output which is an input to flip flop 614. Flip flop 614 has signal SLTGRT on its Q output and the inversion on its Q- output. Flip flop array 628 provides signals PH1-PH8.

Flip flop 637 provides signal PREWRT- on its Q output and its inversion on its Q- ouput. Flip flop 638 provides signal WRTIME on its Q output and the inversion on its Q- output. NAND gate 641 provides signal MYACK-.

FIGS. 10A-10D, connected as shown, form the schematic diagram for the translation sequencer 300. The translation sequencer causes an inspection of the translation cache 35 in the event of a miss, and is invoked for every write operation. ROMs 328, 329 and 330 contain micro instructions uD0-uD23. The contents of these ROMs is set out in FIG. 11. Programmable array of logic (PAL) 310 is at the center of the operation of the sequencer 300. Its function is described in terms of its outputs (non-inverted) with respect to its inputs.

mentioned PAL310 and also provides an input to multiplexer 327.

The D input of flip flop 324 is set by signal 68RD and its Q output provides an input to multiplexer 327. The output of AND gate 318 provides another input to multiplexer 327. Signal DMYROST frm FIG. 19 provides another input. Signal LT2HIT- provides another input and the output from NOR gate 305 provdies still another input. Signal GHAE- provides another input to multiplexer 327. Signals LTEN flip flop array 471 of FIG. 23 provides one input to NOR gate 322 and signal VMS provides to other. The output from NOR gate 322

```
PA4=     uD23*uD3 + uD22*uD3 +
         /uD23*/uD22*/uD21*uD20 +
         /uD23*/uD22*uD21*/uD20
PA3=     uD23*uD2 + uD22*uD2 +
         /uD23*/uD22*/uD21*uD20*TLBHIT +
         /uD23*/uD22*uD21*/uD20*TLBHIT*VALID*/UPDAB*/ACVL +
         /uD23*/uD22*uD22*uD21*/uD20*TLBHIT*/VALID +
         /uD23*/uD22*uD21*/uD20*THLBHIT*ACVL
PA2=     uD23*uD1 + uD22*uD1 +
         /uD23*/uD22*/uD21*uD20*TLBHIT*VALID*/UPDAB +
         /uD23*/uD22*/uD21*uD20*TLBHIT*/VALID +
         /uD23*/uD22*uD21*/uD20*L1A*TLBHIT*VALID*UPDAB*/ACVL +
         /uD23*/uD22*uD21*/uD20*TLBHIT*/VALID +
         /uD23*/uD22*uD21*/uD20*THLBHIT*ACVL
PA1=     uD23*uD0 + uD22*uD0 +
         /uD23*/uD22*/uD21*uD20*THBHIT*/VALID +
         /uD23*/uD22*uD21*/uD20
FAULT=   /uD23*/uD22*/uD21*uD20*THBHIT*/VALID *
         /uD23*/uD22*uD21*/uD20*TLBHIT*/VALID +
         /uD23*/uD22*uD21*/uD20*TLBHIT*ACVL
```

This PAL controls virtual memory sequencer branches. The PAL also signals a page fault condition. The signals have the following meanings:
uDxx = micro-data bits
VALID = PTE valid bit
UPDAB = update the PTE access bits
ACVL = access violation was detected
L1A = level 1 translation is complete
TLBHIT = appropriate translation buffer "hit"
FAULT = Page fault has been detected
PAx = output of PAL; next micro-address bits 4-1

As will be described later, the translation sequencer looks at whether there has been a hit, whether there has been an access violation (improper PBR) and whether the entry is valid (in main memory and not in a mass store). These conditions are not pertinent to this invention, but are included for general information.

Figure 21:
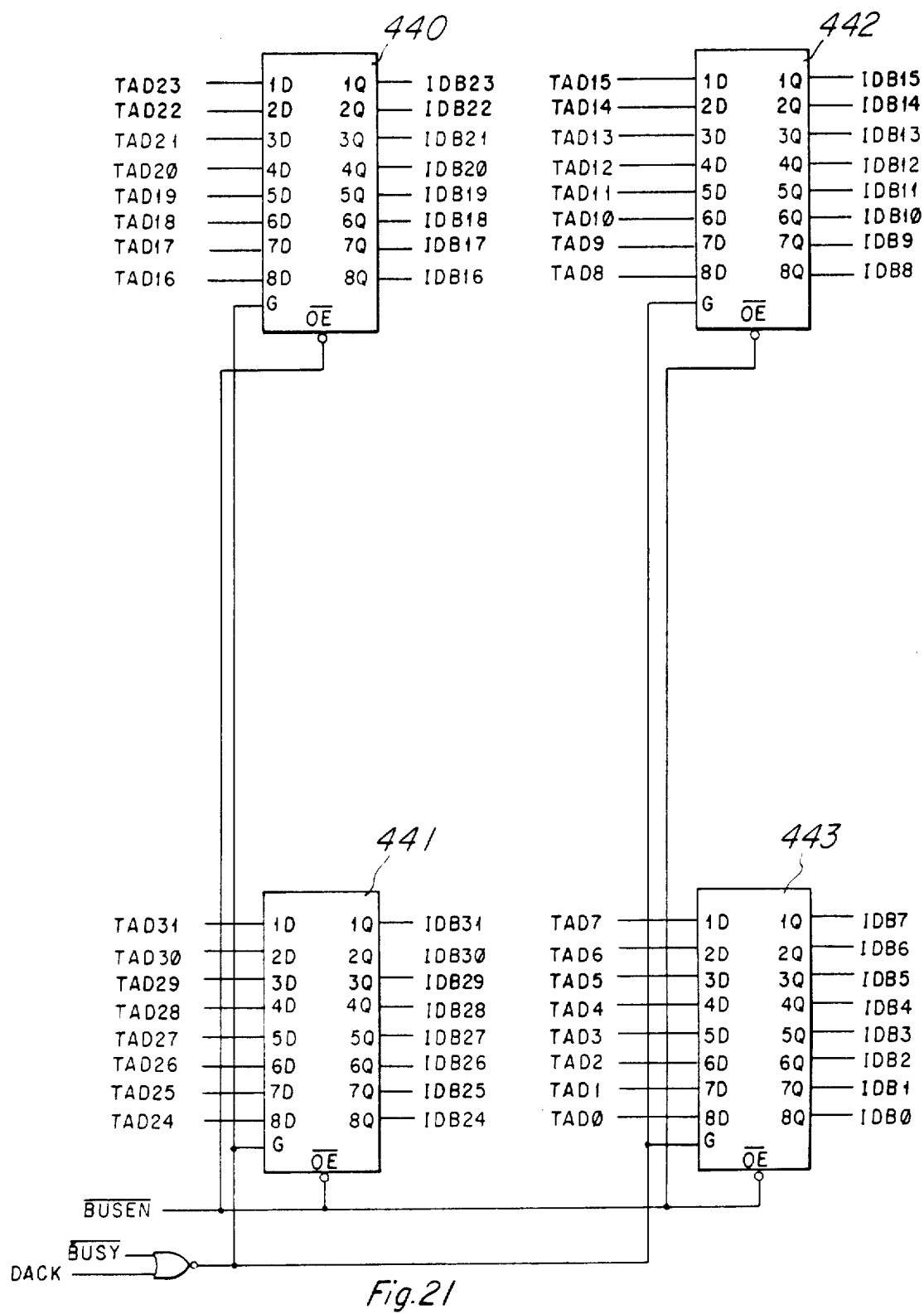
FIG. 21 schematically illustrates external buffer data latches.

Signal IDB24 from FIG. 21 provides one input to AND gate 302 and signal IDB25 from FIG. 21 provides another input to AND gate 302 and one input to AND gate 301. Signal 68 WRT FIG. 16 provides the final input to AND gate 302 and signal 68RD from FIG. 16 provides the final input to AND gate 301 and a single input to NOR gate 304. AND gates 301 and 302 are input to NOR gate 303 whose output provides the D input to flip flop 317. Flip flop 317 indicates the presence or absence of an access bit, indicating whether the particular page in memory has been accessed. Signal IDB26 from FIG. 21 provides D input to flip flop 316 whose Q output indicates that the pgae is valid.

Signal LCACHT (a cache bit) provides the other input to NOR gate 30 whose output is connected to one input of NOR gate 305. The other input to NOR gate 305 is signal CBIT- from flip flop 344 of FIG. 12. The Q output of flip flop 317 provides one input to AND gate 319. Flip flop 316 has its Q output connected to another input to AND gate 319. Logic circuits 315 provides an output signal to the last input to AND gate 318 and to one input to OR gate 319. The other input to OR gate 319 is provided by signal PFNEN-. Its output is signal ACVL- which is one of the inputs to the previously provides the final input to multiplexer 327. Its ouptut, signal uA0, is used for the AD0 inputs of the buffers 328-330.

The inverted output signals from PAL310, signals PA1- through PA4- are inverted through multiplexer 326 and are input to address terminals AD1-AD4 of each of PROMS 328-330. The output from PROMS 328-330 are input to flip flop arrays 332-334 which provide output signals uD0 through uD23.

FIGS. 12A-12F, when joined as shown, provide a schematic diagram of various latch circuits used for latching the page file number, write-back and access bit information.

Signals IDB26-IDB29 are input to flip flop array 344 whose outputs are signals PV1, PV0, CBIT and their inversions. PV0 and PV1 are the access bits and CBIT indicates whether a page file should be cached. As mentioned earlier, some information that is subject to many changes may be tagged, if desired, to not be stored in the cache memory.

Flip flop arrays 342, 343, 348 and 349 with inputs from signals IDB0-IDB31, as shown, are write back latches, each of which contains a part of the word to be transmitted to the CPU 10 and/or to be written in the cache memory. Flip flop arrays 352-354 form the page frame number latch, providing output sinals IAB1-0-IAB23.

Flip flop array 355 stores the offset within the page, that is, where in the page frame the desired data may be found.

Finally, the multiplexer 356 simply adds two bits to the page frame number.

Figure 13A:
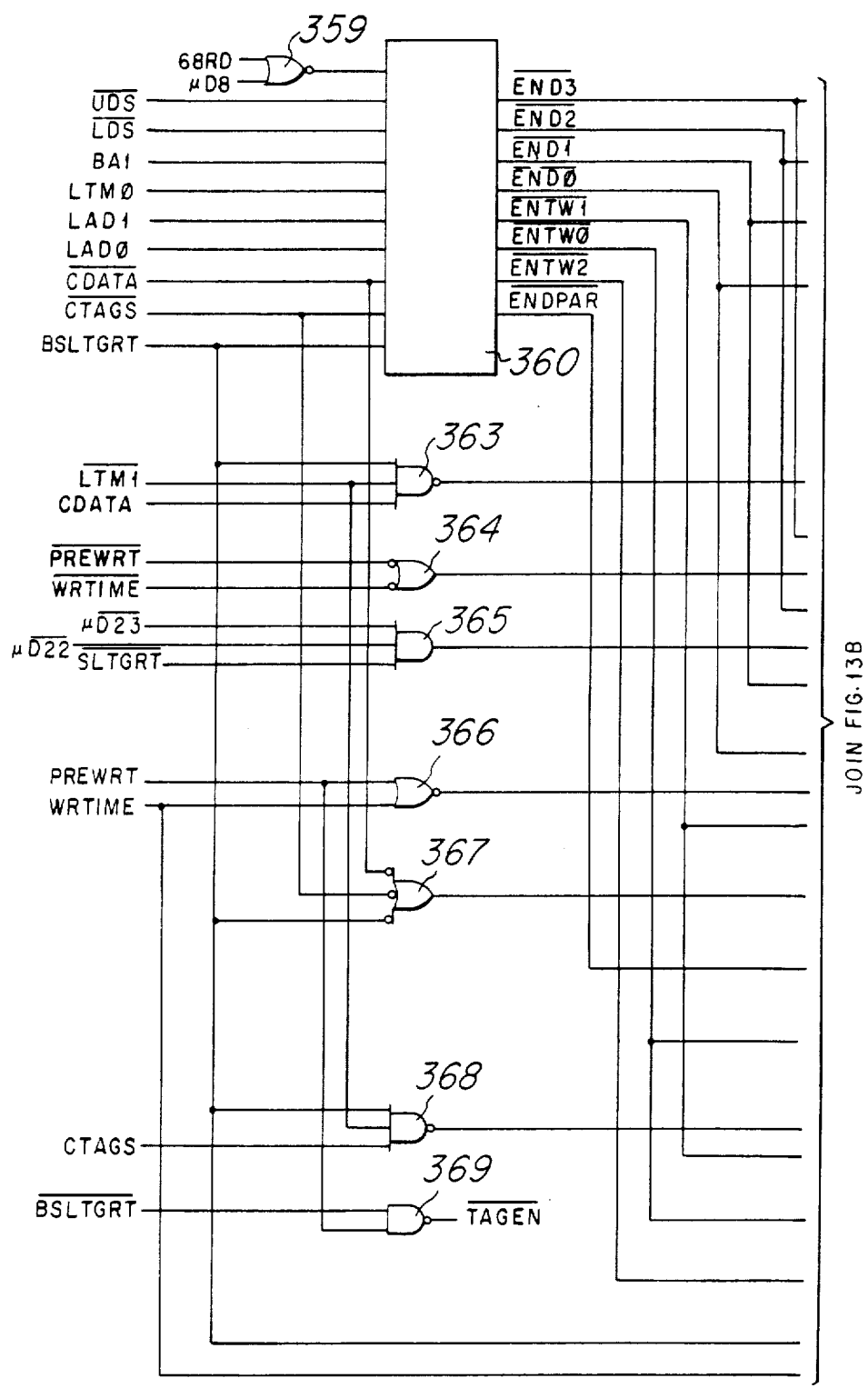
FIGS. 13A and 13D, together illustrate the write enable control circuitry.
Figure 13B:
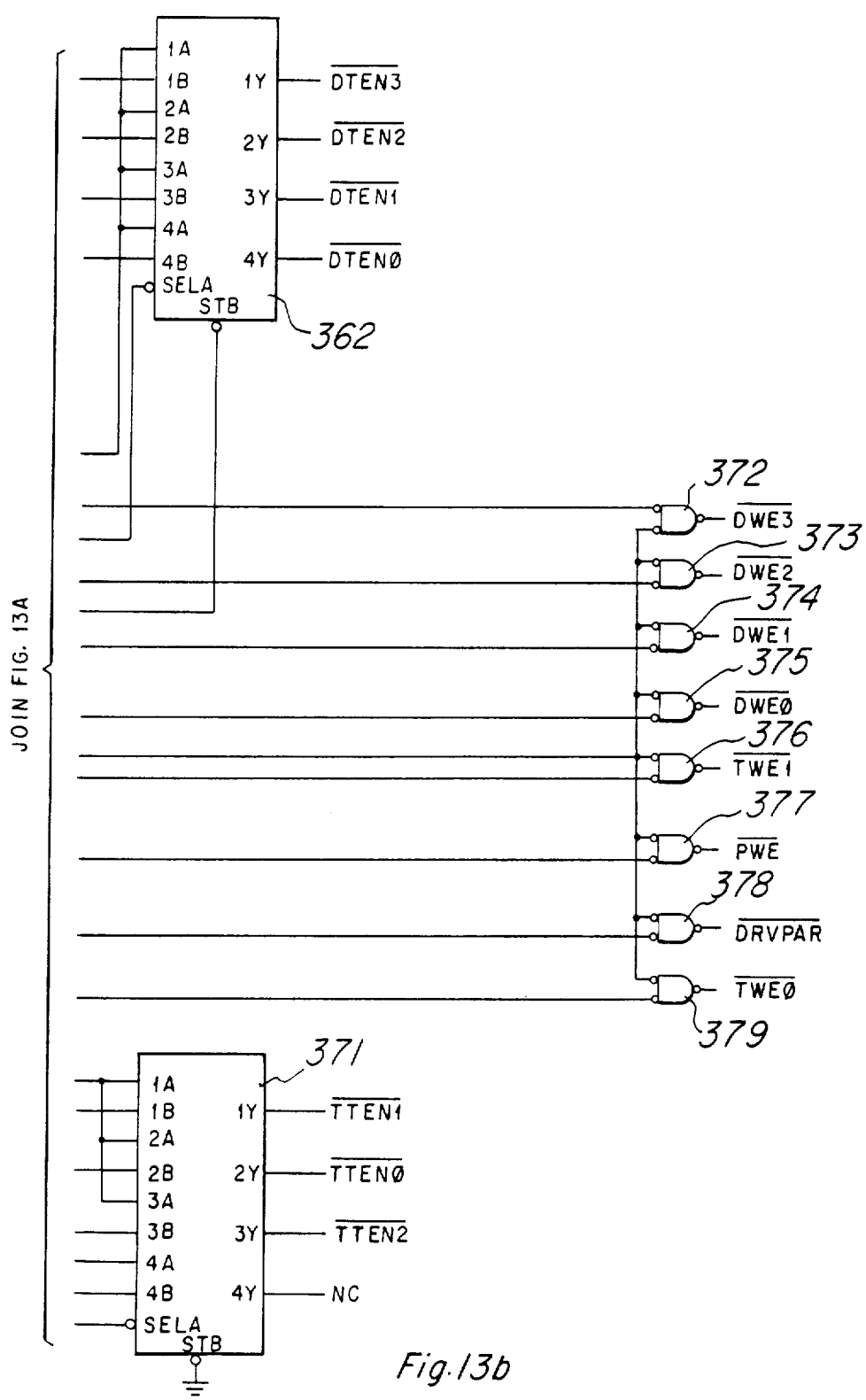

FIGS. 13A and 13B, when connected as shown, illustrate the write enable control. PAL360, in response to the inputs shown, provides outputs for simple selection for writing enable to selector 362 which provides output signals DTEN0- -DTEM3-. Gates 363-369, receiving the inputs as shown, provide inputs to selectro 371 which provides output signals TTEN0- through TTEN2-. They also provide inputs to AND gates 372-379 which provide output signals DEW3-, DWE2-, DWE1-, DWE0-, TWE1-, PWE-, DRVPAR-, and TWE0-.

Figure 14A:
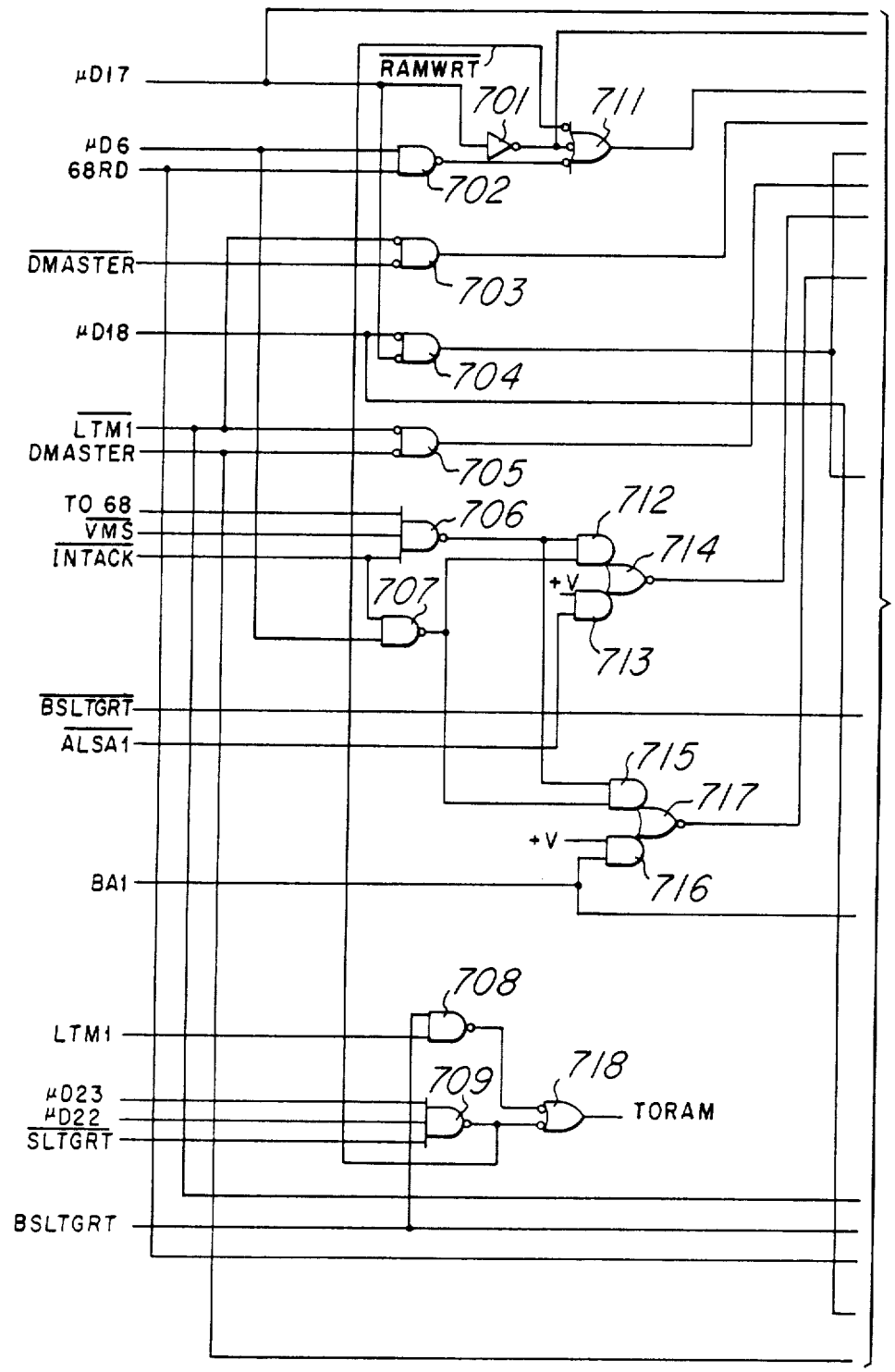
FIGS. 14A-14C together schematically illustrate the internal bus control.
Figure 14B:
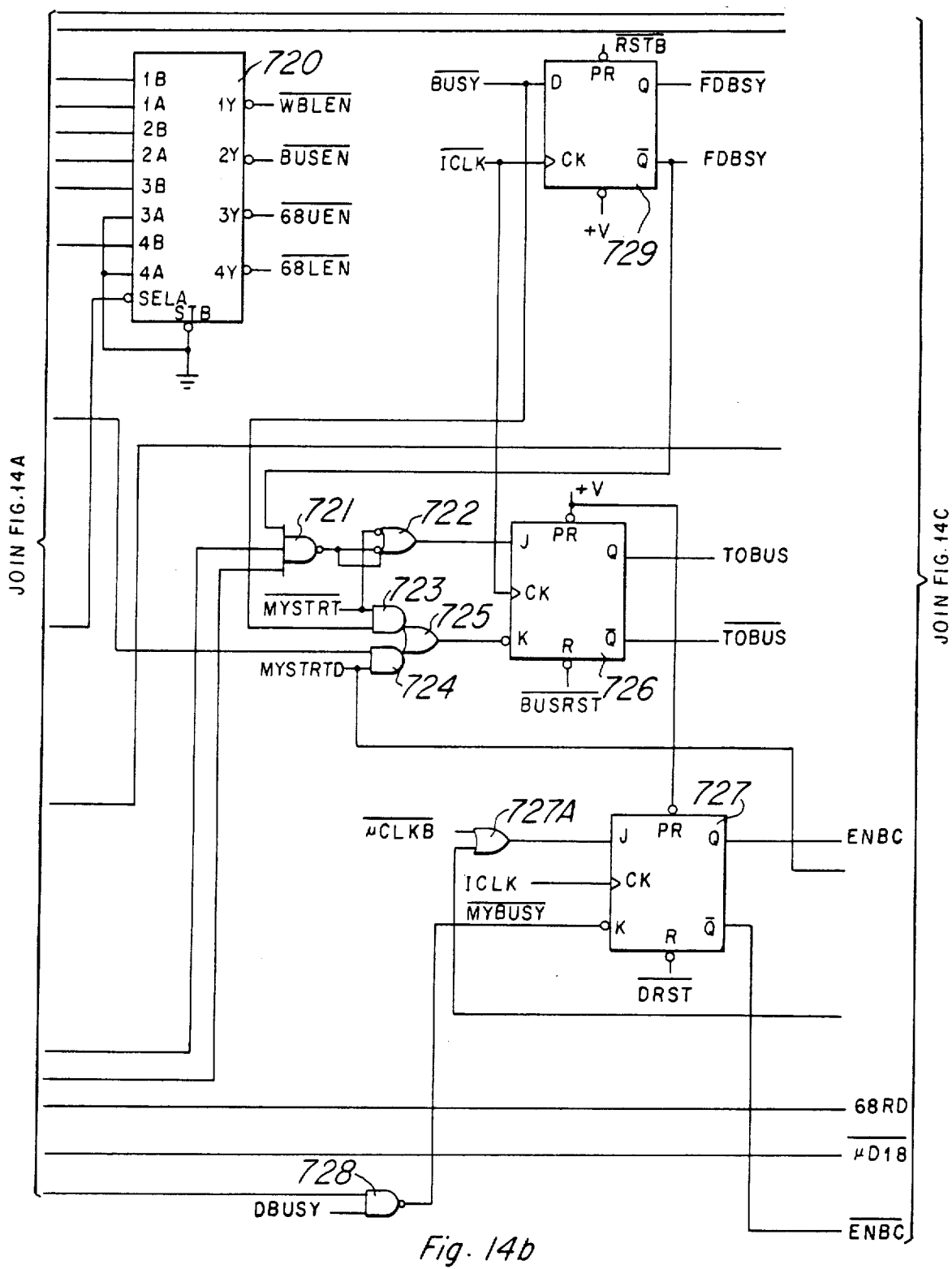
Figure 14C:
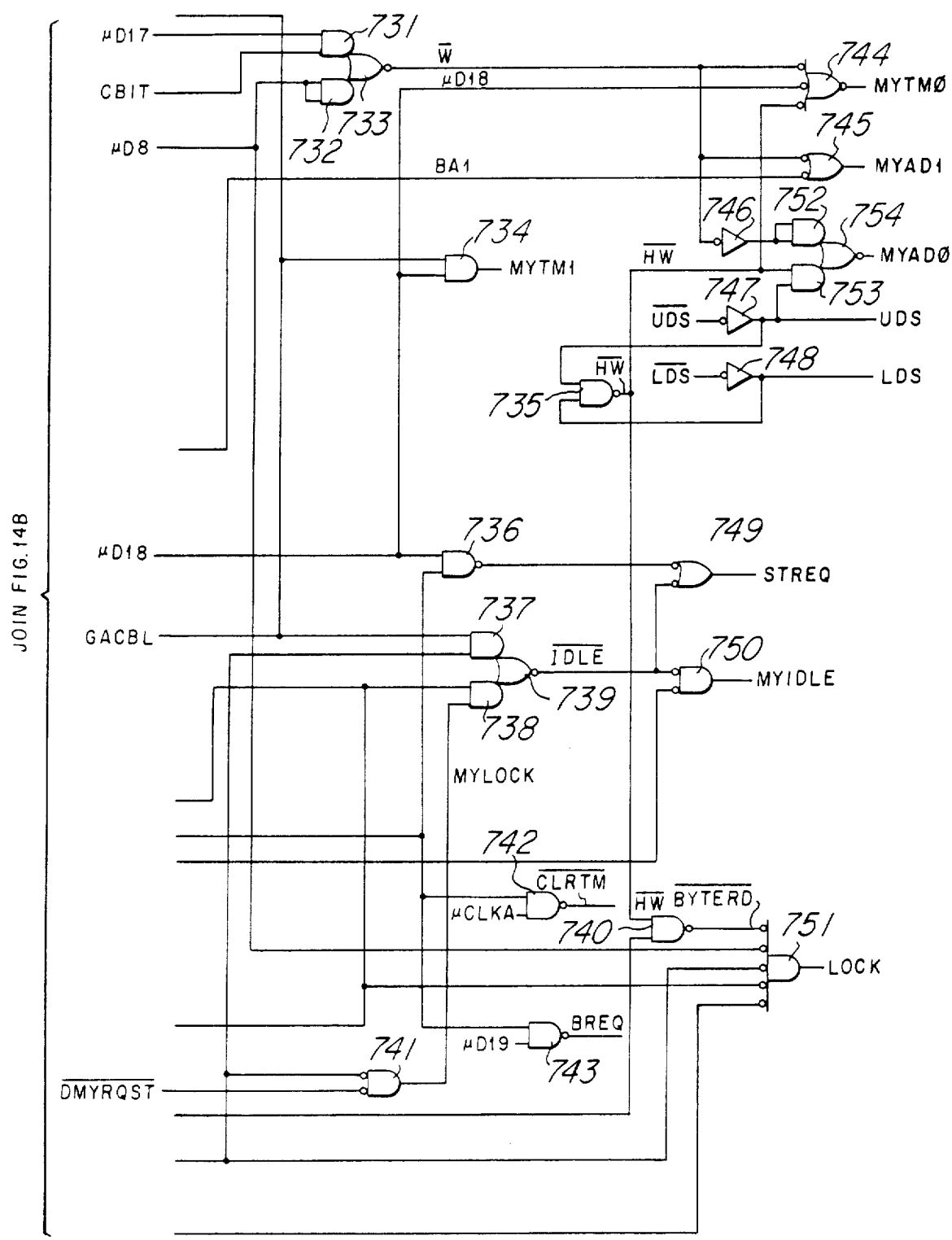

FIGS. 14A-14C form a schematic diagram of the bus control associated with this invention. The logic as shown provides signals which have been provided to circuits previously described and to circuits that will be described.

Figure 15A:
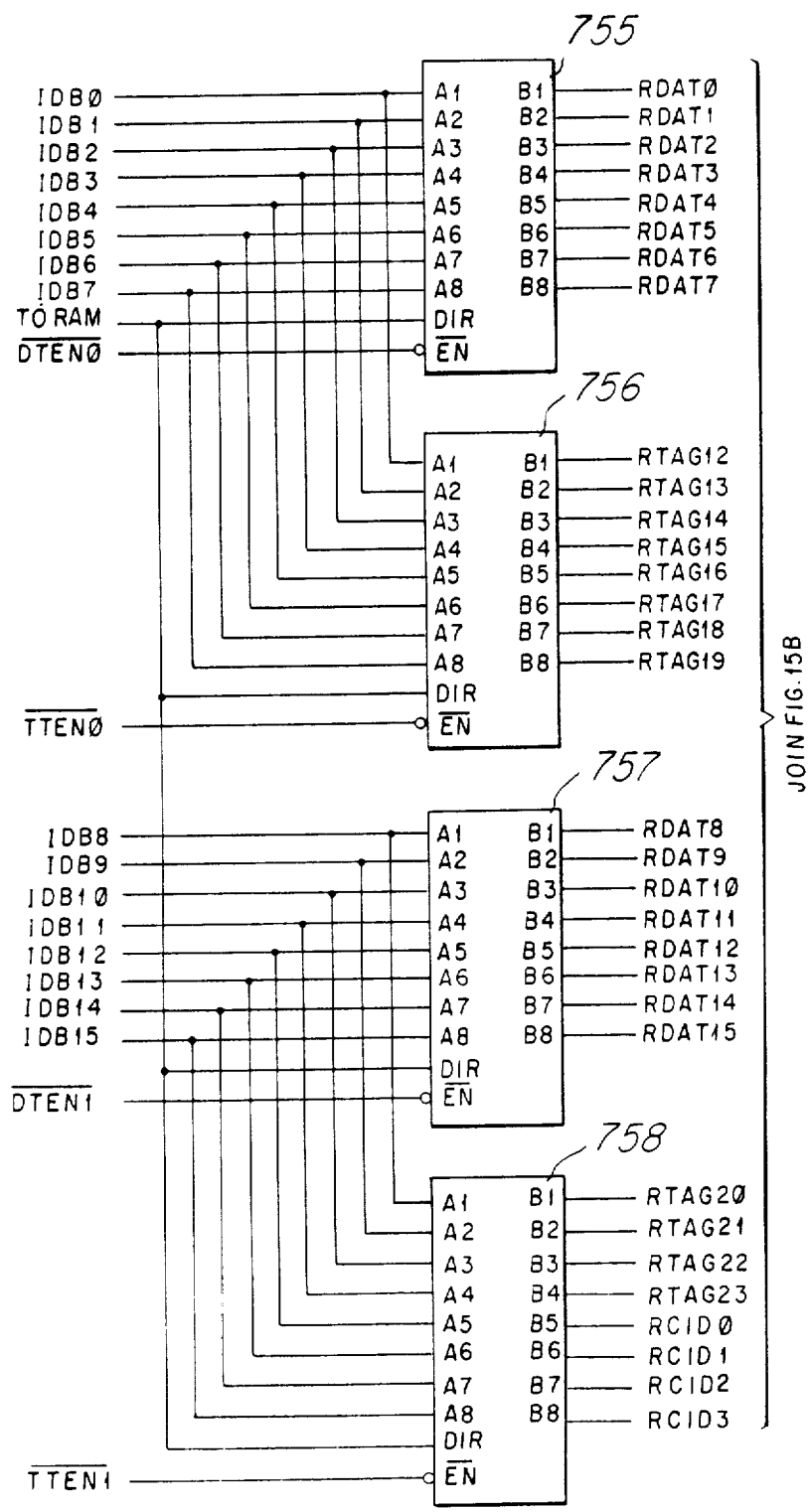
FIGS. 15A and 15B illustrate cache memory buffers.
Figure 15B:
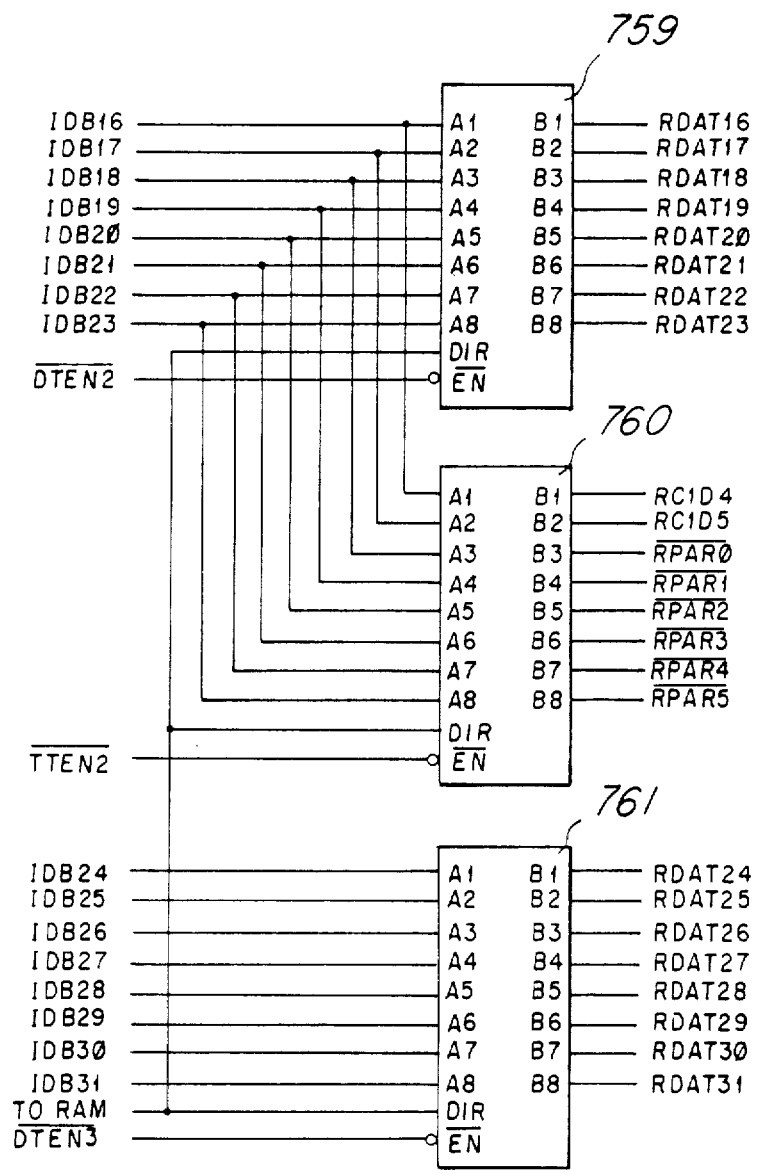

FIGS. 15A and 15B together illustrate the cache memory buffers. Buffers 755-761 simply illustrate a bilateral communication between the signals shown, all of which have been previously mentioned or will be mentioned in drawings to be subsequently described.

FIGS. 16A-16D, when joined as indicated, schematically illustrate the logic circuitry for generating various signals which have been noted previously and which will be noted subsequently. Of interest are selectors 783 and 785 which provide output signal CID0-CID5, selecting from either the user CID's or the supervisor's CID's. Also of interest are drivers 789, 790 and 791 which illustrate the correspondence between signals RTAG12-RTAG23 and VAB12-VAB23.

Figure 17A:
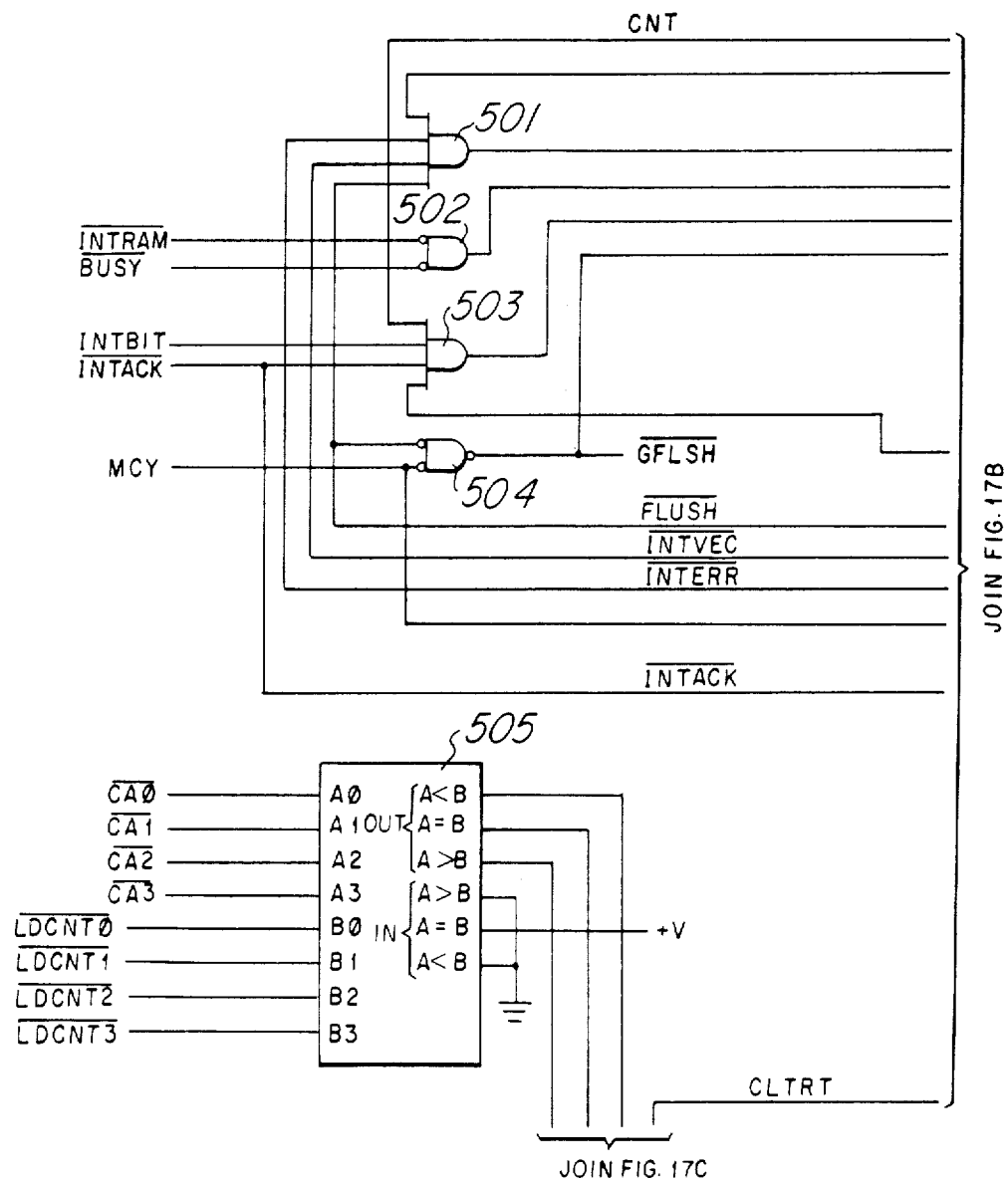
FIG. 17A-17D when joined as shown schematically illustrate the interrupt-logic state machine.
Figure 17B:
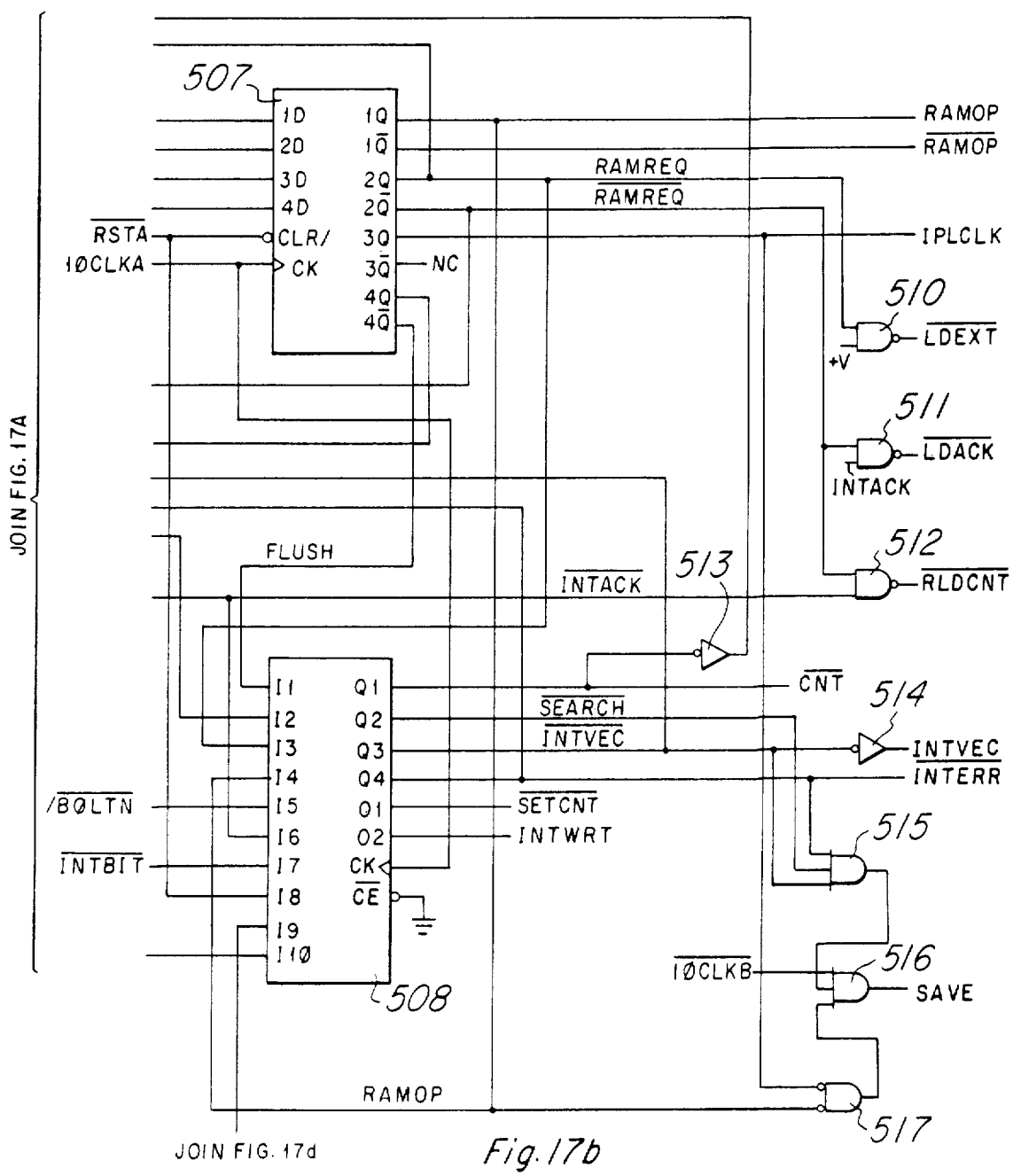
Figure 17C:
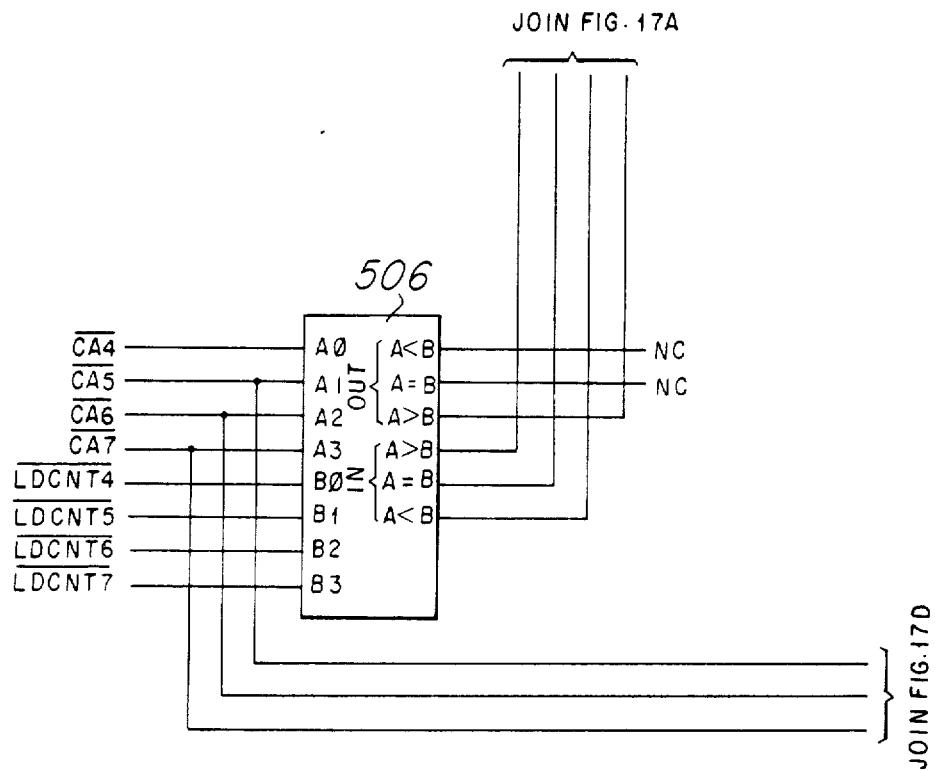
Figure 17D:
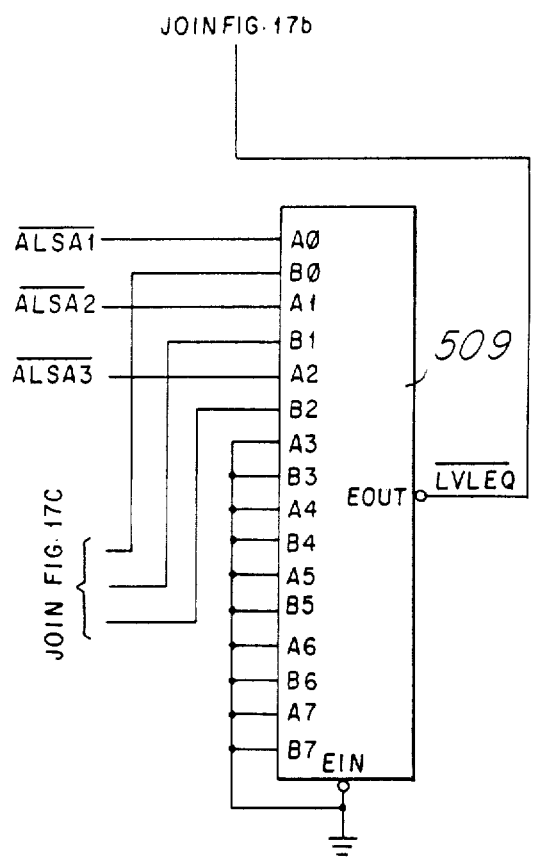
Figure 18A:
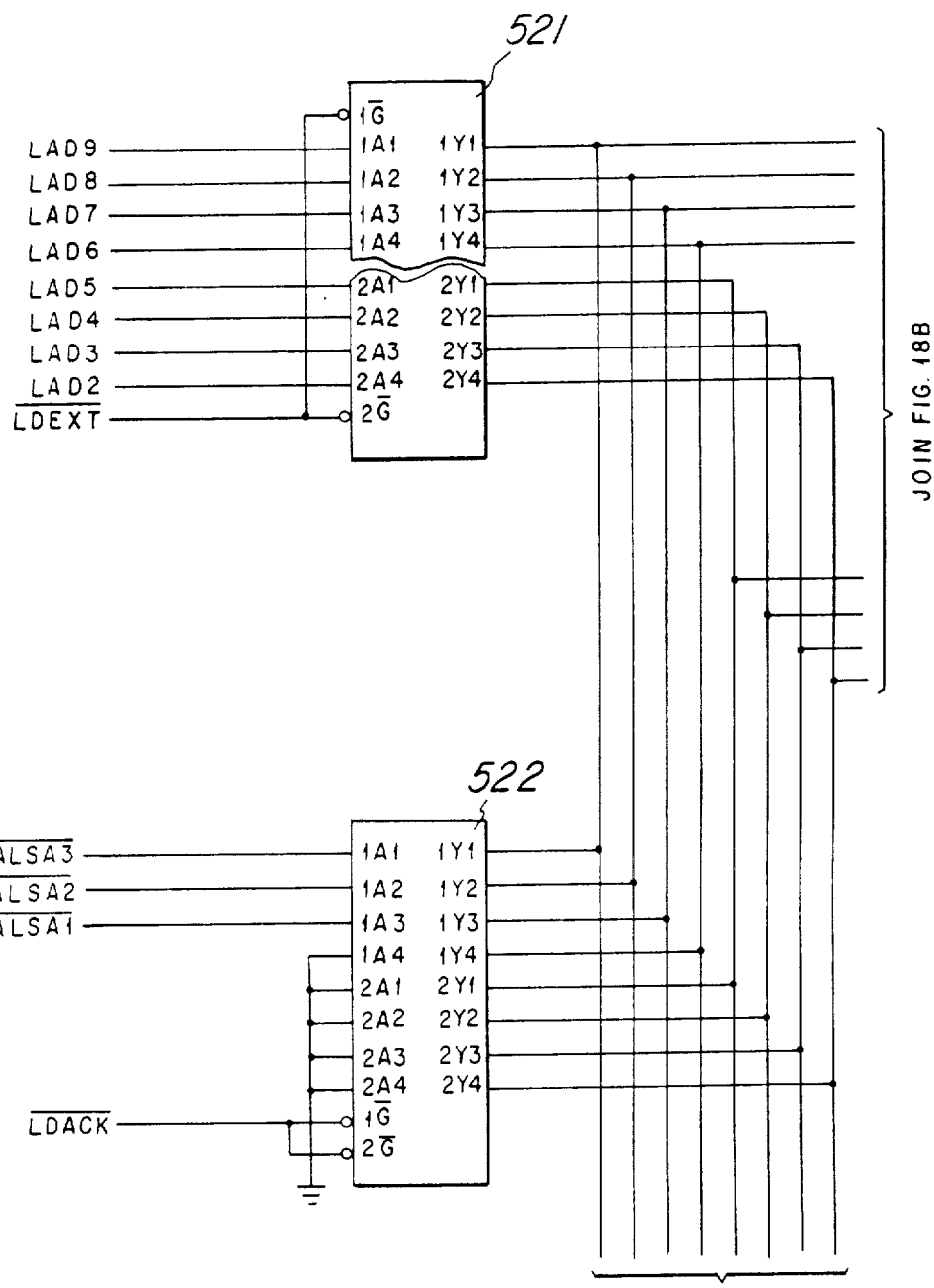
FIGS. 18A-18F when joined as shown schematically illustrate the interrupt logic and RAM.
Figure 18B:
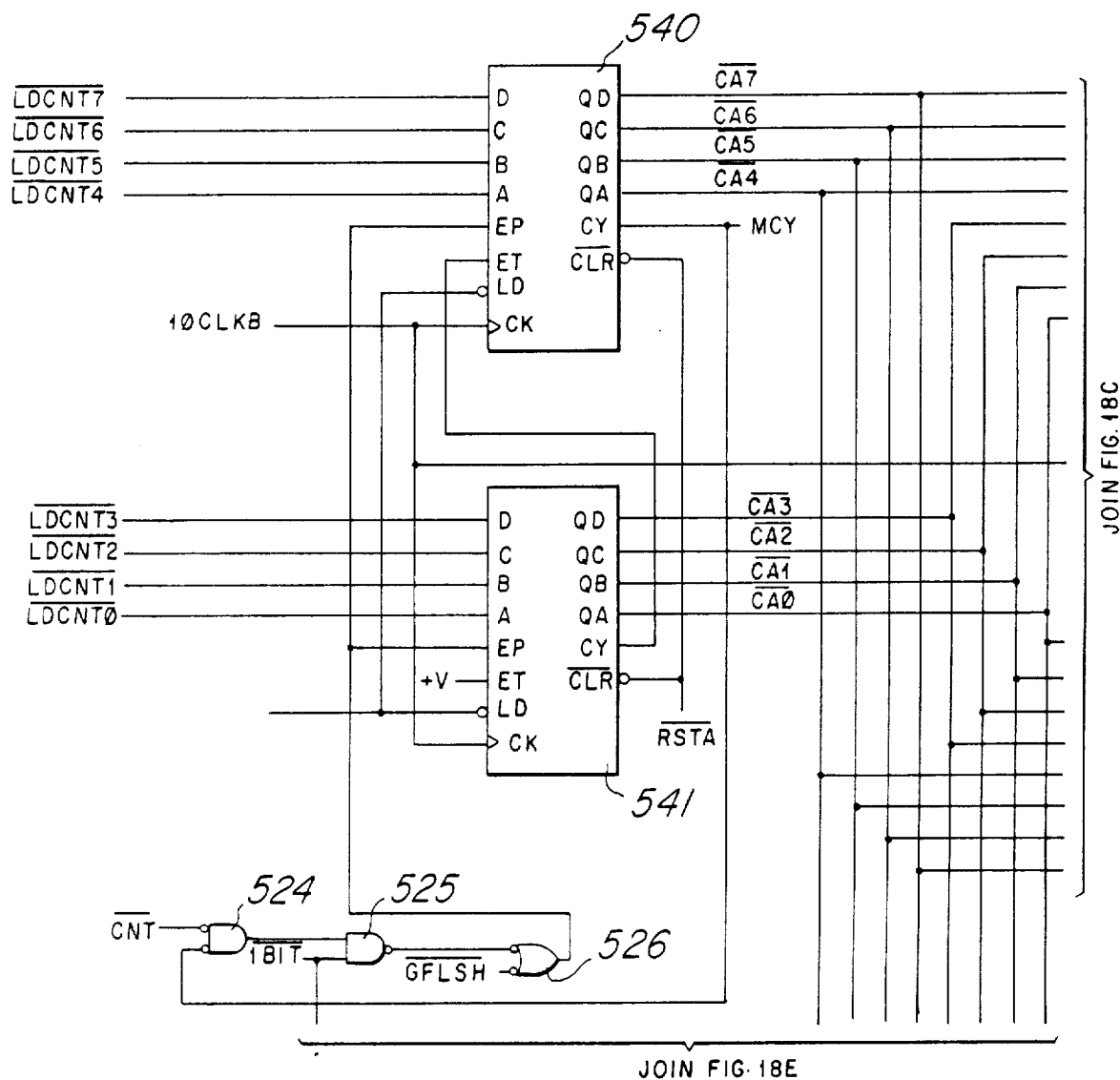
Figure 18C:
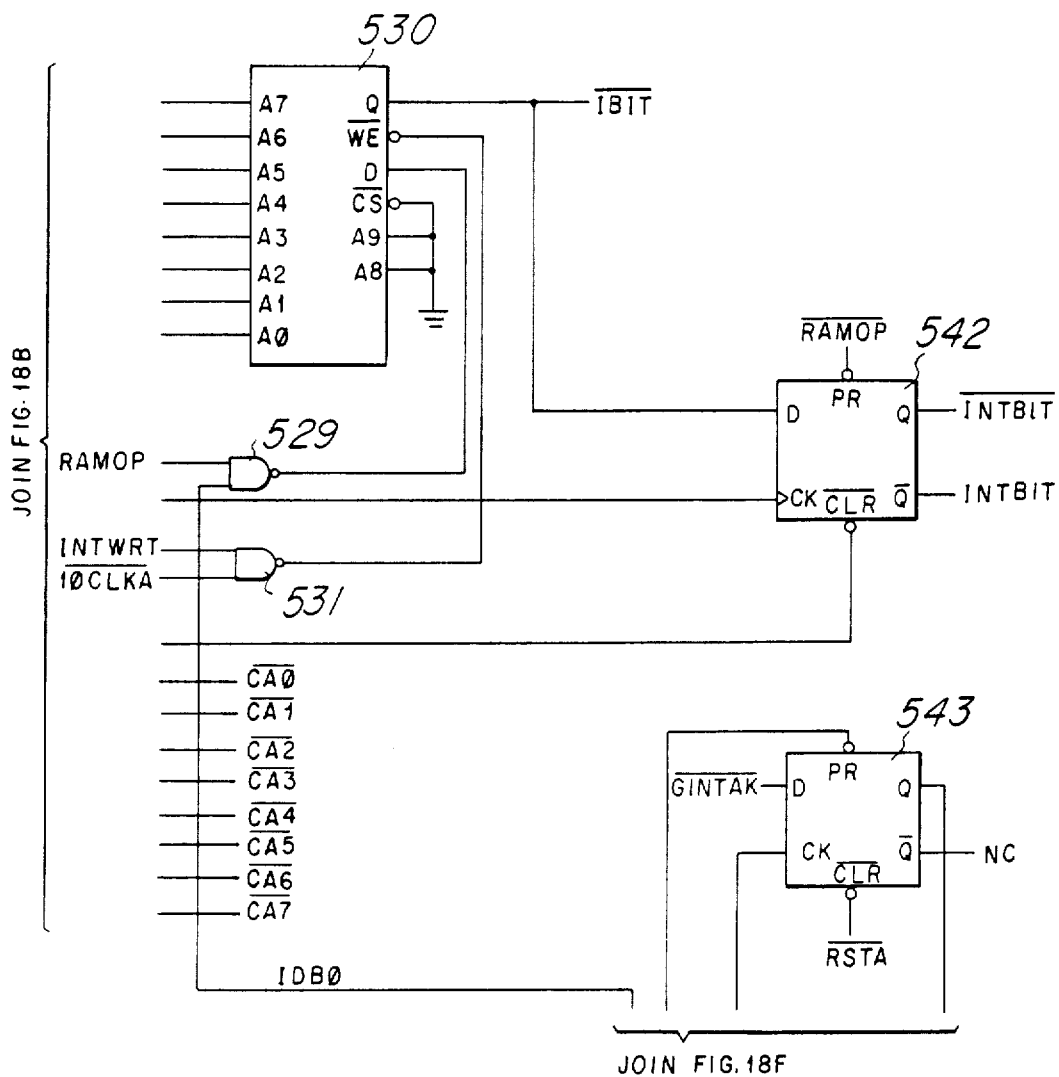
Figure 18D:
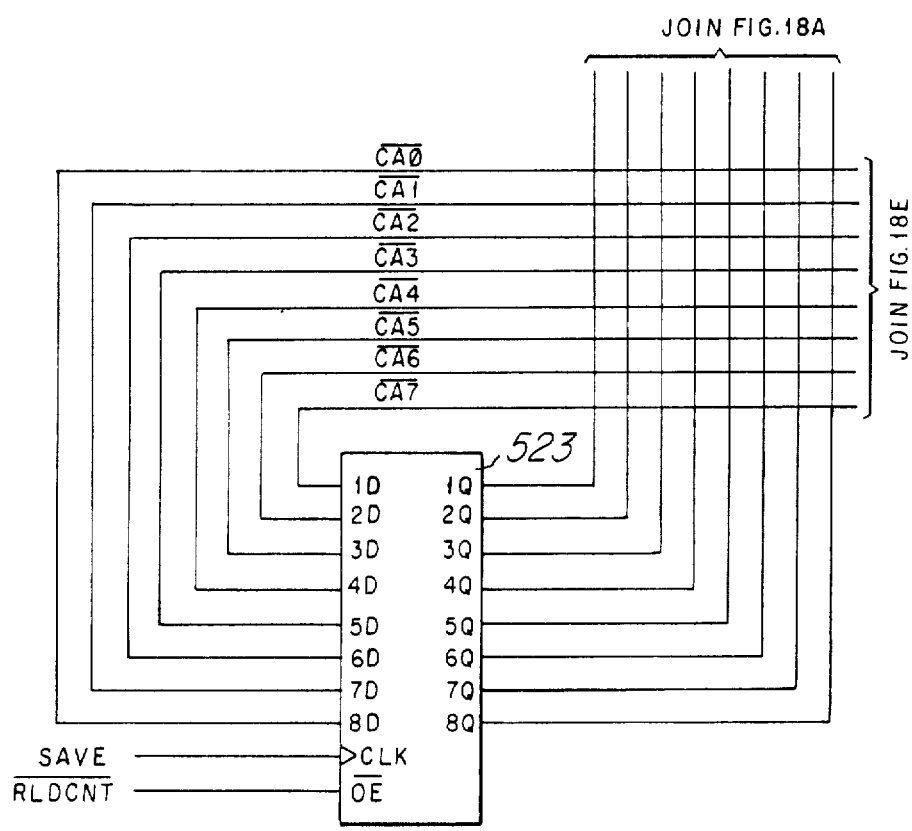
Figure 18E:
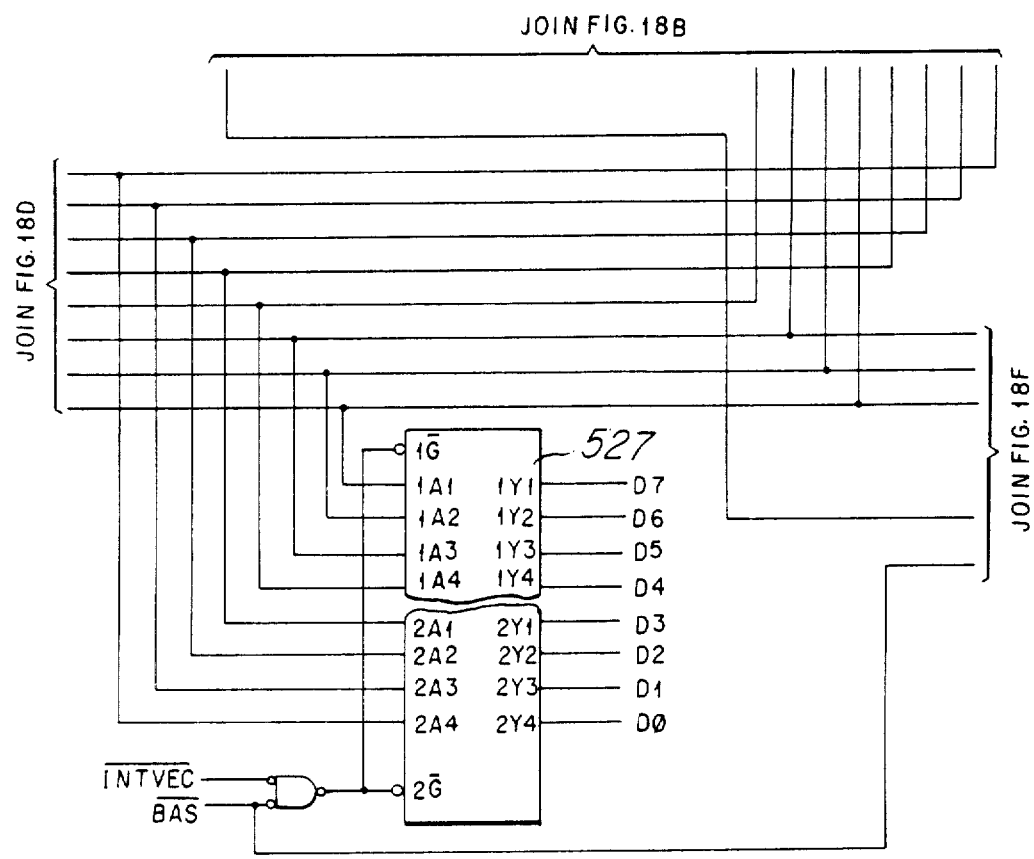
Figure 18F:
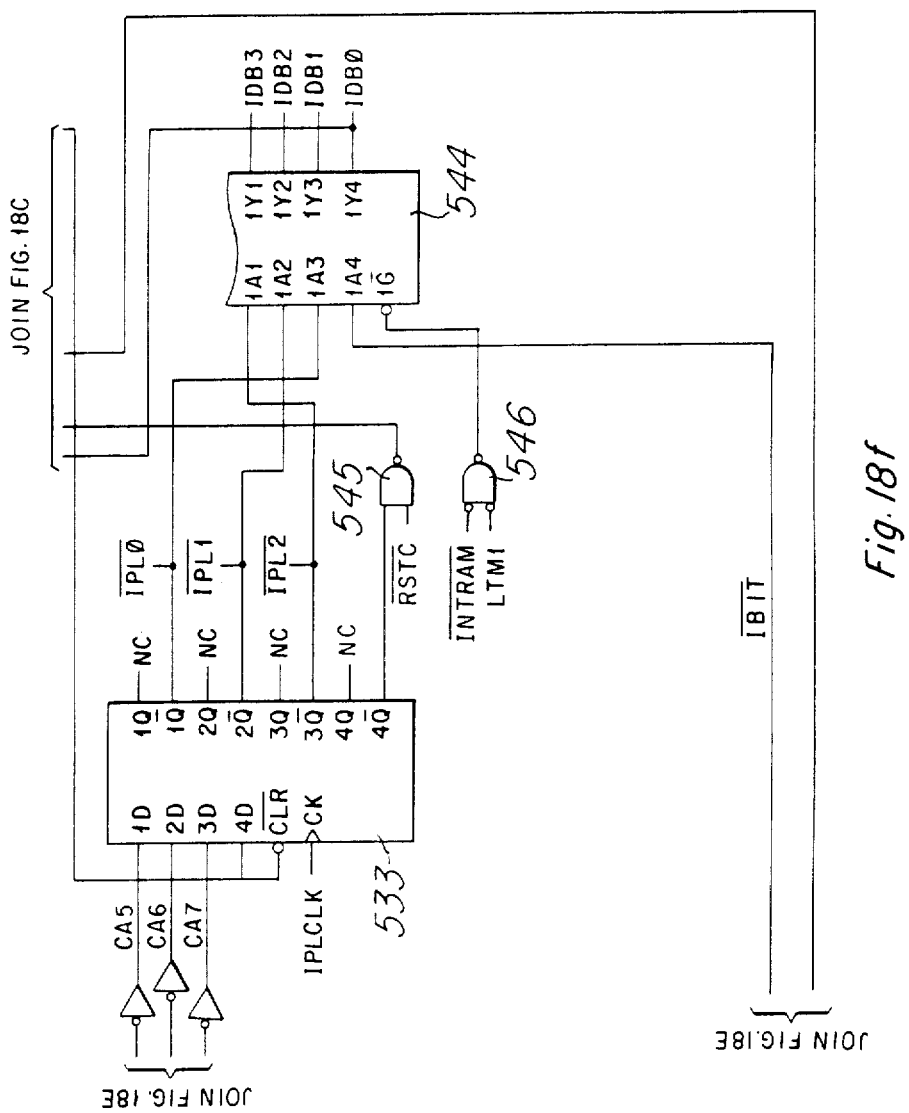

FIGS. 17A-17C form the interrupt logic-state machine. PAL508 controls the operation of the state machine and the equations that describe its configuration follow.

| | |
|---|---|
| INTVEC:= | INTBIT*INTACK*LVLEQ*/RAMREQ*/RAMOP*/RST + INTVEC*INTACK*/RST |
| INTERR:= | SEARCH*/LVLEQ*/RAMREQ*/RST + INTERR*INTACK*/RST |
| SEARCH:= | /SEARCH*INTACK*/INTVEC*/INTBIT*/INTERR*/RAMREQ*/RST + /SEARCH*INTACK*/INTVEC*/LVLEQ*/INTERR*/RAMREQ*/RST + SEARCH*INTACK*/INTVEC*/INTERR*/INTBIT*/RAMREQ*LVLEQ*/RST |
| CNT:= | RAMOP*/RAMREQ*/MCY*/RST + INTVEC*/INTACK*/MCY*/RST + INTERR*/INTACK*/MCY*/RST + CNT*/MCY*/INTBIT*/INTACK*/RAMREQ*/RST + SEARCH*/INTBIT*/RAMREQ*LVLEQ*INTACK*/RST |
| SETCNT= | BOLTM1*RAMOP*/RAMREQ*CLTRT*/RST + /BOLTM1*RAMOP*/RAMPEQ*/RST + RAMREQ*/INTVEC*/INTERR*/FLUSH*/RST + INTERR*/INTACK*/RST + /SEARCH*INTACK*/INTVEC*/INTERR*/RAMREQ*/INTBIT*/RST + /SEARCH*INTACK*/INTVEC*/INTERR*/RAMREQ*/LVLEQ*/RST + INTVEC*/INTACK*/RST |
| /INTWRT= | /INTVEC*/FLUSH*/RAMOP + /INTVEC*/FLUSH*/BOLTM1 + INTVEC*/INTACK + RAMOP*/RAMREQ |

DESCRIPTION:
FLUSH= state where interrupt RAM is flushed of random bits after power-up
MCY= carry from counter indicating completion of scan
RAMREQ= slot decode requests external access to interrupt RAM for read or write
RAMOP= state in which external access take place
BOLTM1= latched TM1 (for byte 0 only) meaning bus cycle is a write cycle
INTACK= 68000 is executing interrupt acknowledge sequence
INTBIT= latched output of interrupt RAM
RST= reset
LVLEQ= compare of count level with requested interrupt level from 68000 (level equal)
CLTRT= compare of count level with saved return count address (count less than saved return count)
INTERR= state of an interrupt error; search complete within level with no bit found set constituting spurious interrupt response
INTVEC= state in which interrupt vector is given to 68000
SEARCH= state in which search is made for bit which caused interrupt acknowledge sequence; CNT is always present when SEARCH is present
CNT= state in which all scanning of interrupt RAM is done whether it is scanning for new interrupts or searching for bits to acknowledge
INTWRT= interrupt write control, allows writing of interrupt RAM bits
SETCNT= load count with LDEXT (if RAMREQ), LDACK (if INTACK), RLDCNT (if /RAMREQ*/INTACK)

Signal INTRAM- from decoder 461 of FIG. 23 and signal PH2 from the timing generation provide inputs to NOR circuit 502. Signal INTERR from the PAL 508 provides one input to AND gate 501. Signal INTVEC- from PAL 508 provides another input to AND gate 501. Signal FLUSH- from flip flop array 507 provides another input to AND gate 501 and also provides one input to OR gate 504. Signal RAMREQ from flip flop array 507 provides the final input to AND gate 501.

Signal INTBIT from flip flop 542 of FIG. 18 provides one input to AND gate 503 and signal INTACK- from flip flop 782 of FIG. 16 provides another input to AND gate 503 and also NAND gate 512. Signal RAMREQ- from flip flop array 507 provides another input to AND gate 503. Output SEARCH from PAL508 is inverted through inverter 513 providing signal CNT which serves as the final input to AND gate 503. Signal MCY from binary counter 540 of FIG. 18 provides the other input to OR gate 504. The outputs of gates 501-504 are connected to inputs 1D-4D of flip flop array 507. Outputs 1Q and 1Q- of flip flop array 507 provide signals RAMOP and RAMOP-, respectively. Output 3Q provides signal IPLCLK.

Magnitude comparators 505 and 506 receive signals CA0-through CA7- to be compared with signals LDCNT0- through LDCNT7-. This compares the current address (CA0- through CA7-with the last address LDCNTO- through LDCNT7-). The difference is used for determining where scanning will begin. This will be described in the discussion of the operation. Comparator 509 compares signals ALSAI- through ALSA3- (the inversions of virtual addresses VAB1-VAB3, respectively), with signals CA5-through CA7-. This comparison determines whether the address sent to the interrupted device is the same as the last address. This comparison provides an input signal LVLEQ- to PAL508 which may cause scanning to proceed. This will be described in the description of the mode of operation.

AND gate 510 has a plus voltage input and an input from signal RAMREQ, providing output signal LDEXT-. NAND gate 511 has signal INTACk and signal RAMREQ- as inputs. Its output is signal LDACK-. NAND gate 512, in addition to input signal INTACK- has signal RAMREQ- as an input, providing output signal RLDCNT-. Signal INTVEC- is inverted through inverter 514 to provide output signal INTVEC. Signal INTERR- is also provided. Signal SAVE is provided through logic gates 515-517, as shown. FIG. 18 illustrates interrupt logic and interrupt RAM 530. Input signals LAD2 thorugh LAD9 connect through buffer 521 providing signals LDCNT0- through LDCNT7- to counters 541 and 540, respectively, as shown. The output of counter 541 is made up of signals CA0- through CA3-. The output of counter 540 is made up of signal CA4- through CA7-. Flip flop array 523 provides for saving signals CA0- through CA7- from the counters 540 and 541. The lines carrying these signals are connected to buffer 527 which in turn is connected to the data lines of CPU 10 on FIG. 2. The output signals from flip flop array 523 are signals LDCNT0- through LDCNT7-, the last address. The lines carrying these signals interconnect the output lines of buffers 521 and 522, and flip flop array 523. RAM 530 receives its input address from signals CA0- through CA7-, from counters 541 and 540. Its output, signal IBIT- provides D inputs to flip flop 542 whose Q output is signal INTBIT- and whose Qoutput is INTBIT.

Signal CNT- from PAL508 provides one input to NOR gate 524.

The other input to NOR gate 524 is provided by signal MCY from counter 540. The output of NOR gate 524 provides one input to NAND gate 525 whose other input is signal IDIT- from RAM 530. The output from NAND gate 525 provides one input to NAND gate 526 whose other signal is GFLSH- from gate 504 of FIG. 17. The output of NAND gate 526 is connected to the enable gate of both counters 540 and 541. The gate is disabled during a write to the memory 530, as will be described later.

Flip flop array 530 receives signals CA5-CA7, providing output signals IPLO0-, IPL1-, and LPL2- on output termins 1Q-, 2Q- and 3Q-, respectively. OR gate 546 receives one input signal LTM1 from flip flop 704 of FIG. 19 and its other input signal INTRAM- from decoder 461 of FIG. 23. The output of gate 546 is connected to the enable gate of buffer 544.

Signal IBIT- is applied to terminal 1A4 of buffer 544. The output of buffer 544 is made up of signals IDB0 through IDB3.

Figure 19A:
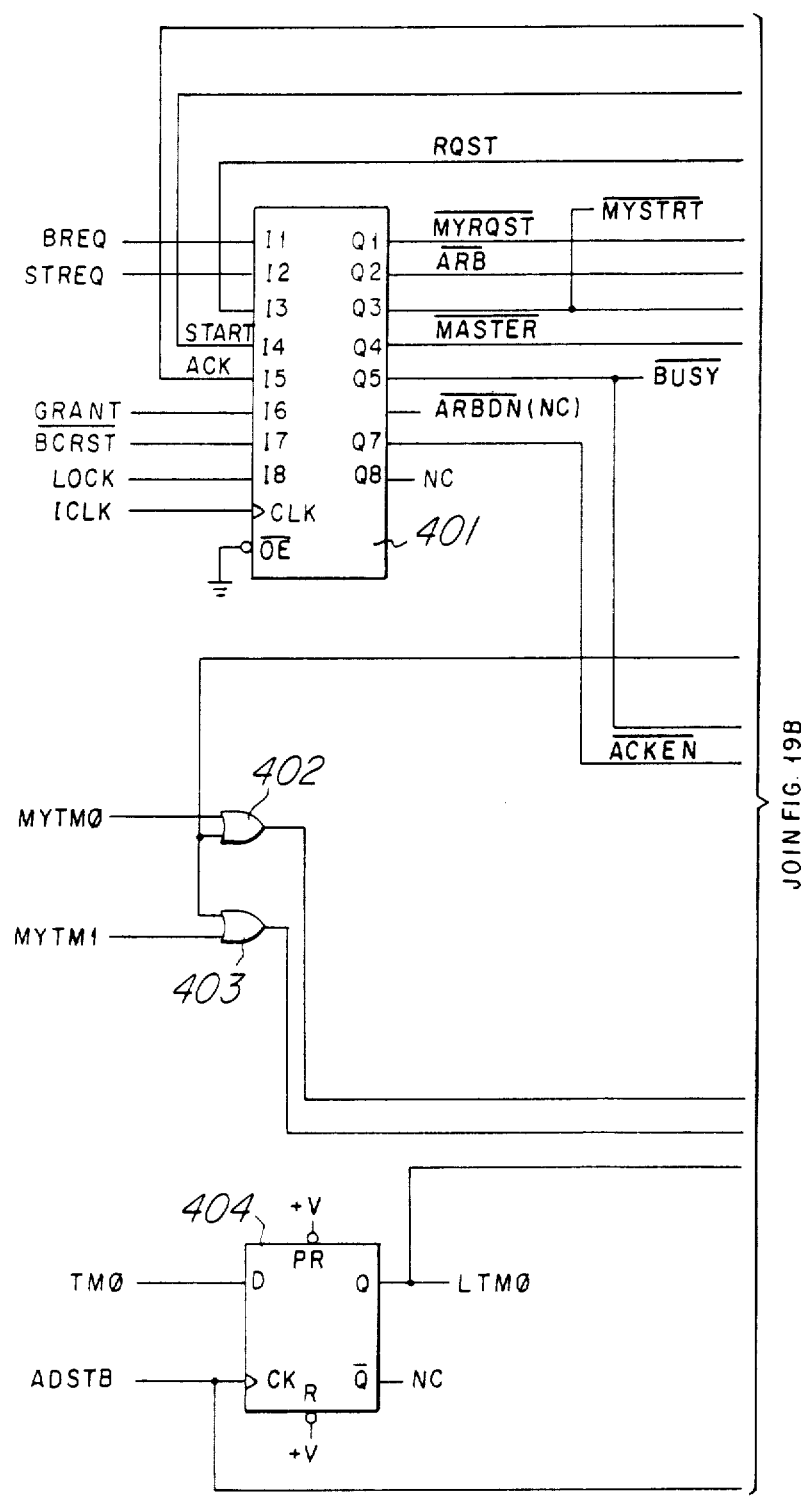
FIGS. 19A-19C form a schematic of the external bus control.
Figure 19B:
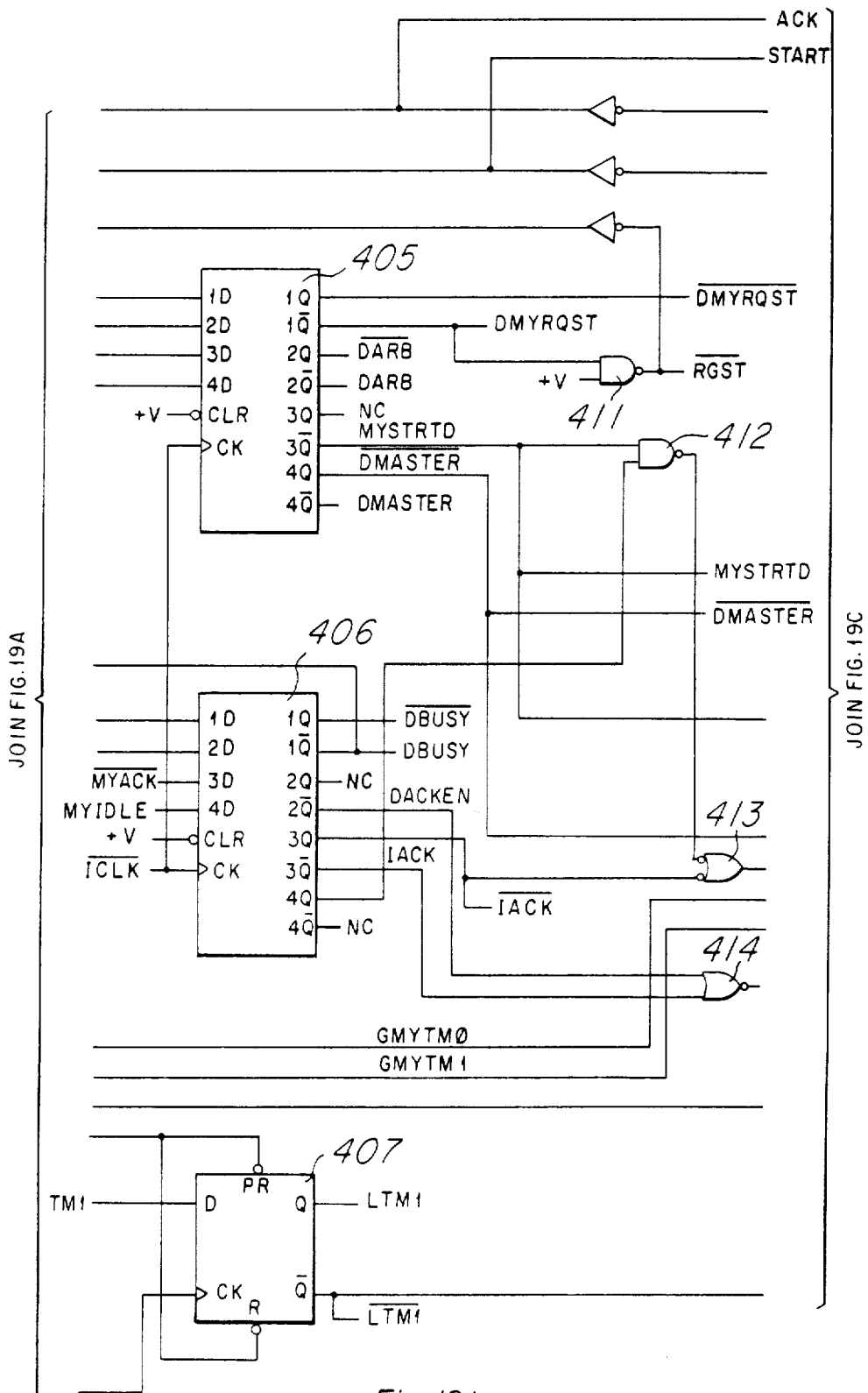
Figure 19C:
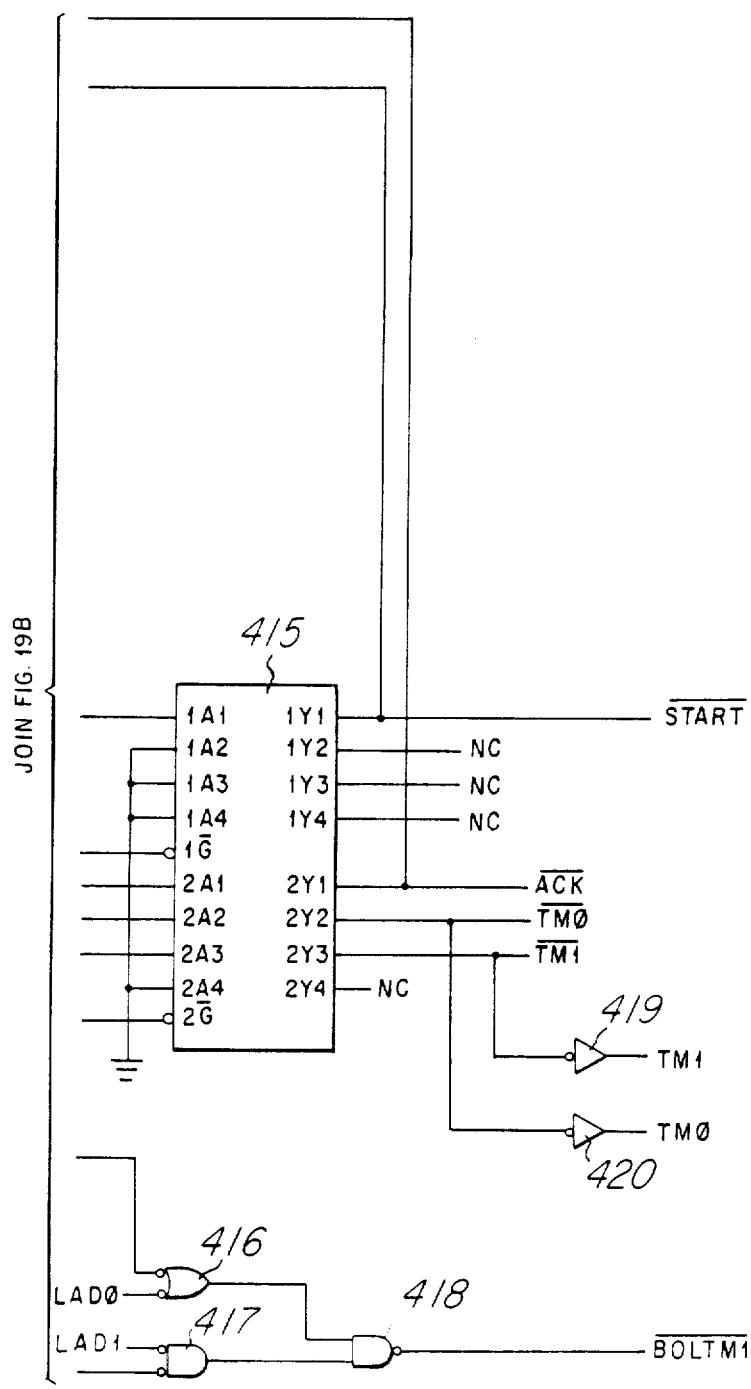
Figure 20A:
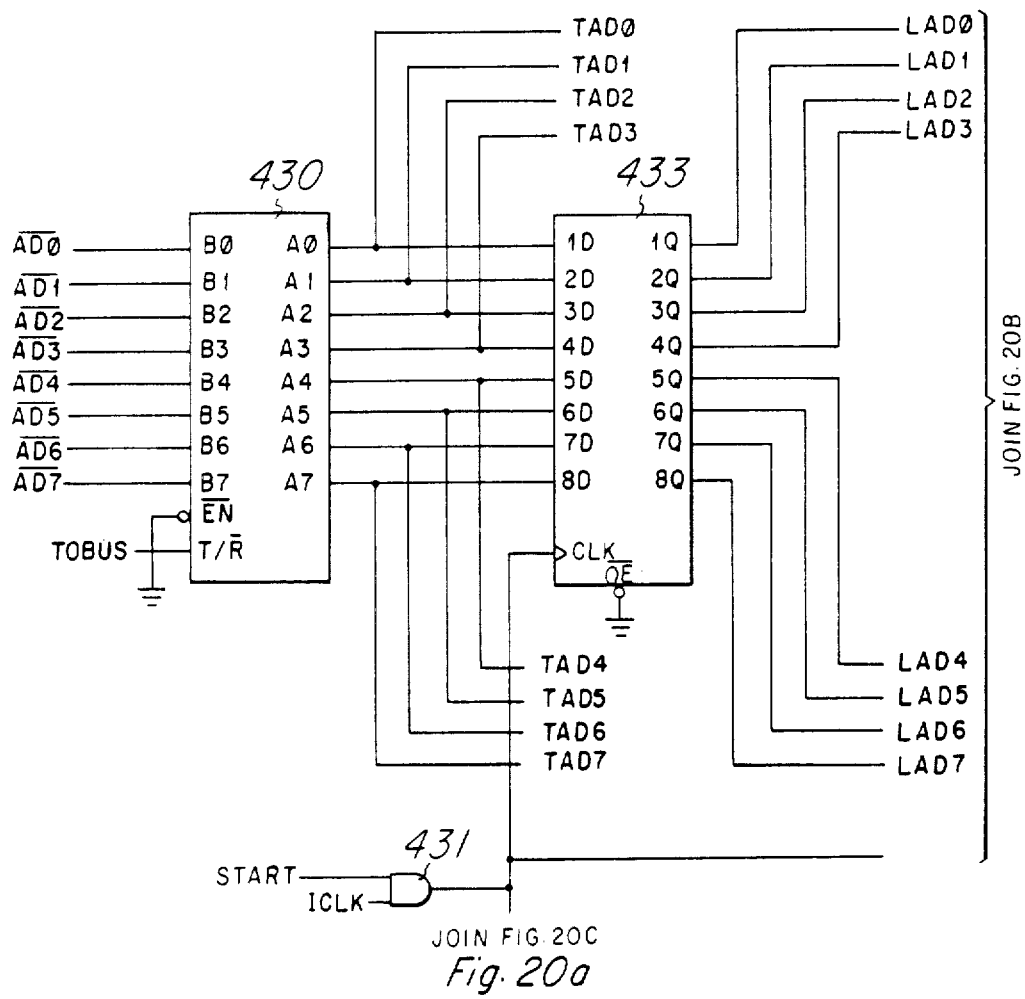
FIGS. 20A-20D form a schematic illustrating external bus buffers and address latches.
Figure 20B:
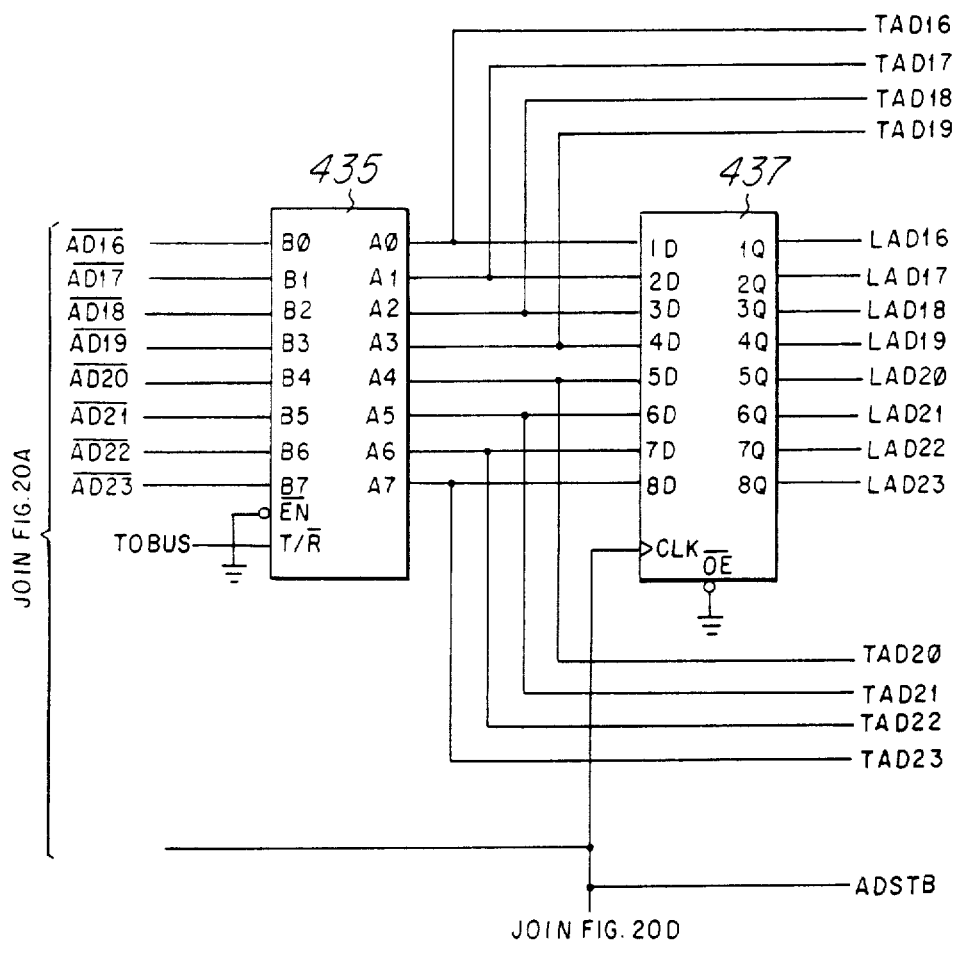
Figure 20C:
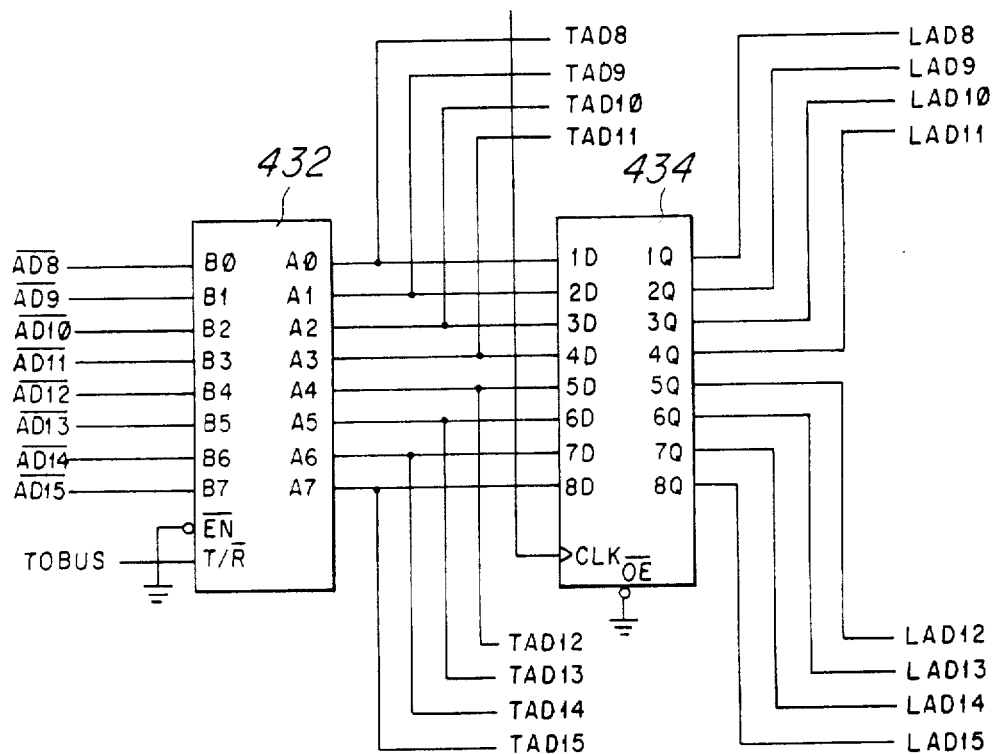
Figure 20D:
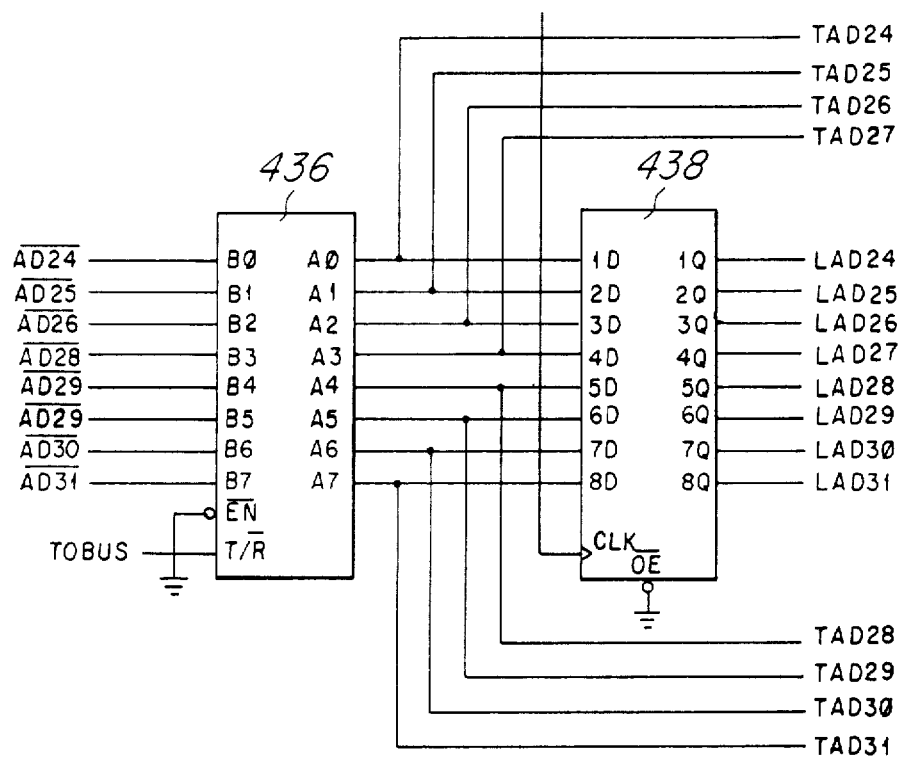

FIGS. 19A-19C joined form a schematic diagram of the bus control interface circuitry. At the heart of this circuitry is PAL401 whose equations and accomanying descriptors follow:

| | | |
|---|---|---|
| MYRQST:= | /RQST*BREQ*/MASTER*/RESET + | ; Assert RQST if not asserted and<br>; not master of bus |
| | MASTER*LOCK*BREQ*/RQST*/RESET + | ; Assert RQST if master and want<br>; to lock bus |
| | MYRQST*LOCK*/RESET + | ; Keep RQST asserted as long as<br>; LOCK is true |
| | MYRQST*/ARBDN*/RESET + | ; Keep RQST asserted through<br>; arbitration period |
| | MYRQST*BUSY*/ACK*/RESET + | ; Keep RQST asserted if bus is busy |
| | MYRQST*/GRANT*/RESET + | ; Keep RQST asserted if arbitration<br>; contest was lost |
| | MYRQST*/BUSY*/STREQ*/RESET + | ; Keep RQST asserted if the bus is<br>; not busy but START still pending |
| | MYRQST*ACK*/STREQ*/RESET + | ; Keep RQST asserted if bus xfer<br>; completing and no START pending |
| ARB .= | /RQST*BREQ*/MASTER*/RESET + | ; Assert ARB if RQST not asserted<br>; and not master |
| | MASTER*LOCK*BREQ*/RQST*/RESET + | ; Assert ARB if master and want to<br>; lock bus |
| | ARB*MYRQST*/RESET | ; Keep ARB asserted until RQST is<br>; negated (assert through START) |
| ARBDN := | RQST*/ARBDN*/RESET + | ; Assert to signal arbitration has<br>; completed |
| | RQST*/START*/RESET + | ; Start new arbitration period if<br>; START has been asserted |
| | MASTER*LOCK*RQST*/RESET | ; Arbitration period does not<br>; restart if master has locked bus |
| BUSY := | START*/ACK*/RESET + | ; Assert BUSY when START has been<br>; asserted |
| | BUSY*/ACK*/RESET | ; Keep BUSY asserted until ACK has<br>; asserted |
| MASTER:= | ARBDN*/BUSY*GRANT*/RESET + | ; Assert MASTER if bus not busy and<br>; arbitration has been won |
| | ARBDN*ACK*GRANT*/RESET + | ; Assert MASTER if bus completing<br>; transfer and arbitration won |
| | MASTER*/RQST*/RESET + | ; Keep MASTER asserted if no bus<br>; requests |
| | MASTER*/ARBDN*/RESET + | ; Keep MASTER asserted through<br>; arbitration period |
| | MASTER*ARBDN*GRANT*/RESET + | ; Keep MASTER asserted if arb.<br>; complete and won (bus locked) |
| | MASTER*BUSY*/ACK*/RESET | ; Keep MASTER asserted through<br>; current bus transfer<br>; START is only asserted<br>; if STREQ is true |
| MYSTRT:= | STREQ*MASTER*/RQST*/LOCK*/MYSTRT*/RESET + | ; Assert START if no bus<br>; requests, bus not busy |

-continued

| | | |
|---|---|---|
| | STREQ*MASTER*/RQST*/LOCK*ACK*/MYSTRT*/RESET/ ; Assert START if no bus | |
| | | ; requests, end of |
| | | ; current bus transfer |
| | STREQ*MYRQST*ARBDN*/BUSY*GRANT*/MYSTRT*RESET + | ; Assert START if arb. |
| | | ; won and bus not busy |
| | STREQ*MYRQST*ARBDN*ACK*GRANT*/MYSTRT*/RESET | ; Assert START if arb. |
| | | ; won, currnet xfer done |
| AACKEN := | ARBDN*/BUSY*GRANT*/MYSTRY*/RESET + | ; Negate ACK if bus not |
| | | ; busy (master drives) |
| | | ; ACK false after xfer) |
| | ARBDN*ACK*GRANT*/MYSTRT*/RESET + | ; Negate ACK at end of |
| | | ; current bus transfer |
| | MASTER*/BUSY*/RQST*/MYSTRT*/RESET + | ; Negate ACK if bus not |
| | | ; busy or requested |
| | MASTER*ACK*/RQST*/MYSTRT*/RESET + | ; Negate ACK at end of |
| | | ; current xfer if no |
| | | ; bus requests |
| | MASTER*/ARBDN*RQST*/MYSTRT*/BUSY*/RESET + | ; Drive ACK thru arb. |
| | | ; period if bus not busy |
| | MASTER*START*ACK*/RESET + | ; Negate ACK after idle |
| | | ; cycle assertion |
| | MASTER*/ARBDN*RQST*/MYSTRT*ACK*/RESET | ; Negate ACK at end of |
| | | ; current xfer if during |
| | | ; arbitration period |

DESCRIPTION
BREQ = BUS REQUEST
STREQ = START REQUEST
RQST = NUBUS RQST
START = NUBUS START
ACK = NUBUS ACK
GRANT = ARBITRATION LOGIC OUTPUT
RESET = RESET SIGNAL FOR PAL OUTPUTS (SYNCHRONOUS RESET)
LOCK = LOCK BUS
ACKEN = TRI-STATE ENABLE CONTROL FOR NUBUS ACK (MASTER'S)
ARBDN = INTERNAL TIMING FOR ARBITRATION PERIOD
BUSY = NUBUS IS BUSY, ASSERTED DURING START, NEGATED DURING ACK
MASTER = BOARD WHICH IS MASTER CONTROLS NUBUS
MYSTRT = OUTPUT OF PAL MEANING ASSERT START ON NUBUS
ARB = ARBITRATE FOR NUBUS, ASSERT ARBITRATION LINES
MYRQST = RQST FOR NUBUS, ASSERT RQST LINE

PAL 401 outputs signals MYRQST-, ARB-, MYSTRT-, and MASTER- are connected to terminals 1D-4D, respectively of flip flop array 405. Terminal 1Q of flip flop array 405 provides signal DMYRQST-. Terminal 1Q- provides output signal DMYROST and one input to NAND gate 411 whose other input is a static "1" and whose ouptut is signal RQST- which, inverted, is one of the inputs to PAL401.

Terminal 3Q- of flip flop array 405 provides signal MYSTRTD, terminal 4Q provides signal DMASTER- and terminal 4Q-provides DMASTER.

Flip flop array 406 has inputs from other circuits as shown providing output signals DBUSY- on terminal 1Q; DBUSY on terminal 1Q-; DACKEN on terminal 2Q-; signal IACK on terminal 3Q-. The output of terminal 40 is used in the logic circuitry as shown.

Inverting buffer 415 has various inputs grounded as shown and other inputs from the logic circuitry providing output signals START-, ACK-, TM1-, TM0 and TM1.

Flip flop 404 provides output LTM0 on its Q output terminal and flip flop 407 provides signal LTM1 on its Q terminal and LTM1- on its Q-terminal. NAND gate 418 with its input circuitry as shown provides signal BOLTMY1-.

FIGS. 20A-20D together schematicaly illustrate bus buffers 430, 432, 435 and 436 receiving bus address lines AD0-through AD3-. The output of these four buffers are signals PAD0 through PAD31. The outputs from buffers 430, 432, 435 and 436 are input to flip flop arrays 433, 434, 437 and 438, respectively. The output signals from the flip flop arrays are signals LAD0 through LAD31. The signals have been and will be referred to throughout this description.

FIGS. 21A and 21B schematicaly illustrate data latches 440-443 having input signals TAD0-TAD31 and output signals IDB0-IDB31.

Figure 22A:
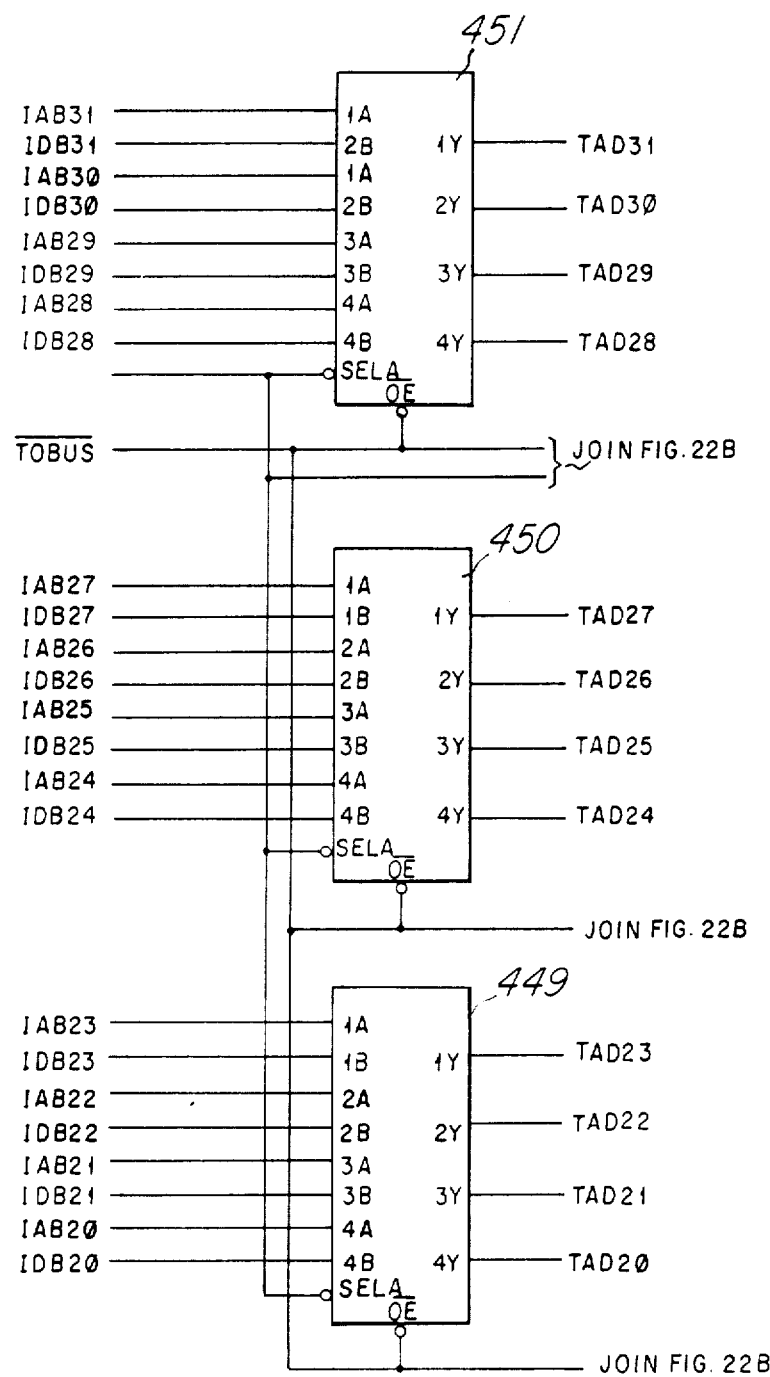
FIGS. 22A-22C, when connected as shown, schematically illustrate address/data multiplexers.
Figure 22B:
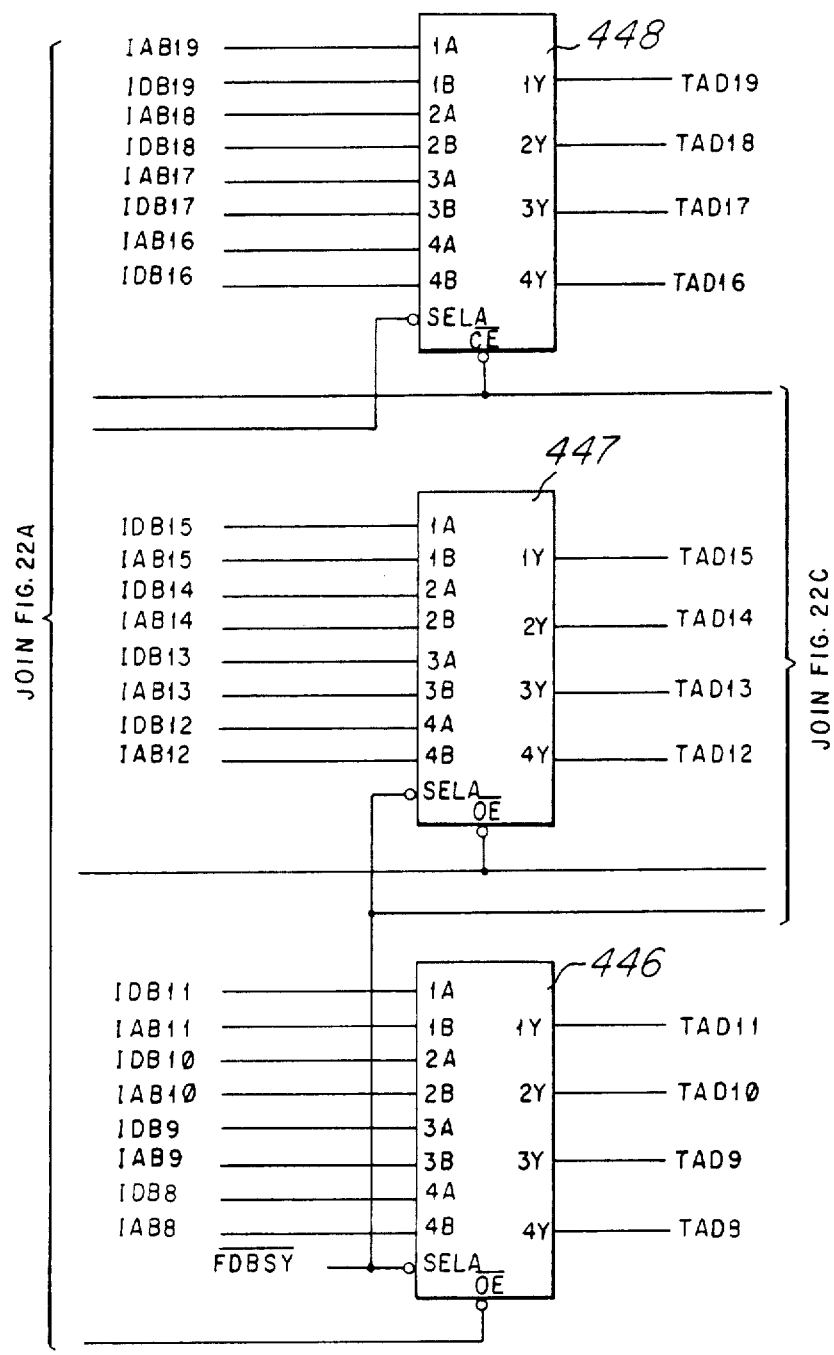
Figure 22C:
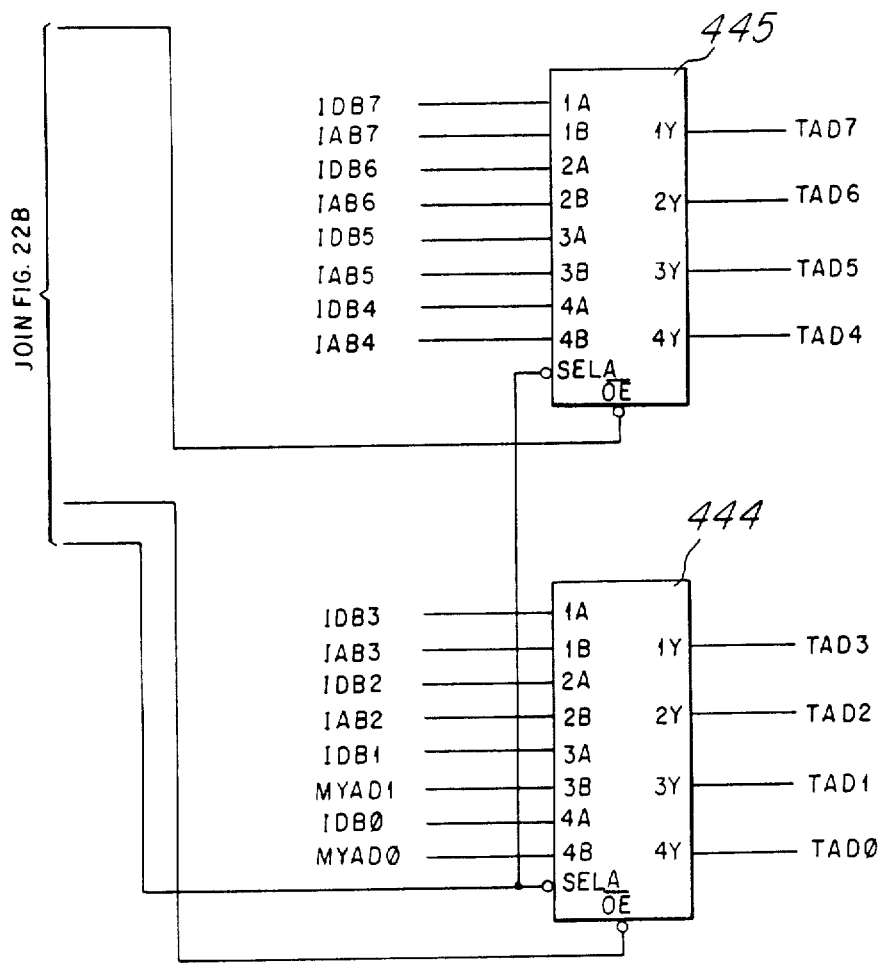

FIGS. 22A-22C schematically illustrate address/data multiplexers 444-451. Signals MYAD0, MYAD1 and IAB2 through IAB31 are multiplexed with signals IDB0 through IDB31. Signals MYAD0 and MYAD1 are the outputs of NOR gate 754 and AND gate 745 from FIG. 14C. The output lines from all of these multiplexer have been described in previously described drawings.

FIGS. 23A-23F illustrate address decode circuitry. Flip flop array 30A is a supervisor cache ID register and flip flop array 30B is a user cache ID register. They both receive their inputs from lines IDB0-IDB7. The Q outputs of register 30A are designated as signals SID0 through SID5 and SLPBR0 and SLPBR1. The outputs from the user register 30B are designated UCID0 through UCID7. The outputs from user register 30A are connected to buffer 468. The output from user register 30B are connected to buffer 469. The Y terminals of buffers 468 and 469 are tied together and to the Y terminals of buffer 472. The Y terminals of buffer 468 are also connected to the D input terminals of flip flop array 471 whose Q outputs provide signals TLEN, PAREN, T1LEN, T1HEN, T2LEN, T2HEN, CALEN, and CAHEN. These signals are also applied to the A terminals of buffer 472.

Signals LAD21, LAD22 and LAD23 are inverted and applied as inputs to NAND gate 458. Non-inverted, they are applied as inputs to NAND gate 459. The outputs of these two NAND gates provide inputs to NAND gate 460. Enable input G1 of decoder 461. Signal SLTGRT- is input to control terminal G2A- and as one input to NOR gate 464 whose other input is provided by the output from NAND gate 460. The output from NAND gate 458 also is connected to the C select input of decoder 461. The output signals from decoder 461 are IROM-, CDATA-, CTAGS-, INTRAM-, CFREG-, DROM- and CTLSTAT-. Inverters also provide signals cDATA and CTAGS. The output of NOR gate 464 is signal SLTERR.

Figure 24:
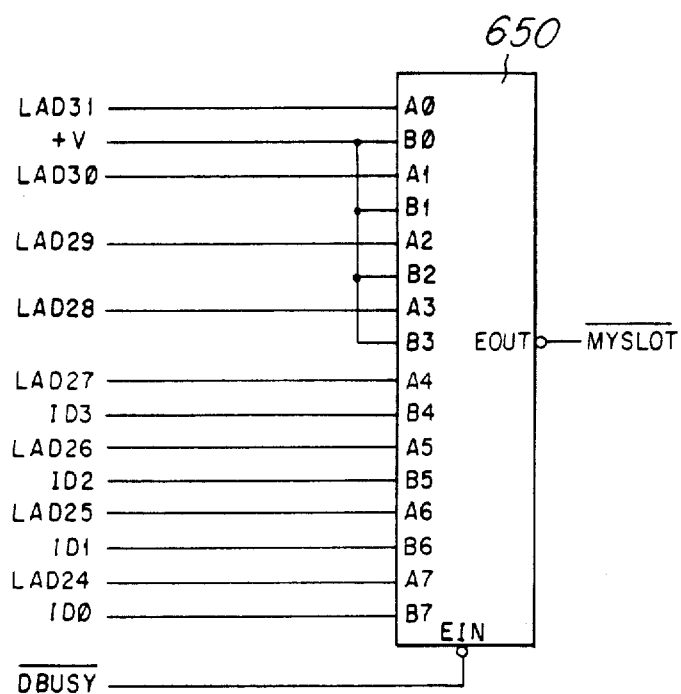
FIG. 24 illustrates a comparison generation of a signal.

FIG. 24 illustrates octal comparator 650 for comparing the signals impressed on the A terminals with those impressed on the B terminals to render output signal MYSLOT-.

Figure 25:
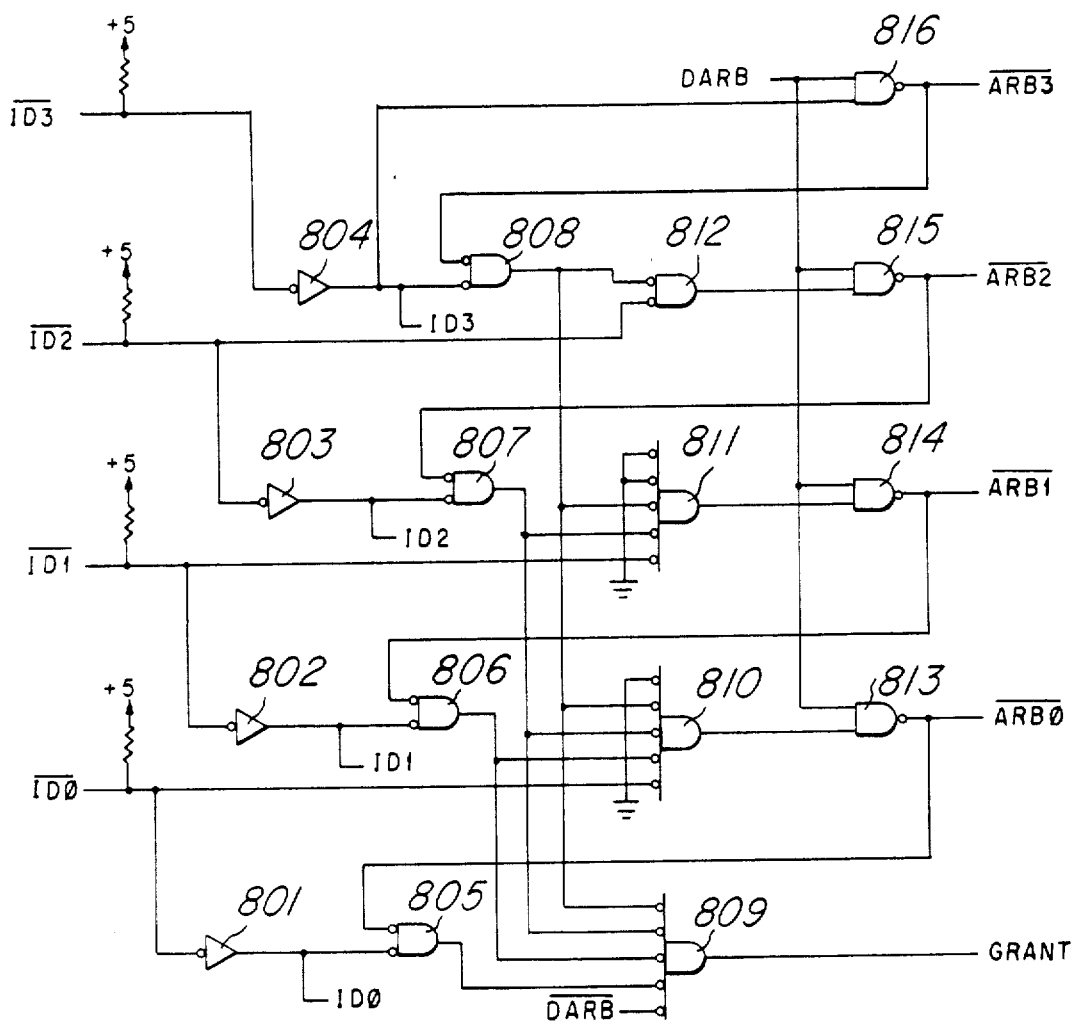
FIG. 25 is a schematic diagram of the arbitration logic.
Figure 26A:
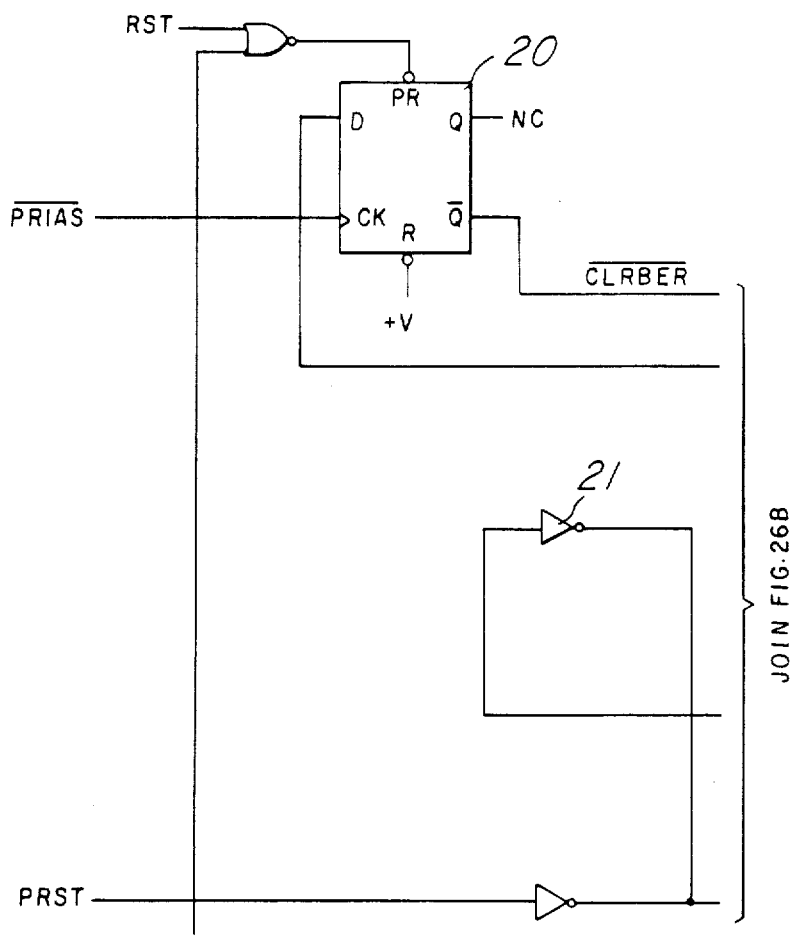
FIGS. 26A-26E together form a schematic illustrating flip flops that form the CPU control register.
Figure 26B:
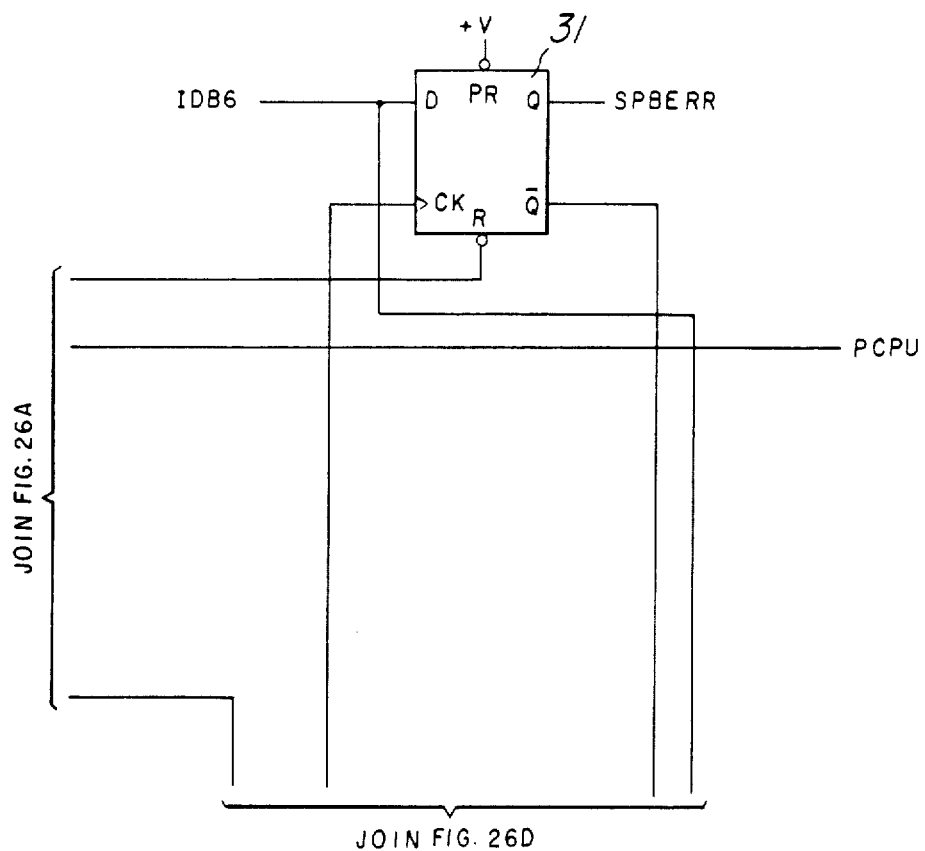
Figure 26C:
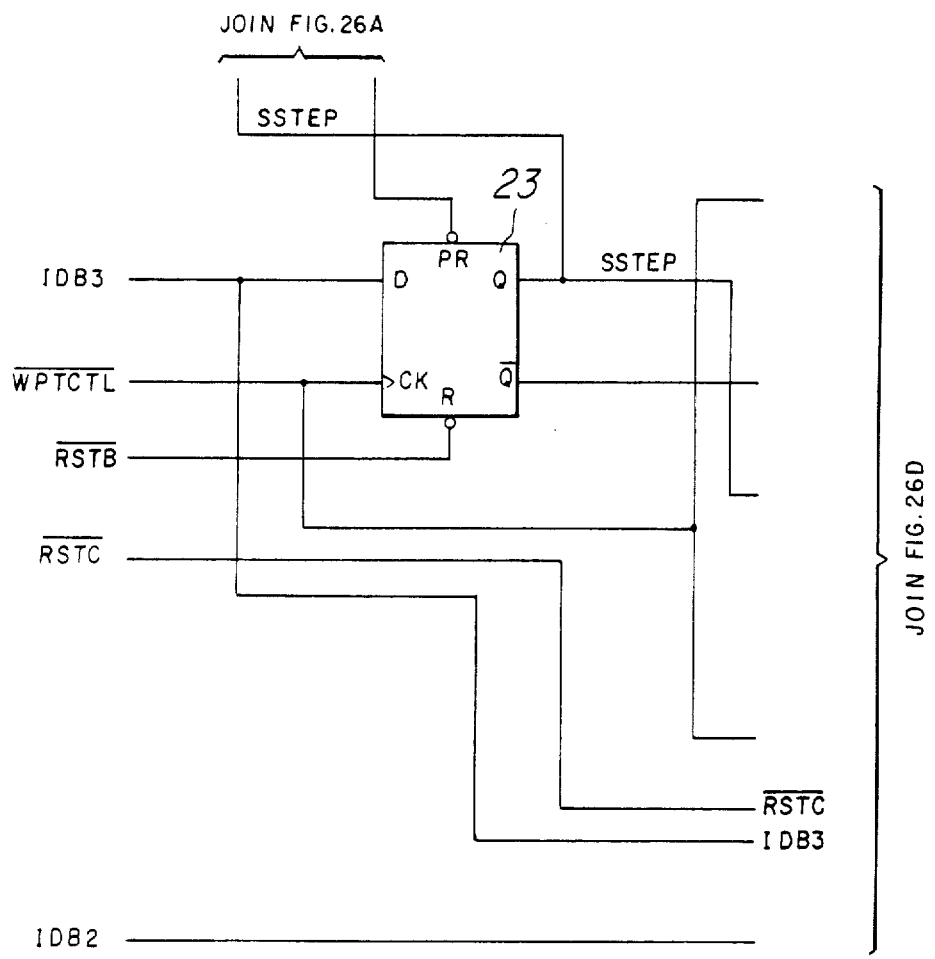
Figure 26D:
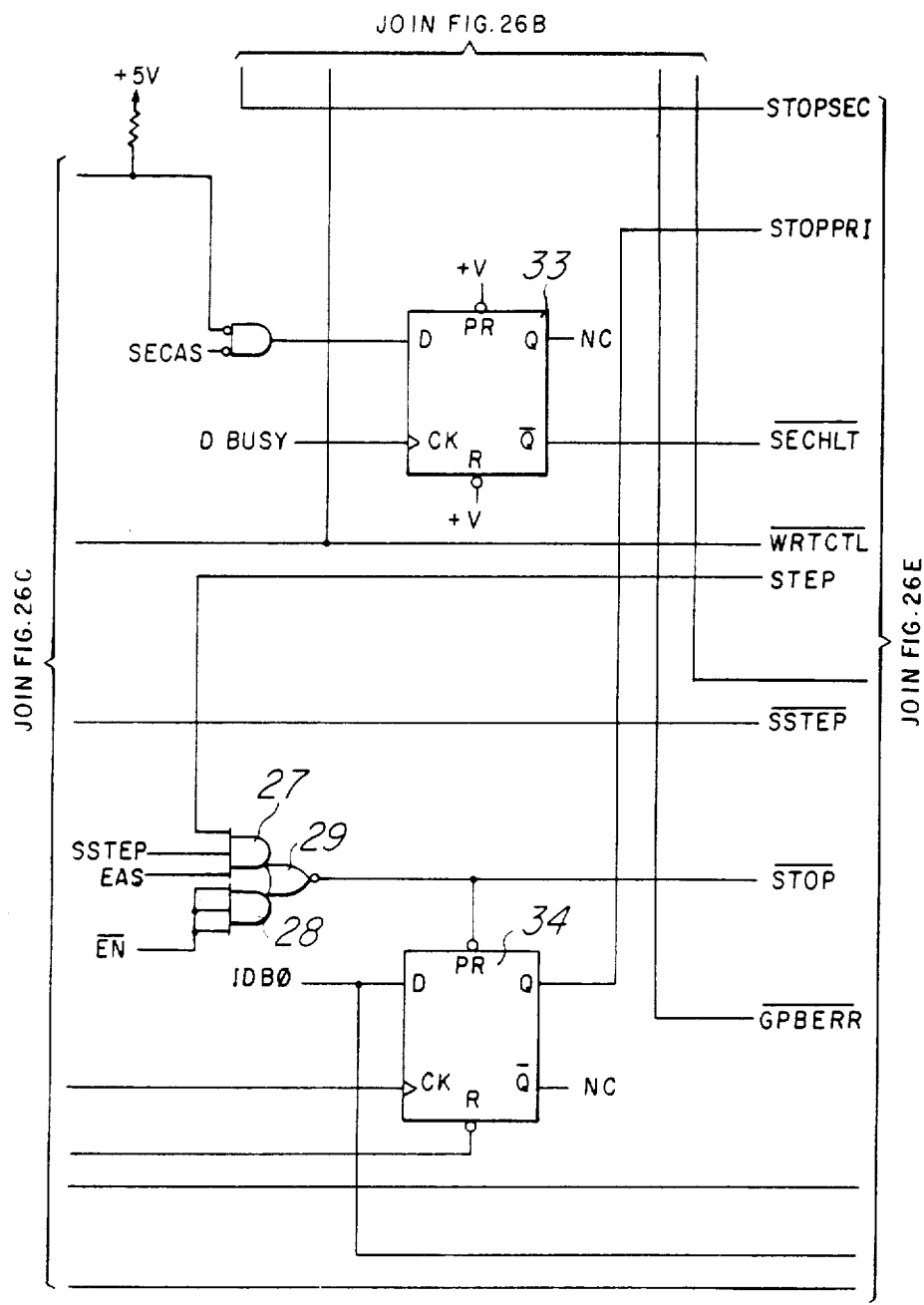
Figure 26E:
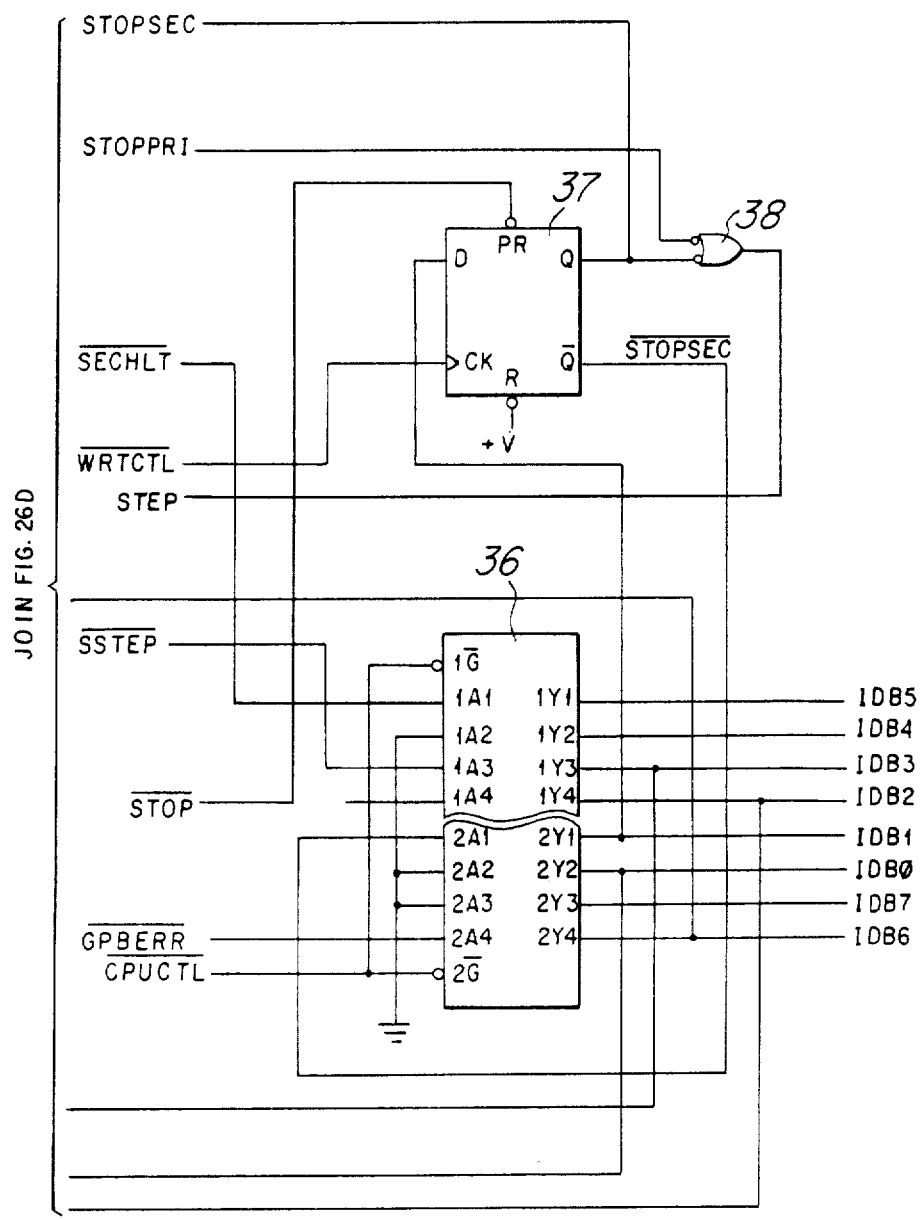

FIG. 25 is a terminal diagram of the bus arbitration logic. The slot identification signals ID0-, ID2-, ID2- and ID3- come from the bus 50 and are inverted through inverters A01-A04, respectively, providing inputs to NOR gates 805-808, respectively. Inverter A04 provides signal ID3 to one input of NAND gate 816. NOR gate 808 provides one input to each of NOR gates 809-812, respectively. Signal ID2- provides the other input to NOR gate 812.

Inverter 803 provides signal ID2 to one input of NOR gate 807. The other input to NOR gate 807 is provided by the output of NAND gate 815. One input to NAND gate 815 comes from the output of NOR gate 812. The output of NOR gate 807 provides one input to each of NOR gates 809-811. The output of NOR gate 811 provides one input to NAND gate 814 whose output provides the other input to NOR gate 806. The output of NOR gate 806 provides one input to each of NOR gates 809 and 810.

The output of NOR gate 810 provides one input to NAND gate 813. The other input to each of NAND gates 813-816 is provided by signal DARB from flip flop array 405 of FIG. 19. The output of NAND gate 813 provides the other input to NOR gate 805 whose output provides another input to NOR gate 809. Signal DARB- provides the final input to NOR gate 809 whose output is signal GRANT.

FIGS. 26A-26E illustrate the CPU10 control register. The inputs shown, the Q- output of flip flop 20 provide signal CLRBER-, the Q output of flip flop 23 provides signal SSTEP and the Q- output provides its negation. NOR gate 29 provides signal STOP-. The Q output of flip flop 34 provides signal STOPPRI and the Q output of flip flop 37 provides signal STOPSEC. The Q- output provides the negation.

These signals permit controlling the CPU to stop and start it, to cause it to step, to recognize error, etc. The signals may be monitored through the buffer 36.

FIGS. 27A-27E, when joined as shown, illustrate acknowledge decoding and error status. Flip flops 902 and 901 receive signals TM0 and TM1, transfer mode signals. When both are "1", the transfer was valid. If TM=0 and TM1=1, then there has been a time-out—which would happen if a slot in the bus for a device is empty. If TM=1 and TM0=0, an error acknowledgment has occured. If TM1=0 and TM0=0, then signal GACBL (go away, come back later) is generated by NOR gate 922. Signal VMSACK from flip flop 915 is a bus acknowledge signal. Signal DACK from the Q output of flip flop 916 is an acknowledge signal. Signal SLVACK from NAND gate 914 is an acknowledge signal. Error acknowledge signals PBERR- and PBERR from the Q and Q- outputs of flip flop 917 are present. Logic 919 with the inputs as shown provides signal ERR- which causes translation sequencer 300 to sequence to micro instruction IE which then asserts a bus error.

Buffer 920 permits reading the error status signals and buffer 921 permits reading the cache hit and flag bits. Flip flop arrays 923 and 924 permit transfer of the signals as shown.

NAND gate 925 receives the input signals shown and if any such signal drops to 0, then the error clock (ECLK) stops running.

FIGS. 28-A -28D form a schematic diagram of cache hit and error status registers which, for the most part, permit testing of the system.

Flip flop array 201 provides outputs to an AND gate for producing signal TLVL1 which is a level 1 translation access bit. Flip flop array 205 simply latches parity information. Flip flops 202, 203 and 204 set flags for level 1 hit, level 2 hit and data cache hit, respectively. Flip flops 206 and 207 are for testing. Flip flops 212-214, 219, 226 and 227 all are error flip flops.

Figure 31:
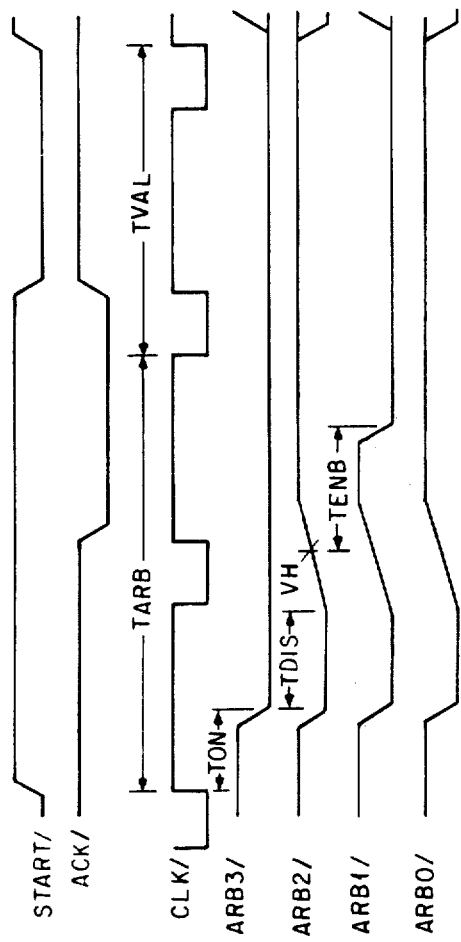

FIG. 31 illustrates timing involved in the arbitration procedure. The signals are as shown with signals ARB0- through ARB03- having timed sections. Ton is the turn on time of the initial assertion. Tdis is the disable time from the detection of a higher priority request. Temb is a reasserton after detection of a "false" higher priority request. Tval is valid arbitration lines.

Figure 32:
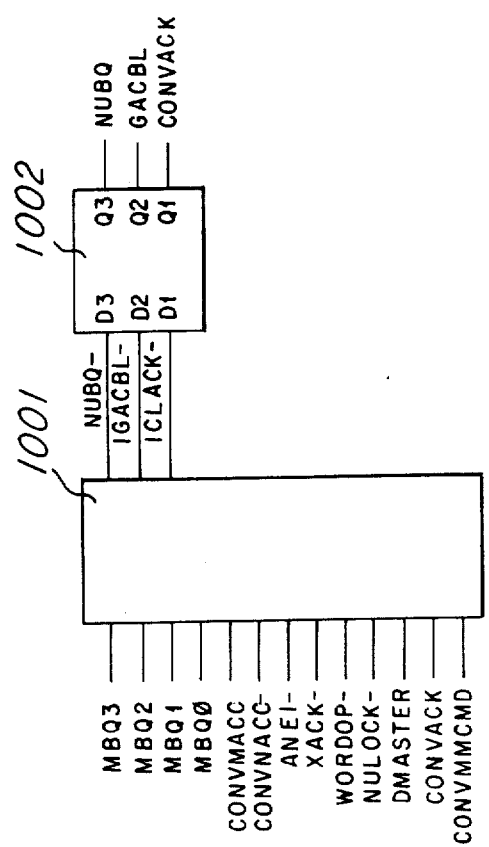

FIG. 32 illustrates PAL1001 with the input signals as set out below in the equations and explanatoins of the PAL1001.

| | |
|---|---|
| CNURQ = | /MBQO*/MBQ1*/MBQ2*MBQ3*/DMASTER + |
| | /MBQ0*/MBQ1*/MBQ2*/MBQ3*CONCNACC + |
| | /MBQ0*/MBQ1*/MBQ2*MBQ3*CONVMACC + |
| | MBQ0*/MBQ1*/MBQ2*MBQ3 |
| GACBL = | /MBQ0*/MBQ1*/MBQ2*CONVMACC*CONVNACC + |
| | /MBQ0*/MBQ1*/MBQ2*MBQ3*CONCMACC + |
| | MBQ0*/MBQ1*/MBQ2*MBQ3 |
| CIACK = | /MBQ0*MBQ1*/MBQ2*/MBQ3*XACK*/WORDOP + |
| | /MBQ0*/MBQ1*MBQ2*/MBQ3*XACK + |
| | /MBQ0*/MBQ1*/MBQ2*MBQ3*CONVMACC |
| IF (AEN1) /MADDR1 = | /NBADO1*/MBQ0*/MBQ2 + |
| | /NBADO1*/MBQ1*/MBQ2 + |
| | /NBADO1*XACK*/MBQ2 + |
| | /NBADO1*/MBQ1*MBQ0 + |
| | /NBADO1*XACK*MBQO |

-continued

| | |
|---|---|
| CVXACK = | /MBQ0*/MBQ1*MBQ2*MBQ3*CONVMMCMD |

DESCRIPTION:
MBQ0 = CURRENT STATE INPUT (BIT 0)
MBQ1 = CURRENT STATE INPUT (BIT 1)
MBQ2 = CURRENT STATE INPUT (BIT 2)
MBQ3 = CURRENT STATE INPUT (BIT 3)
CONVMACC = NUBUS ACCESSING MULTIBUS THRU CONVERTER
CONVNACC = MULTIBUS ACCESSING NUBUS THRU CONVERTER
AEN1 = INDICATES CONVERTER IS MASTER OF THE MULTIBUS
XACK = MULTIBUS TRANSFER ACKNOWLEDGE
WORDOP = 32-BIT NUBUS TRANSFER
NULOCK = INDICATES THE NU-BUS AIN'T LOCKED
FRCAD1 = FORCE ADDRESS BIT 1 ACTIVE FOR 2ND HALF OF WORDOP
CIACK = CONVERTER GENERATES ACK
GACBL = GO AWAY, COME BACK LATER
CNURQ = CONVERTER REQUESTS NU-BUS
DMASTER = SDU IS CURRENT NU-BUS MASTER
CONVACK = NU-BUS ACK DELAYED BY ONE CLOCK
CONVMMCMD = SYNCHRONIZED MMCMD (MMCMD = CWTC = MRDC)
CVXACK = CONVERTER GENERATES MULTIBUS XACK

The signal of interest out of PAL1001 is signal IGACBL- which is input to flip flop array 1002 with output signal GACBL- (go away, come back later) out.

Figure 33:
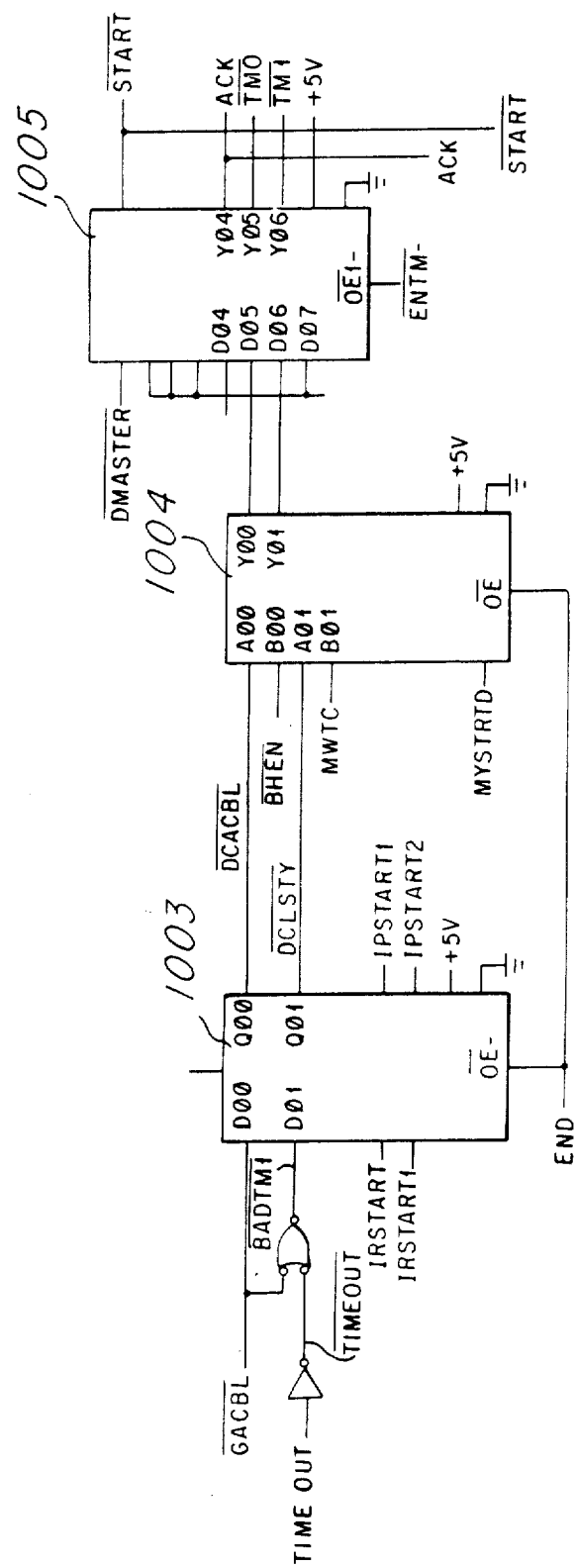

In FIG. 33, signal GACBL- is shown entering flip flop 1003 together with the negation of the signal "time out", previously described. Signal GACBL- is input to flip flop 1003 which in turn inputs multiplexer 1004. Signal TIME OUT- and signal GACBL- are ORed into another another input of flip flop array 1003 which outputs to the multiplexer 1004. Multiplexer 1004 outputs signals MYTM0 and MYTM1 of buffer 240 which outputs signals TM0- and TM1-.

The circuits shown in FIGS. 32 and 33 are part of a converter for converting from one external bus to another external bus.

MODE OF OPERATION

Figure 1D:
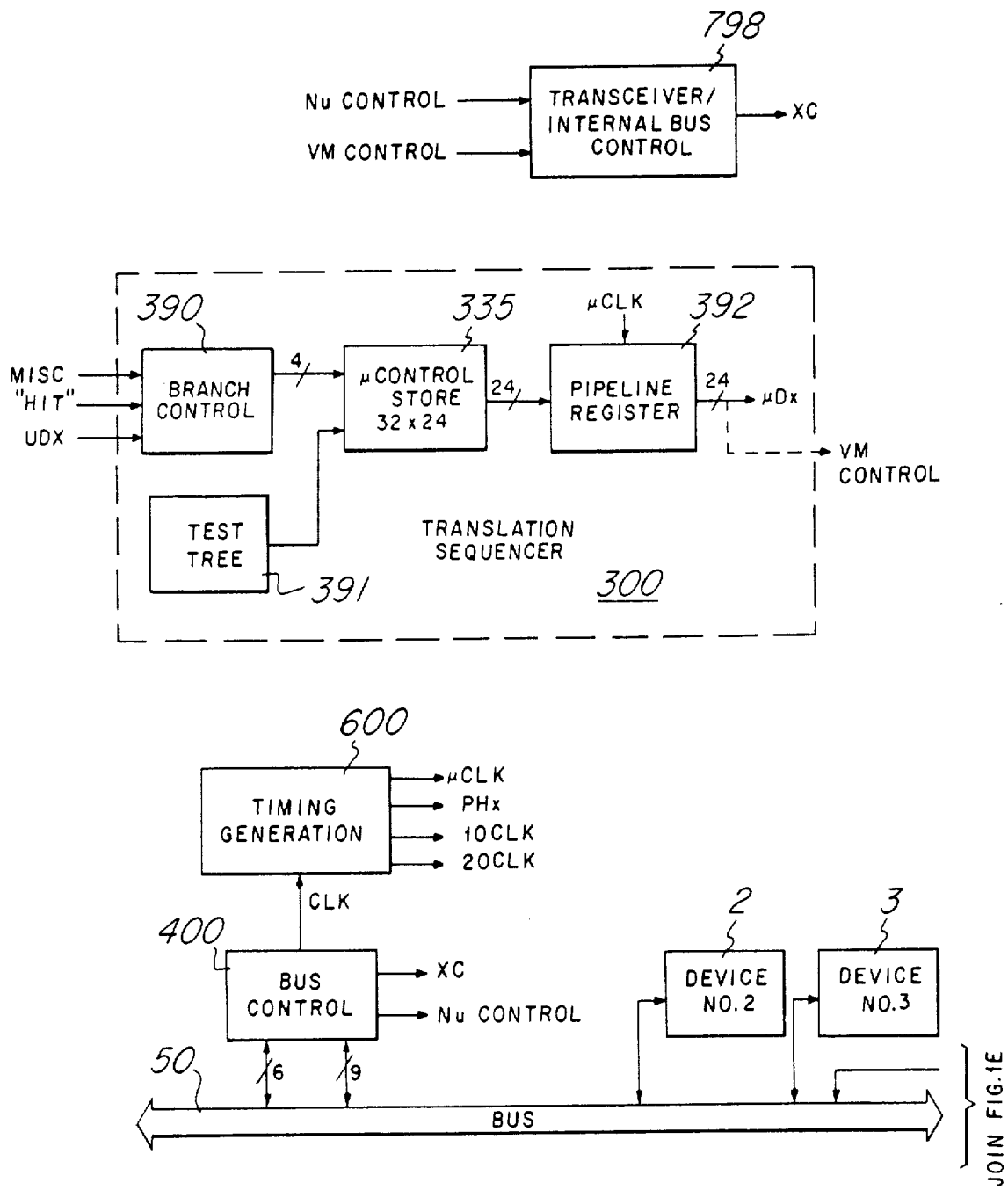
Figure 1E:
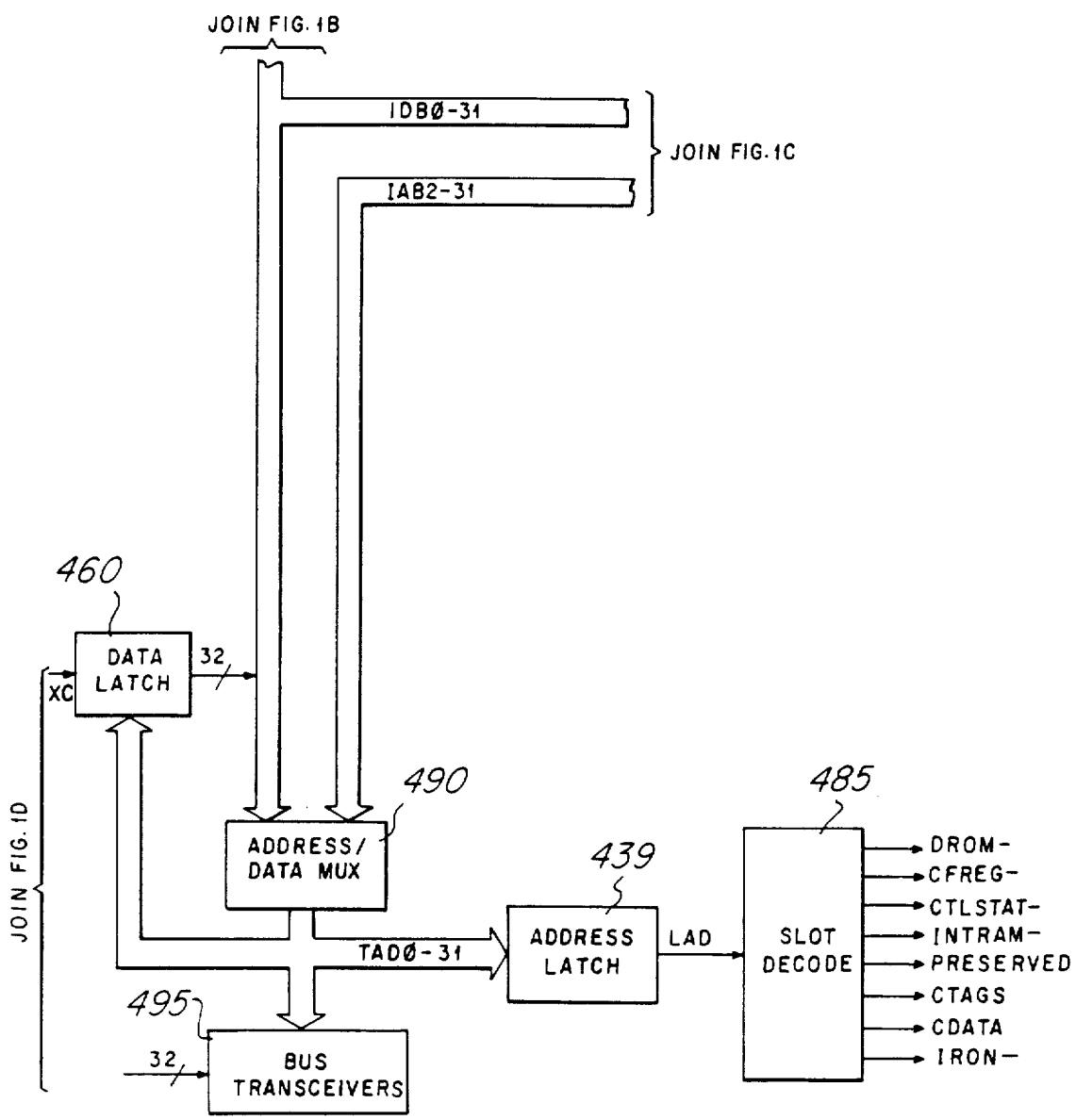

Please refer first to FIG. 1 and specifically to FIG. 1D. For purposes of illustration, assume that device No. 2 comprises a second bus to which a second master is electrically connected. CPU 10 and associated circuitry and bus 50 are the first master and first bus, respectively.

FIG. 32 illustrates PAL 1001 with the signals as indicated. These signals are detailed in connection with the detailed description, including the equations that provide various outputs from PAL 1001. PAL 1001 is physically located in a central converter to which both buses are attached. In a bus request by one master for the other bus, the converter acts as a slave to the requesting bus and a master to the requested bus and vice versa.

The signals of interest into the PAL 1001 are AENI- which indicates that the converter is the master of the second bus and signal DMASTER indicates that the converter is the master of the first bus. Signal CONV- MACC indicates that the first bus is trying to access the second bus and signal CONVNACC-indicates that the second master is trying to access the first bus. This combination of signals provides an output signal IGACBL- which results, through flip flop 1002 in signal GACBL. Signals MBQ0 through MBQ3 indicate the state of the converter which is not germane to this invention.

In FIG. 33, signal GACBL- is shown applied to flip flop 1003 and through an OR gate to another element of flip flop 1003. The protocol of the system requires two lines and when both lines are high, a "go away, come back later" situation is sent out. These signals are multiplexed through multiplexer 1004 and go out through transceiver 1005 as signals TM0- and TM1-.

Figure 27A:
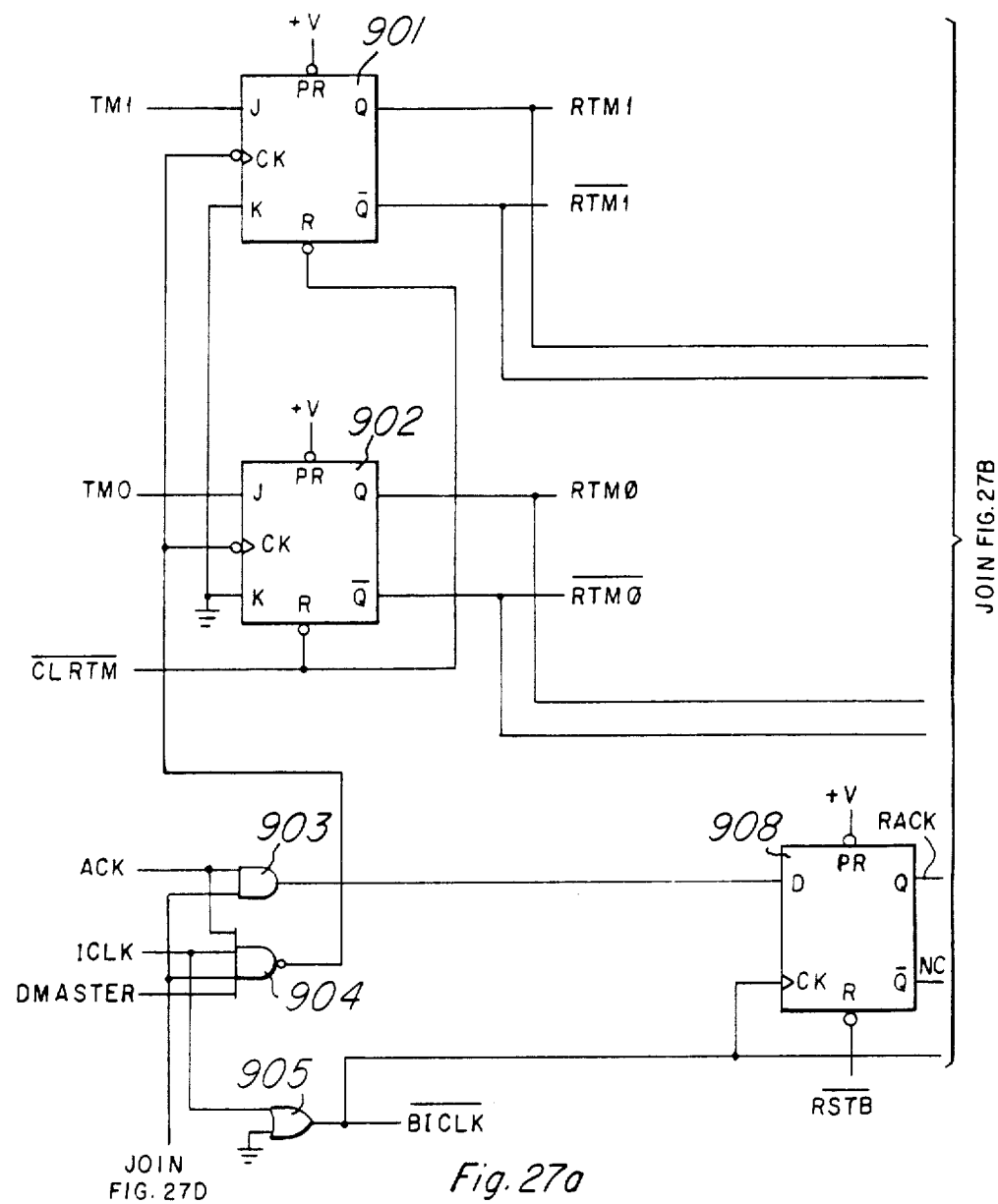
Figure 27B:
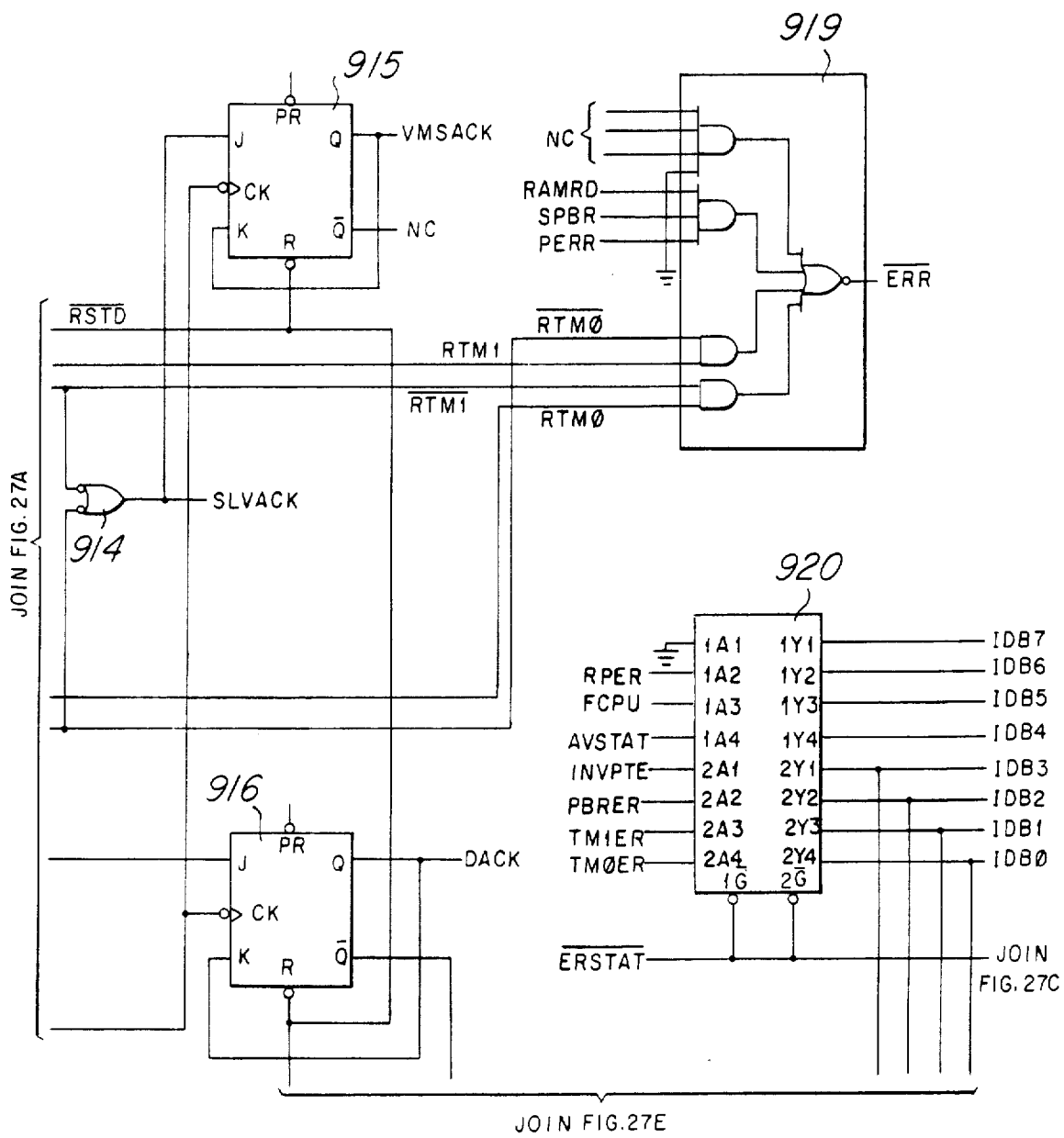
Figure 27C:
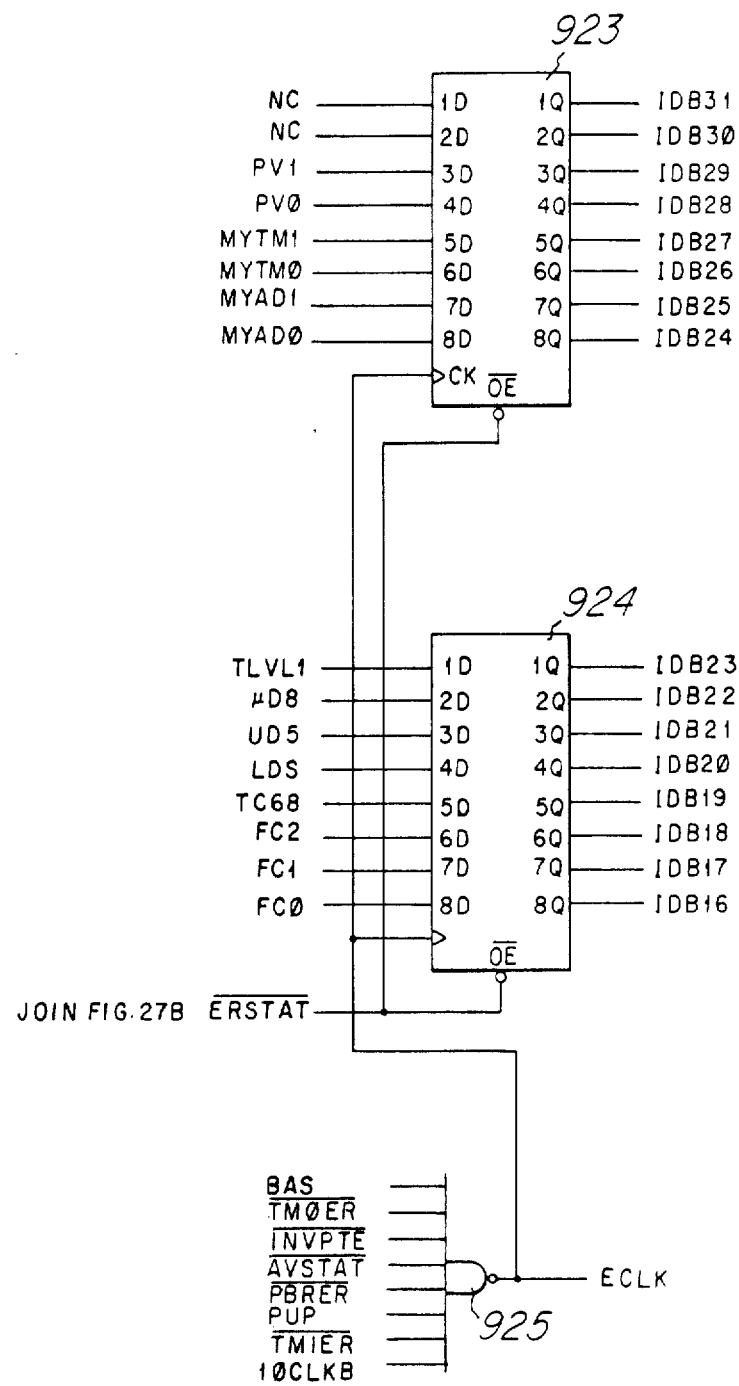
Figure 27D:
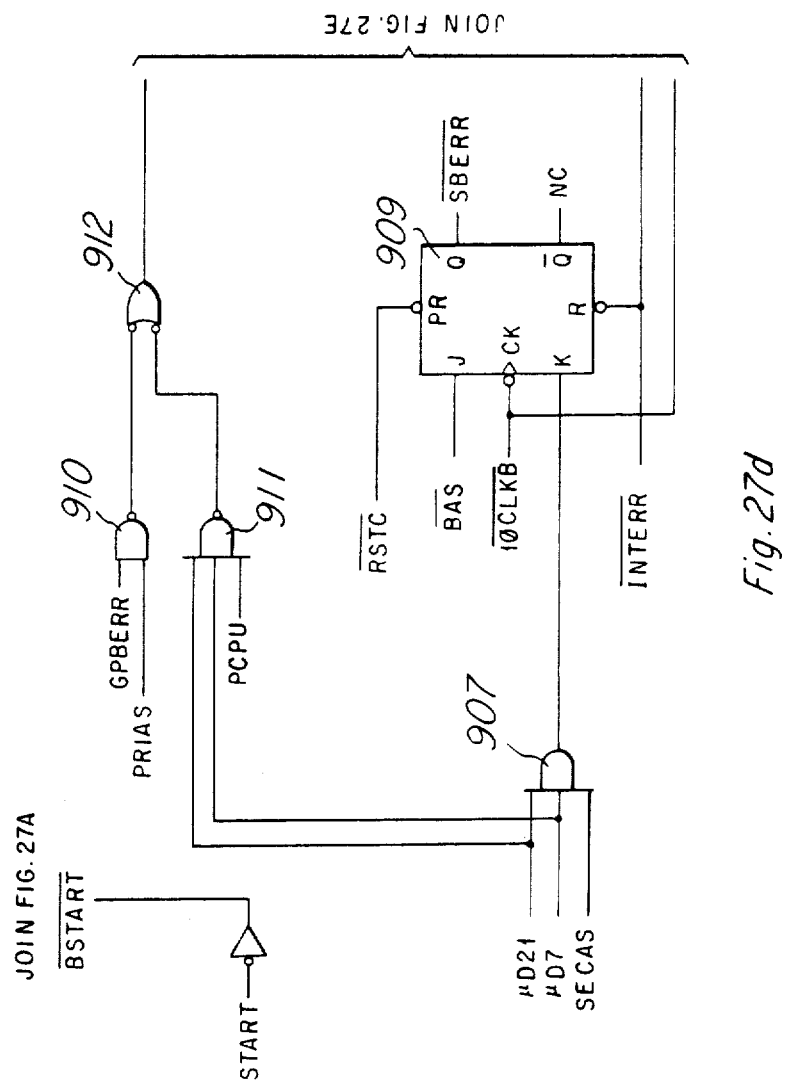
Figure 27E:
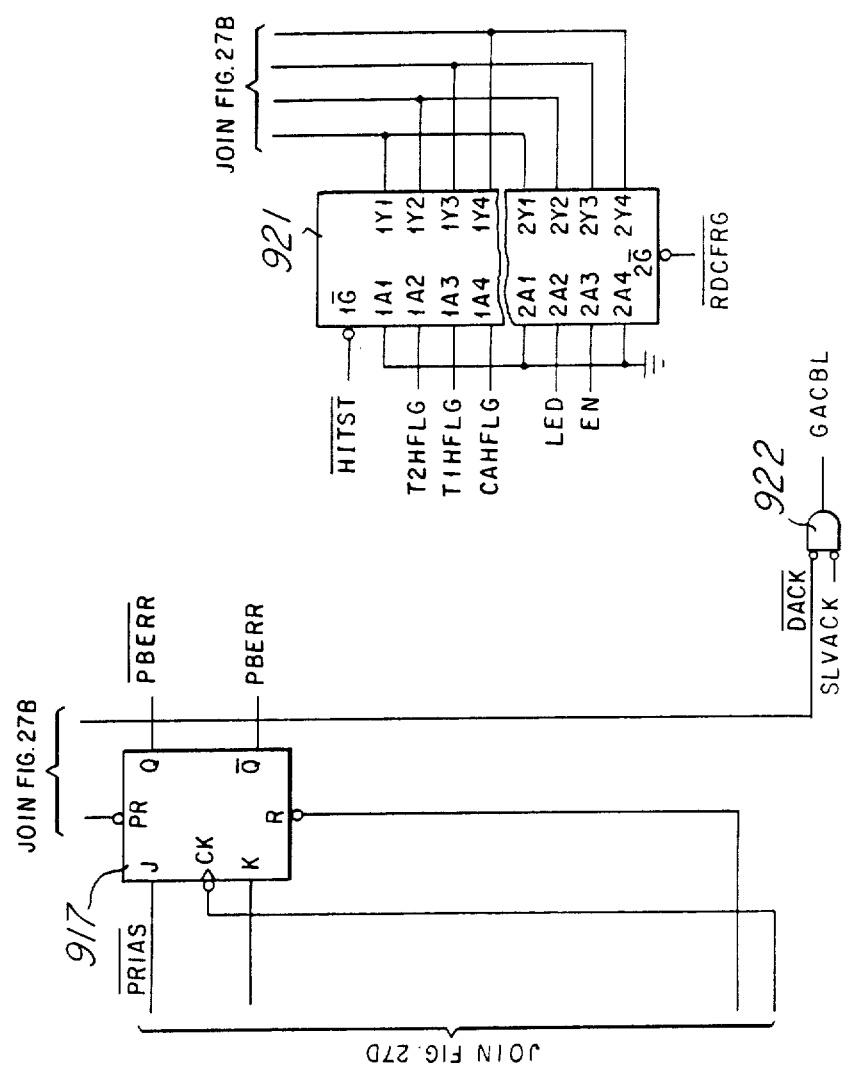
Figure 28A:
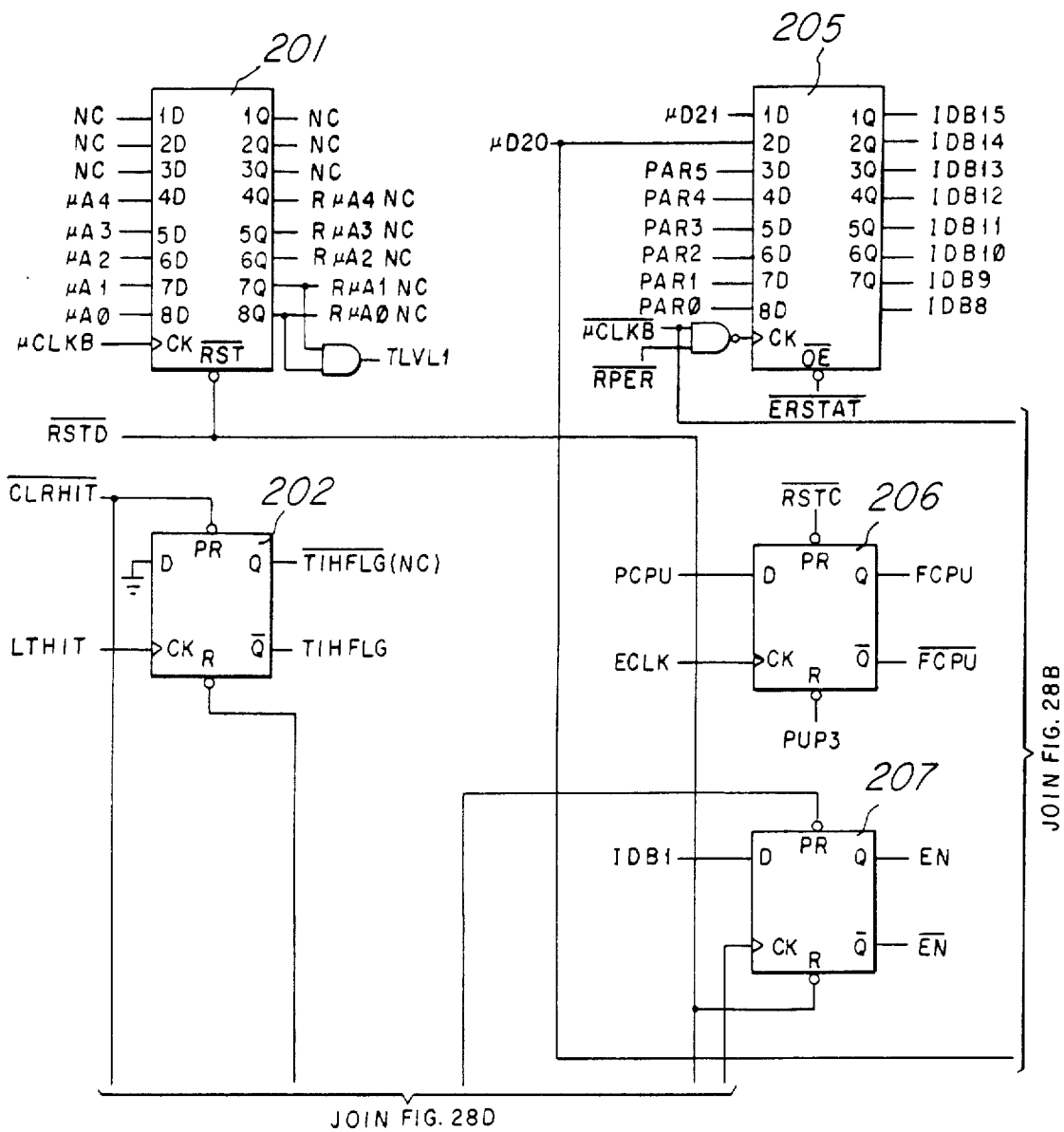
FIGS. 28A-28D illustrate the CPU error register, cache hit register and associated circuits.
Figure 28B:
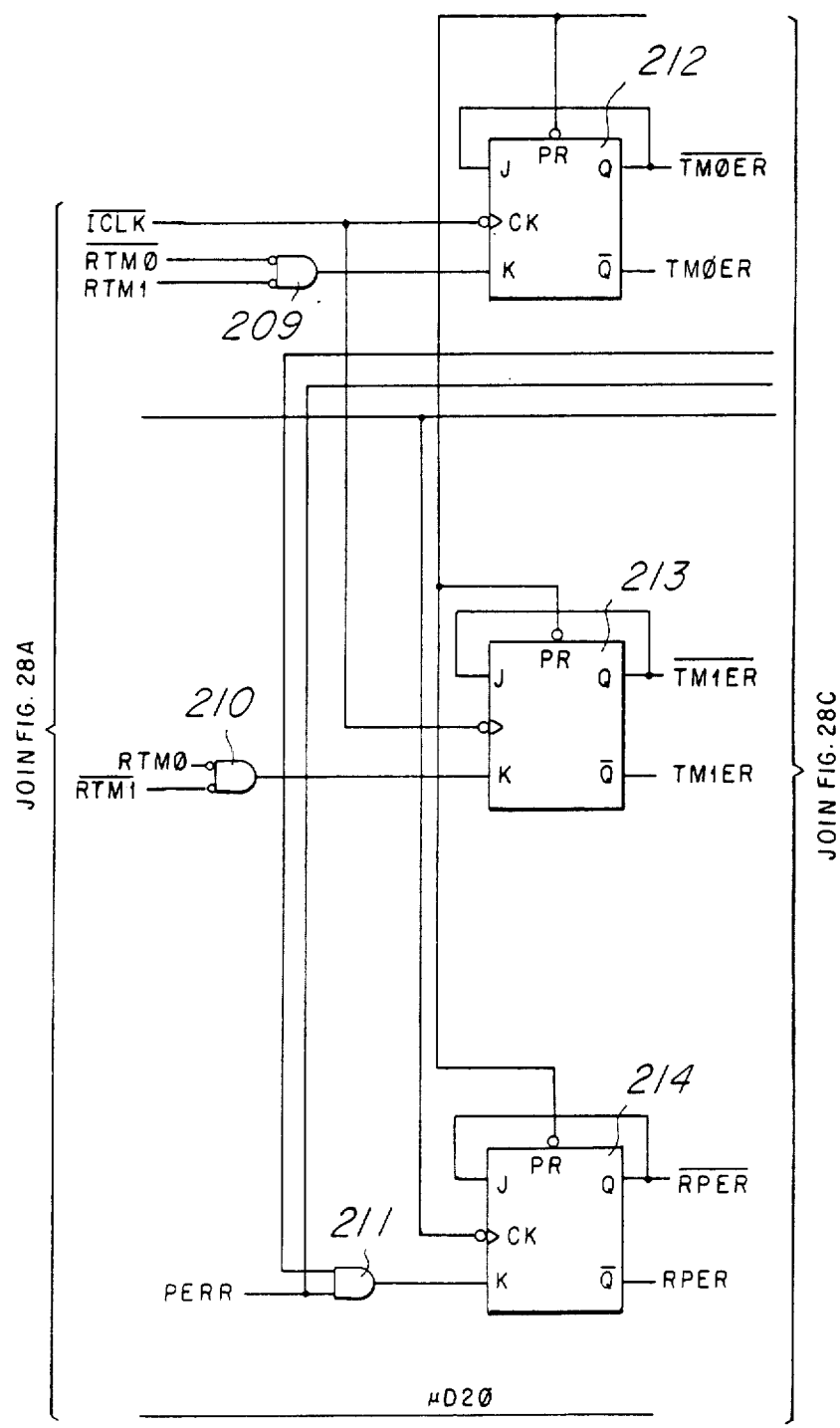
Figure 28C:
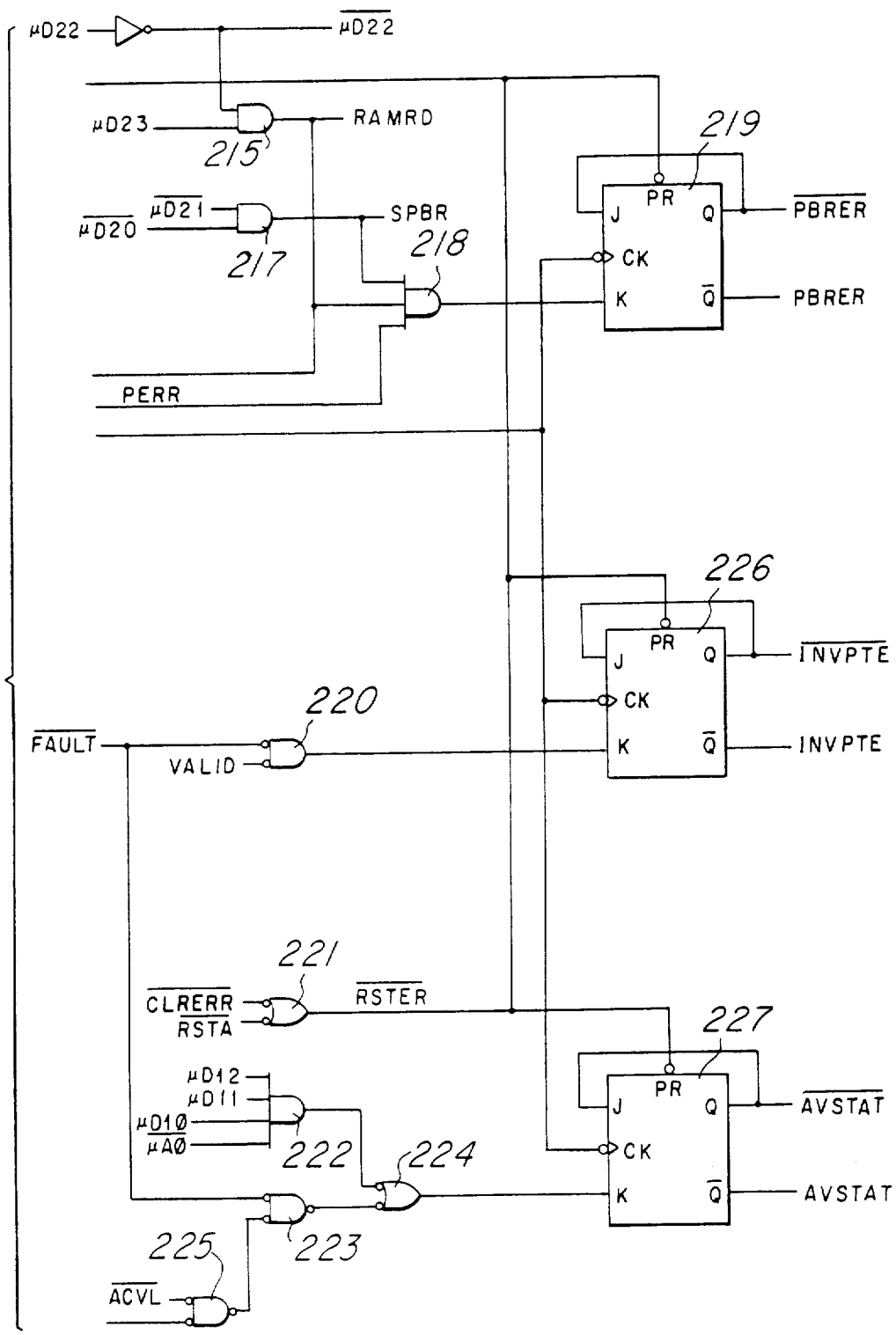
Figure 29:
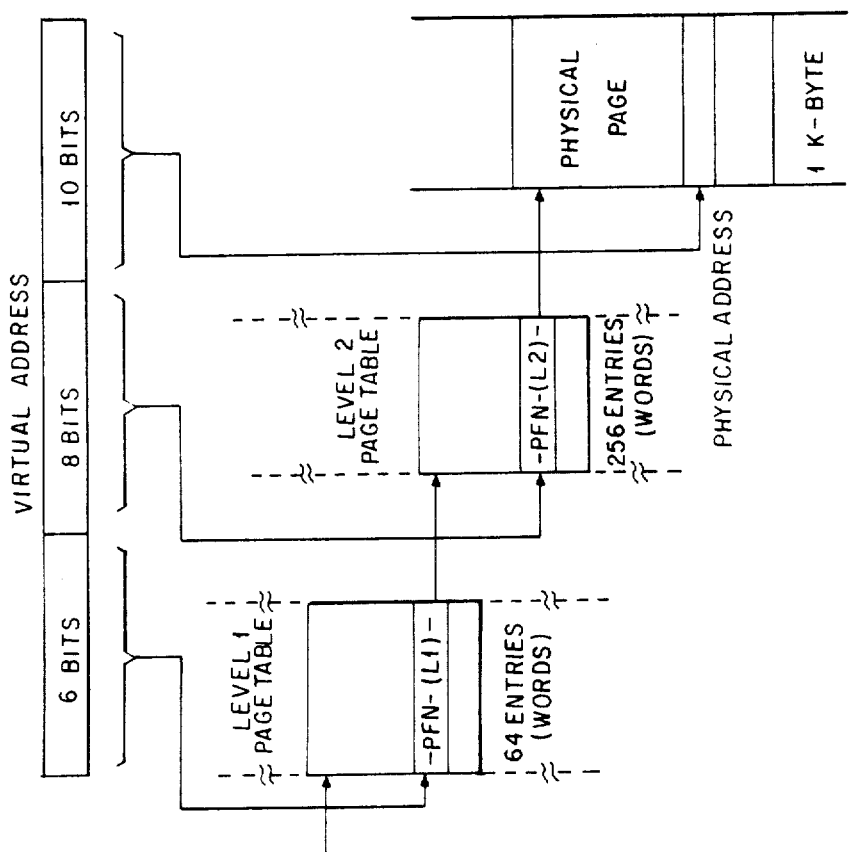
Figure 28D:
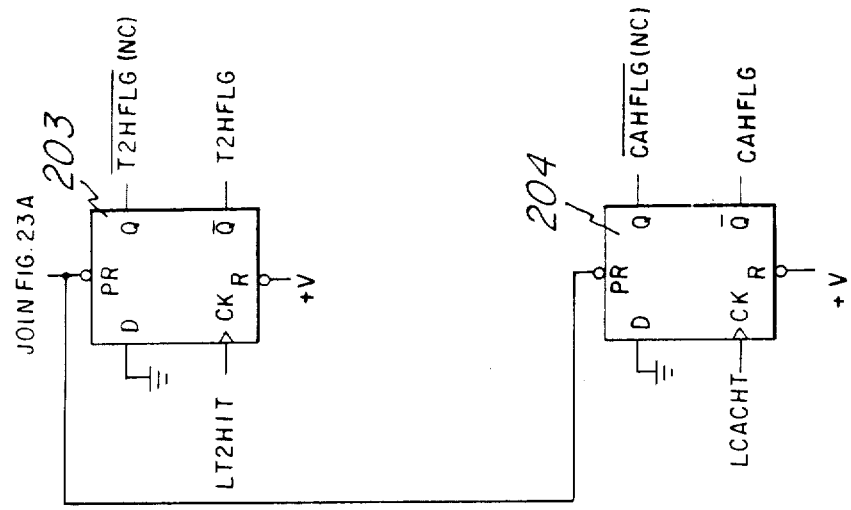
Figure 30:
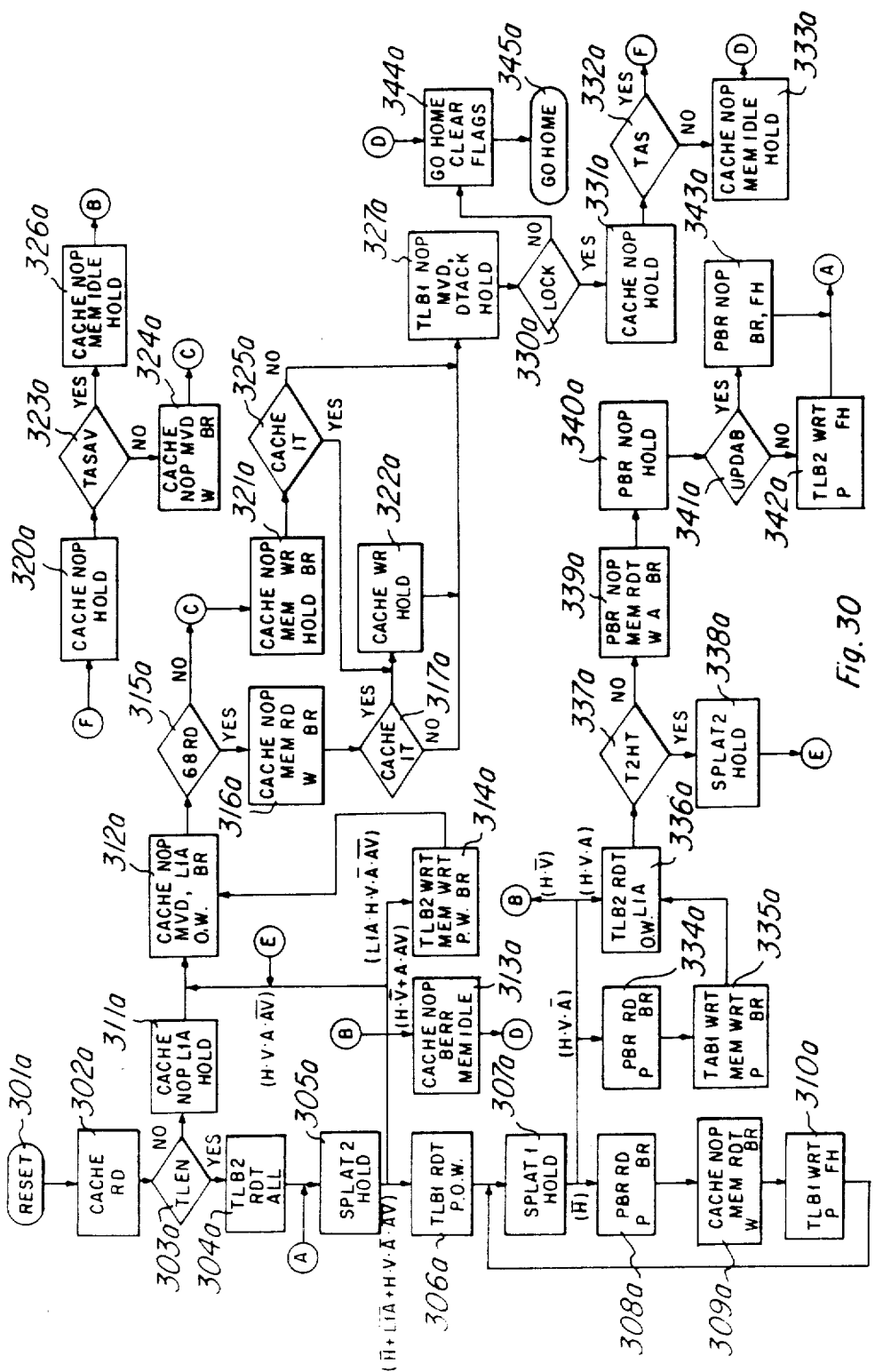

Referring now to FIG. 27A, signals TM1 and TM0 are shown coming in as inputs to flip flops 901 and 902, respectively. Flip flop 901 provides output RTM1 and RTM1-. Flip flop 902 provides outputs RTM0 and RTM0-. If RTM0 and RTM1 are both high, then there is a valid request. If RTM1 is low and RTM0 is high, there has been a "time out". A time out signal is one where nothing happens, there is no response and after a set period of time, a time out signal is the response. If RTM1 is high and RTM0 is zero, then there has been an error. And finally, if RTM0 and RTM1 are both low, then a "go away, come back later" signal is indicated.

Signal SLVACK from gate 914 is always a "1" unless the condition is present for "go away, come back later" in which case it will below and flip flop 915 will be cleared. Flip flop 916 is in a low state to provide signal DACK- high. NOR gate 922 then provides a high output indicating signal GACBL is active. In FIG. 14C, signal GACBL is shown as applied to gate 727A. The presence of signal ICLK, from FIG. 8, clocks in signal GACBL, setting flip flop 722, which in turn enables the signal ENABLE BUS CYCLE.

In that manner, the cycle is enabled without the second bus being accessed. The cycle condition ends normally, at which time master No. 1 is able to arbitrate again for the bus.

It is comtemplated that the specific circuits and general arrangement of circuits used herein may be altered by those skilled in the art art without avoiding the general idea of this invention which is limited only by the appended claims.

What is claimed is:

1. A digital computing system including at least a first and a second bus, with at least a first master connected to the first bus and a second master connected to the second bus, the first master connected to initiate a cycle requesting the second bus through the first bus and the second master connected to initiate a cycle requesting the first bus through the second bus, the system comprising:

(a) central conversion means coupled to said first and second buses for receiving the bus requests from the first and second masters through the first and second buses, respectively, for the second and first buses, respectively, the central conversion means including means for generating a response signal to the first bus indicative that the first bus and the second bus are requested simultaneously by the second and first masters respectively, and means for receiving and means for decoding the response signal; and (b) means connected to receive the decoded signal and responsive thereto for causing the first master to disconnect its request for the second bus, and including means for causing the first master to proceed to the end of its request cycle to be in a condition to again arbitrate for the second bus, thereby avoiding a deadlock between the simultaneous requests.

2. The system of claim 1 wherein the means for generating a response signal comprises a programmable array of logic for receiving signals generated from the first and second master indicative of the simultaneous bus request and for generating signals in response thereto for decoding by the means for receiving and decoding.

3. The system of claim 2 wherin the means for receiving and decoding the response signals comprise register means for receiving the response signals and providing output signals indicative of the simultaneous request condition.

4. The system of claim 3 wherein the means for causing the first master to disconnect its request for the second bus comprises means for continuing the cycle requesting the second bus without continuing the request for the second bus until the cycle is normally terminated.

* * * * *